(12) United States Patent
Nair et al.

(10) Patent No.: US 12,481,352 B2
(45) Date of Patent: Nov. 25, 2025

(54) METHOD AND DEVICE FOR IMPROVING COMFORTABILITY OF VIRTUAL CONTENT

(71) Applicant: Apple Inc., Cupertino, CA (US)

(72) Inventors: Rahul Nair, Hayward, CA (US); Devin W. Chalmers, Oakland, CA (US); Giancarlo Yerkes, San Carlos, CA (US); Yutaka Yokokawa, Los Gatos, CA (US)

(73) Assignee: APPLE INC., Cupertino, CA (US)

( * ) Notice: Subject to any disclaimer, the term of this patent is extended or adjusted under 35 U.S.C. 154(b) by 237 days.

(21) Appl. No.: 18/136,760

(22) Filed: Apr. 19, 2023

(65) Prior Publication Data

US 2023/0343028 A1 Oct. 26, 2023

Related U.S. Application Data

(60) Provisional application No. 63/454,212, filed on Mar. 23, 2023, provisional application No. 63/333,012, filed on Apr. 20, 2022.

(51) Int. Cl.
*G06F 3/01* (2006.01)
*G06T 17/00* (2006.01)

(52) U.S. Cl.
CPC .............. *G06F 3/012* (2013.01); *G06F 3/011* (2013.01); *G06T 17/00* (2013.01)

(58) Field of Classification Search
None
See application file for complete search history.

(56) References Cited

U.S. PATENT DOCUMENTS

| | | | |
|---|---|---|---|
| 2017/0067739 A1* | 3/2017 | Siercks | ..................... G06T 7/97 |
| 2017/0329480 A1 | 11/2017 | Ishikawa et al. | |
| 2020/0365117 A1 | 11/2020 | Dumas et al. | |
| 2021/0090311 A1 | 3/2021 | Hoover et al. | |
| 2022/0303518 A1* | 9/2022 | Wu | ....................... H04N 21/435 |
| 2024/0219998 A1* | 7/2024 | Schmidtchen | .......... G06F 3/013 |

OTHER PUBLICATIONS

Extended European Search Report for corresponding EP Appl. No. 23169012.4 dated Aug. 14, 2023.

\* cited by examiner

*Primary Examiner* — Jwalant Amin
(74) *Attorney, Agent, or Firm* — Fernando & Partners, LLP

(57) ABSTRACT

In one implementation, a method for improving comfortability of virtual content during head roll motions includes: determining a scene roll origin value for an XR environment; detecting ahead pose with pose roll value; when a difference between the scene roll origin value and the pose roll value is less than a first angular threshold, presenting virtual content within the XR environment in a first presentation mode, wherein the virtual content is presented with a first content roll value in the first presentation mode based the pose roll value; and when the difference between the scene roll origin value and the pose roll value is not less than the first angular threshold, presenting the virtual content within the XR environment in a second presentation mode, wherein the virtual content is presented with a second content roll value in the second presentation mode based on the scene roll origin value.

20 Claims, 26 Drawing Sheets

800

While detecting a first head pose, present virtual content in a first presentation mode at a first location that is a first set of offset values relative to the first head pose — 810

*The virtual content corresponds to head-locked virtual content in the first presentation mode that is presented at the first location corresponding to the first set of offset values* — 812

Detect a change from the first head pose to a second head pose — 820

(A)   (B)

In response to detecting the change to the second head pose and in accordance with a determination that the difference between the first and second head poses indicates a motion that satisfies a first motion criterion, presenting, via the display device, the virtual content in a second presentation mode while moving the virtual content away from the first location towards a second location that is the first set of offset values relative to the second head pose — 830

*The motion corresponds to one of: rotational motion relative to at least one of a yaw, pitch, or roll rotational dimension; or translational motion relative at least one of an X, Y, or Z axis* — 832

*The motion satisfies the first motion criterion when the motion corresponds to the rotational motion with at least one of an angular displacement value, an angular velocity value, an angular acceleration value, or an angular jerk value that exceeds the first motion criterion* — 834A

*The motion satisfies the first motion criterion when the motion corresponds to the translational motion with at least one of a translational displacement value, a translational velocity value, a translational acceleration value, or a translational jerk value that exceeds the first motion criterion* — 834B (C)

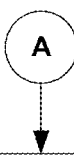

850 — In response to detecting the change to the second head pose and in accordance with a determination that the difference between the first and second head poses indicates a motion that satisfies a second motion criterion different from the first motion criterion, changing an appearance of the virtual content 852 — Changing the appearance of the virtual content corresponds to one of blurring or fading-out the virtual content 854A — The motion satisfies the second motion criterion when the motion corresponds to the rotational motion with at least one of an angular displacement value, an angular velocity value, an angular acceleration value, or an angular jerk value that exceeds the second motion criterion 854B — The motion satisfies the second motion criterion when the motion corresponds to the translational motion with at least one of a translational displacement value, a translational velocity value, a translational acceleration value, or a translational jerk value that exceeds the second motion criterion

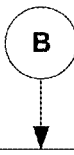

860 — In response to detecting the change to the second head pose and in accordance with a determination that the difference between the first and second head poses indicates a motion that does not satisfy the first motion criterion or the second motion criterion, maintaining presentation of the virtual content in the first presentation mode at the first location

┌─────────────────────────────────────────────────────────────┐
│ While detecting a first head pose, presenting, via the display device, │ ⎯ 1502
│ virtual content at a first location that is a first set of offset values │
│ relative to the first head pose                              │
└─────────────────────────────────────────────────────────────┘
                              ▼
┌─────────────────────────────────────────────────────────────┐
│ Detect, via the one or more input devices, a change from the first │ ⎯ 1504
│ head pose to a second head pose associated with a yaw or pitch │
│ head motion                                                  │
└─────────────────────────────────────────────────────────────┘
                              ▼
┌─────────────────────────────────────────────────────────────┐
│ In response to detecting the change to the second head pose │
│ associated with the yaw or pitch head motion, move, via the display │
│ device, the virtual content away from the first location towards a │
│ second location that is the first set of offset values relative to the │
│ second head pose, wherein a rate at which the virtual content is │
│ moved is based on a distance between the virtual content and the │ ⎯ 1506
│ second location, and wherein at least a portion of the virtual content │
│ is maintained within a bounding box relative to a display space │
│ associated with the display device                           │
└─────────────────────────────────────────────────────────────┘

Figure 15

METHOD AND DEVICE FOR IMPROVING COMFORTABILITY OF VIRTUAL CONTENT

CROSS-REFERENCE TO RELATED APPLICATIONS

This application is claims priority to U.S. Provisional Patent App. No. 63/333,012, filed on Apr. 20, 2022 and U.S. Provisional Patent App. No. 63/454,212, filed on Mar. 23, 2023, which are hereby incorporated by reference in their entireties.

TECHNICAL FIELD

The present disclosure generally relates to presenting virtual content and, in particular, to systems, devices, and methods for improving comfortability of virtual content.

BACKGROUND

Head-locked content is typically expected to remain stationary within a user's field of view during rotational head movements. However, device limitations and properties of the human visual system may cause the head-locked content to appear jumpy or jittery in relation to the environment on which it is overlaid or composited with.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 8A-8C illustrate a flowchart representation of a method of improving comfortability of virtual content in accordance with some implementations.

FIG. 15 illustrates a flowchart representation of a method of improving comfortability of virtual content during head yaw or pitch motions in accordance with some implementations.

Figure 1:
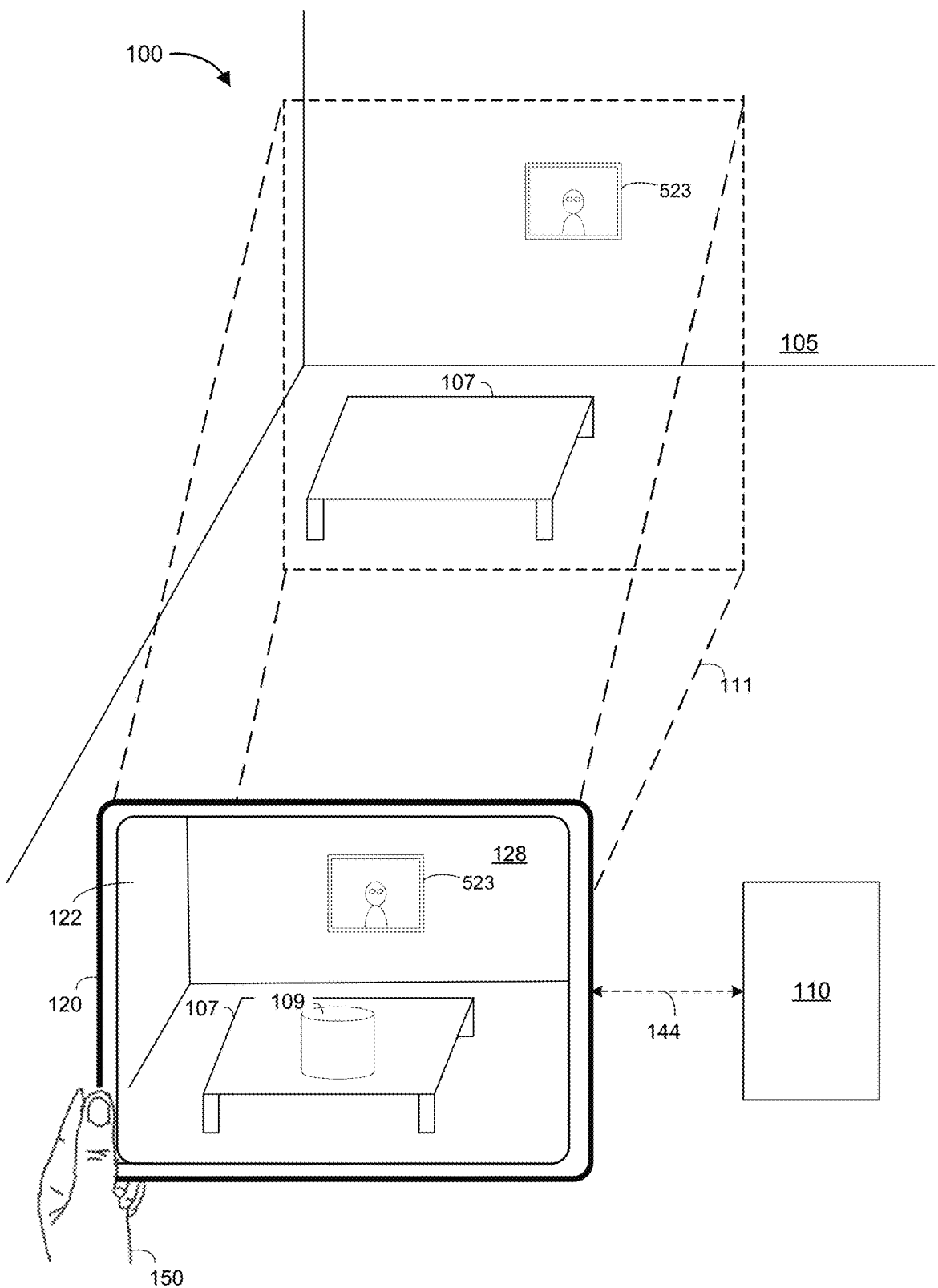
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for improving comfortability of virtual content. According to some implementations, the method is performed at a computing system including non-transitory memory and one or more processors, wherein the computing system is communicatively coupled to a display device and one or more input devices. The method includes: while detecting a first head pose, presenting, via the display device, virtual content in a first presentation mode at a first location that is a first set of offset values relative to the first head pose; detecting, via the one or more input devices, a change from the first head pose to a second head pose; and in response to detecting the change to the second head pose: in accordance with a determination that the difference between the first and second head poses indicates a motion that satisfies a first motion criterion, presenting, via the display device, the virtual content in a second presentation mode while moving the virtual content away from the first location towards a second location that is the first set of offset values relative to the second head pose; and in accordance with a determination that the difference between the first and second head poses indicates a motion that satisfies a second motion criterion different from the first motion criterion, changing an appearance of the virtual content.

Various implementations disclosed herein include devices, systems, and methods for improving comfortability of virtual content during head roll motions. According to some implementations, the method is performed at a computing system including non-transitory memory and one or more processors, wherein the computing system is communicatively coupled to a display device and one or more input devices. The method includes: determining a scene roll origin value associated with an extended reality (XR) environment; detecting, via the one or more input devices, a first head pose comprising a first pose roll value; in accordance with a determination that the difference between the scene roll origin value and the first pose roll value is less than a first angular threshold, presenting, via the display device, virtual content within the XR environment in a first presentation mode while detecting the first head pose, wherein the virtual content is presented with a first content roll value in the first presentation mode based the first pose roll value associated with the first head pose; and in accordance with a determination that the difference between the scene roll origin value and the first pose roll value is not less than the first angular threshold, presenting, via the display device, the virtual content within the XR environment in a second presentation mode different from the first presentation mode while detecting the first head pose, wherein the virtual content is presented with a second content roll value in the second presentation mode based on the scene roll origin value.

Various implementations disclosed herein include devices, systems, and methods for improving comfortability of virtual content during head yaw or pitch motions. According to some implementations, the method is performed at a computing system including non-transitory memory and one or more processors, wherein the computing system is communicatively coupled to a display device and one or more input devices. The method includes: while detecting a first head pose, presenting, via the display device, virtual content at a first location that is a first set of offset values relative to the first head pose; detecting, via the one or more input devices, a change from the first head pose to a second head pose associated with a yaw or pitch head motion; and in response to detecting the change to the second head pose associated with the yaw or pitch head motion, moving, via the display device, the virtual content away from the first location towards a second location that is the first set of offset values relative to the second head pose, wherein a rate at which the virtual content is moved is based on a distance between the virtual content and the second location, and wherein at least a portion of the virtual content is maintained within a bounding box relative to a display space associated with the display device.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate an XR experience (sometimes also referred to herein as a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 and a portrait 523 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "graphical content" or "virtual content"), including an XR cylinder 109, and to enable video pass-through of the physical environment 105 (e.g., including the table 107 and the portrait 523 (or representations thereof)) on a display 122. For example, the XR environment 128, including the XR cylinder 109, is volumetric or three-dimensional (3D).

In one example, the XR cylinder 109 corresponds to head/display-locked content such that the XR cylinder 109 remains displayed at the same location on the display 122 as the FOV 111 changes due to translational and/or rotational movement of the electronic device 120. As another example, the XR cylinder 109 corresponds to world/object-locked content such that the XR cylinder 109 remains displayed at its origin location as the FOV 111 changes due to translational and/or rotational movement of the electronic device 120. As such, in this example, if the FOV 111 does not include the origin location, the displayed XR environment 128 will not include the XR cylinder 109. As another example, the XR cylinder 109 corresponds to body-locked content such that it remains at a positional and rotational offset from the body of the user 150. In some examples, the electronic device 120 corresponds to a near-eye system, mobile phone, tablet, laptop, wearable computing device, or the like.

In some implementations, the display 122 corresponds to an additive display that enables optical see-through of the physical environment 105 including the table 107 and the portrait 523. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
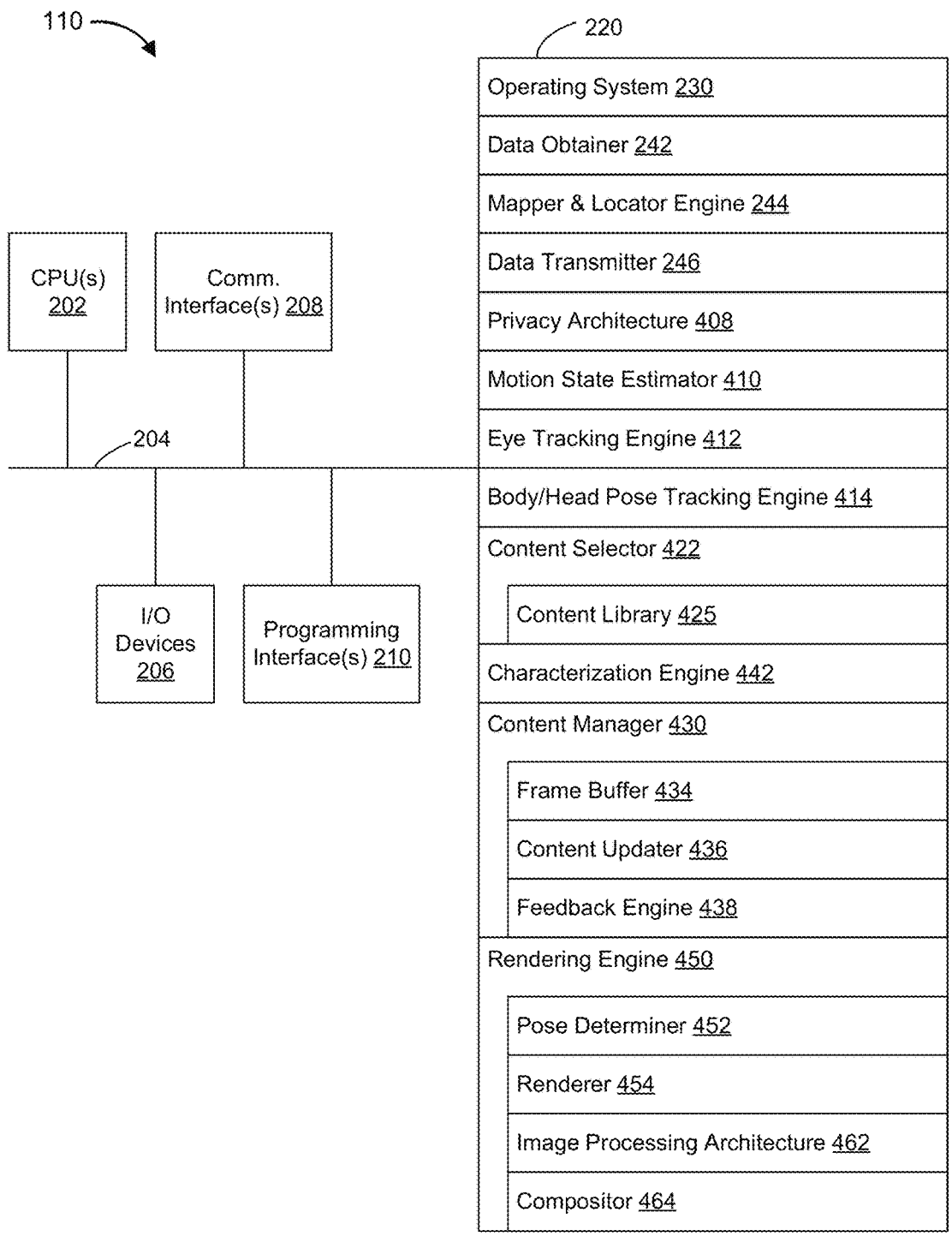
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a touchscreen, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof described below with respect to FIG. 2.

An operating system 230 includes procedures for handling various basic system services and for performing hardware dependent tasks.

In some implementations, a data obtainer 242 is configured to obtain data (e.g., captured image frames of the physical environment 105, presentation data, input data, user interaction data, camera pose tracking information, eye tracking information, head/body pose tracking information, hand/limb/finger/extremity tracking information, sensor data, location data, etc.) from at least one of the I/O devices 206 of the controller 110, the I/O devices and sensors 306 of the electronic device 120, and the optional remote input devices. To that end, in various implementations, the data obtainer 242 includes instructions and/or logic therefor, and heuristics and metadata therefor.

In some implementations, a mapper and locator engine 244 is configured to map the physical environment 105 and to track the position/location of at least the electronic device 120 or the user 150 with respect to the physical environment 105. To that end, in various implementations, the mapper and locator engine 244 includes instructions and/or logic therefor, and heuristics and metadata therefor.

In some implementations, a data transmitter 246 is configured to transmit data (e.g., presentation data such as rendered image frames associated with the XR environment, location data, etc.) to at least the electronic device 120 and optionally one or more other devices. To that end, in various implementations, the data transmitter 246 includes instructions and/or logic therefor, and heuristics and metadata therefor.

In some implementations, a privacy architecture 408 is configured to ingest data and filter user information and/or identifying information within the data based on one or more privacy filters. The privacy architecture 408 is described in more detail below with reference to FIG. 4A. To that end, in various implementations, the privacy architecture 408 includes instructions and/or logic therefor, and heuristics and metadata therefor.

In some implementations, a motion state estimator 410 is configured to obtain (e.g., receive, retrieve, or determine/generate) a motion state vector 411 associated with the electronic device 120 (and the user 150) (e.g., including a current motion state associated with the electronic device 120) based on input data and update the motion state vector 411 overtime. For example, as shown in FIG. 4B, the motion state vector 411 includes a motion state descriptor 472 for the electronic device 120 (e.g., stationary, in-motion, walking, running, cycling, operating or riding in an automobile car, operating or riding in a boat, operating or riding in a bus, operating or riding in a train, operating or riding in an aircraft, or the like), translational movement values 474 associated with the electronic device 120 (e.g., a heading, a velocity value, an acceleration value, etc.), angular movement values 476 associated with the electronic device 120 (e.g., an angular velocity value, an angular acceleration value, and/or the like for each of the pitch, roll, and yaw dimensions), and/or the like. The motion state estimator 410 is described in more detail below with reference to FIG. 4A. To that end, in various implementations, the motion state estimator 410 includes instructions and/or logic therefor, and heuristics and metadata therefor.

In some implementations, an eye tracking engine 412 is configured to obtain (e.g., receive, retrieve, or determine/generate) an eye tracking vector 413 as shown in FIG. 4B (e.g., with a gaze direction) based on the input data and update the eye tracking vector 413 over time. For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a ROI in the XR environment 128 at which the user 150 is currently looking. The eye tracking engine 412 is described in more detail below with reference to FIG. 4A. To that end, in various implementations, the eye tracking engine 412 includes instructions and/or logic therefor, and heuristics and metadata therefor.

In some implementations, a body/head pose tracking engine 414 is configured to obtain (e.g., receive, retrieve, or determine/generate) a pose characterization vector 415 based on the input data and update the pose characterization vector 415 over time. For example, as shown in FIG. 4B, the pose characterization vector 415 includes a head pose descriptor 492A (e.g., upward, downward, neutral, etc.), translational values 492B for the head pose, rotational values 492C for the head pose, a body pose descriptor 494A (e.g., standing, sitting, prone, etc.), translational values 494B for body sections/extremities/limbs/joints, rotational values 494C for the body sections/extremities/limbs/joints, and/or the like. The body/head pose tracking engine 414 is described in more detail below with reference to FIG. 4A. To that end, in various implementations, the body/head pose tracking engine 414 includes instructions and/or logic therefor, and heuristics and metadata therefor. In some implementations, the motion state estimator 410, the eye tracking engine 412, and the body/head pose tracking engine 414 may be located on the electronic device 120 in addition to or in place of the controller 110.

In some implementations, a content selector 422 is configured to select XR content (sometimes also referred to herein as "graphical content" or "virtual content") from a content library 425 based on one or more user requests and/or inputs (e.g., a voice command, a selection from a user interface (UI) menu of XR content items or virtual agents (VAs), and/or the like). The content selector 422 is described in more detail below with reference to FIG. 4A. To that end, in various implementations, the content selector 422 includes instructions and/or logic therefor, and heuristics and metadata therefor.

In some implementations, a content library 425 includes a plurality of content items such as audio/visual (A/V) content, virtual agents (VAs), and/or XR content, objects, items, scenery, etc. As one example, the XR content includes 3D reconstructions of user captured videos, movies, TV episodes, and/or other XR content. In some implementations, the content library 425 is pre-populated or manually authored by the user 150. In some implementations, the content library 425 is located local relative to the controller 110. In some implementations, the content library 425 is located remote from the controller 110 (e.g., at a remote server, a cloud server, or the like).

Figure 4A:
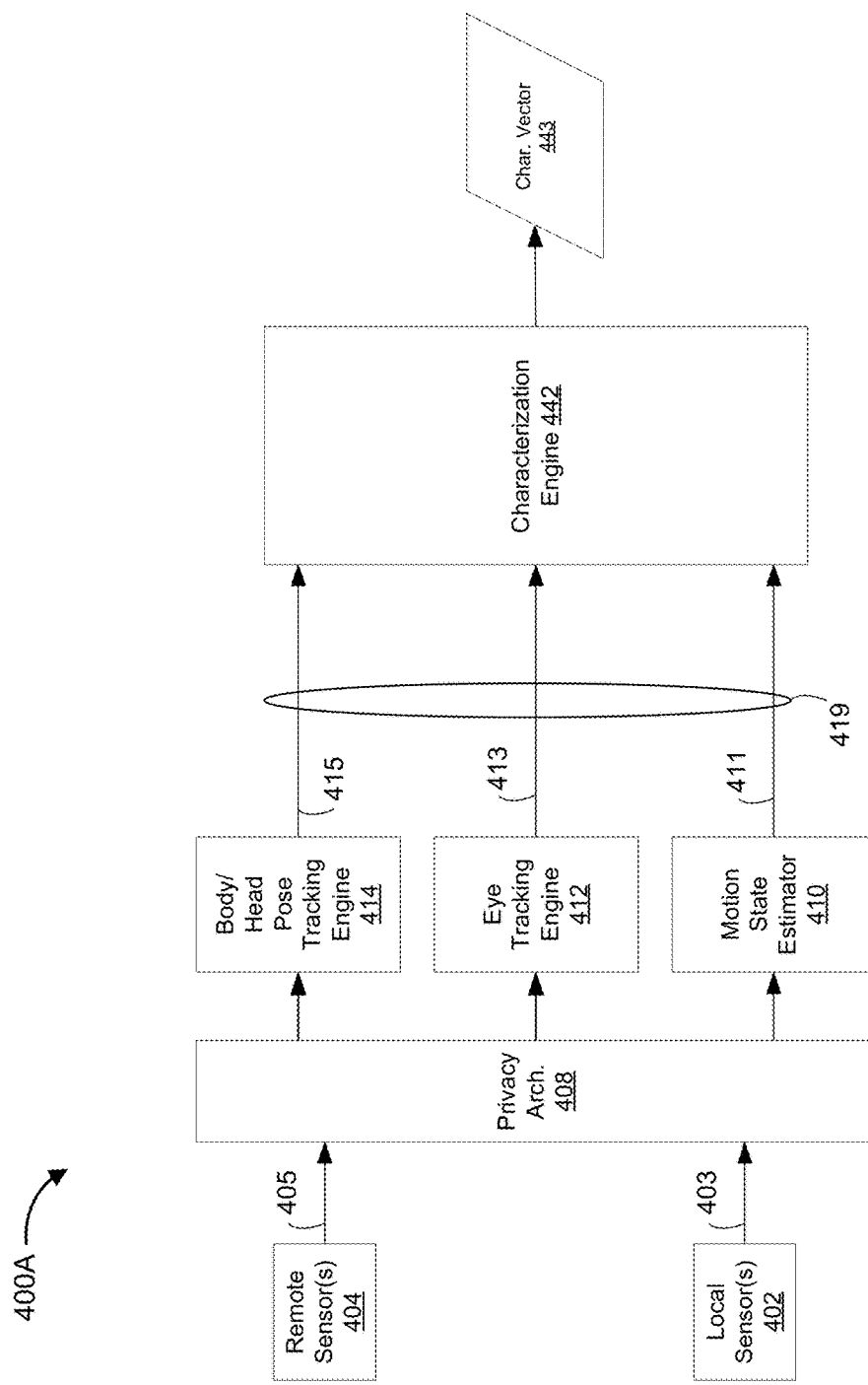
FIG. 4A is a block diagram of a first portion of an example content delivery architecture in accordance with some implementations.
Figure 4B:
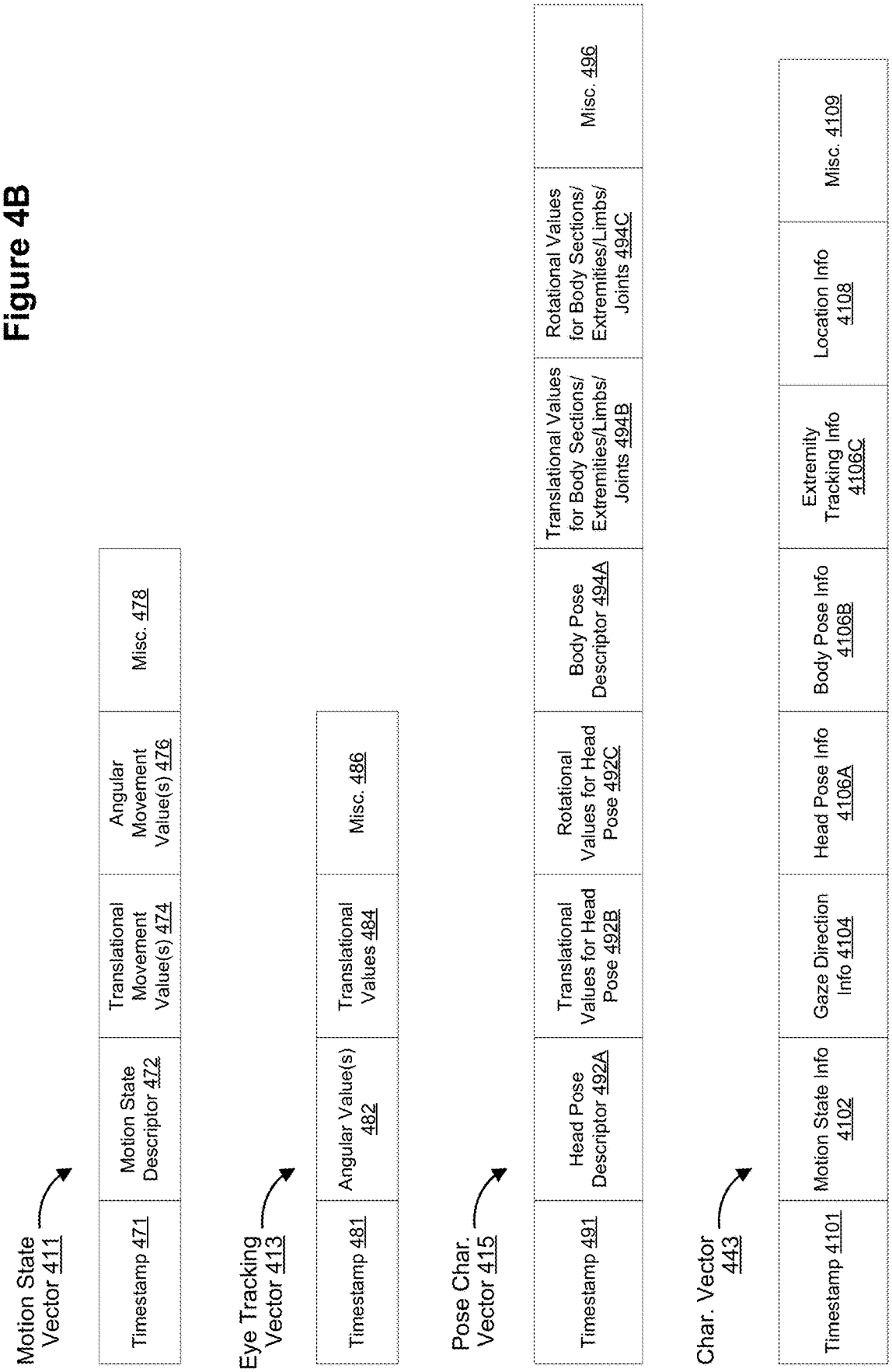
FIG. 4B illustrates example data structures in accordance with some implementations.

In some implementations, a characterization engine 442 is configured to determine/generate a characterization vector 443 based on at least one of the motion state vector 411, the eye tracking vector 413, and the pose characterization vector 415 as shown in FIG. 4A. In some implementations, the characterization engine 442 is also configured to update the pose characterization vector 443 over time. As shown in FIG. 4B, the characterization vector 443 includes motion state information 4102, gaze direction information 4104, head pose information 4106A, body pose information 4106B, extremity tracking information 4106C, location information 4108, and/or the like. The characterization engine 442 is described in more detail below with reference to FIG. 4A. To that end, in various implementations, the characterization engine 442 includes instructions and/or logic therefor, and heuristics and metadata therefor.

In some implementations, a content manager 430 is configured to manage and update the layout, setup, structure, and/or the like for the XR environment 128 including one or more of VA(s), XR content, one or more user interface (UI) elements associated with the XR content, and/or the like. The content manager 430 is described in more detail below with reference to FIG. 4C. To that end, in various implementations, the content manager 430 includes instructions and/or logic therefor, and heuristics and metadata therefor. In some implementations, the content manager 430 includes a frame buffer 434, a content updater 436, and a feedback engine 438. In some implementations, the frame buffer 434 includes XR content, a rendered image frame, and/or the like for one or more past instances and/or frames.

In some implementations, the content updater 436 is configured to modify the XR environment 128 over time based on translational or rotational movement of the electronic device 120 or physical objects within the physical environment 105, user inputs (e.g., a change in context, hand/extremity tracking inputs, eye tracking inputs, touch inputs, voice commands, modification/manipulation inputs with the physical object, and/or the like), and/or the like. To that end, in various implementations, the content updater 436 includes instructions and/or logic therefor, and heuristics and metadata therefor.

In some implementations, the feedback engine 438 is configured to generate sensory feedback (e.g., visual feedback such as text or lighting changes, audio feedback, haptic feedback, etc.) associated with the XR environment 128. To that end, in various implementations, the feedback engine 438 includes instructions and/or logic therefor, and heuristics and metadata therefor.

In some implementations, a rendering engine 450 is configured to render an XR environment 128 (sometimes also referred to herein as a "graphical environment" or "virtual environment") or image frame associated therewith as well as the VA(s), XR content, one or more UI elements associated with the XR content, and/or the like. To that end, in various implementations, the rendering engine 450 includes instructions and/or logic therefor, and heuristics and metadata therefor. In some implementations, the rendering engine 450 includes a pose determiner 452, a renderer 454, an optional image processing architecture 462, and an optional compositor 464. One of ordinary skill in the art will appreciate that the optional image processing architecture 462 and the optional compositor 464 may be present for video pass-through configurations but may be removed for fully VR or optical see-through configurations.

In some implementations, the pose determiner 452 is configured to determine a current camera pose of the electronic device 120 and/or the user 150 relative to the A/V content and/or XR content. The pose determiner 452 is described in more detail below with reference to FIG. 4A. To that end, in various implementations, the pose determiner 452 includes instructions and/or logic therefor, and heuristics and metadata therefor.

In some implementations, the renderer 454 is configured to render the A/V content and/or the XR content according to the current camera pose relative thereto. The renderer 454 is described in more detail below with reference to FIG. 4A. To that end, in various implementations, the renderer 454 includes instructions and/or logic therefor, and heuristics and metadata therefor.

In some implementations, the image processing architecture 462 is configured to obtain (e.g., receive, retrieve, or capture) an image stream including one or more images of the physical environment 105 from the current camera pose of the electronic device 120 and/or the user 150. In some implementations, the image processing architecture 462 is also configured to perform one or more image processing operations on the image stream such as warping, color correction, gamma correction, sharpening, noise reduction, white balance, and/or the like. The image processing architecture 462 is described in more detail below with reference to FIG. 4A. To that end, in various implementations, the image processing architecture 462 includes instructions and/or logic therefor, and heuristics and metadata therefor.

In some implementations, the compositor 464 is configured to composite the rendered A/V content and/or XR content with the processed image stream of the physical environment 105 from the image processing architecture 462 to produce rendered image frames of the XR environment 128 for display. The compositor 464 is described in more detail below with reference to FIG. 4A. To that end, in various implementations, the compositor 464 includes instructions and/or logic therefor, and heuristics and metadata therefor.

Although the data obtainer 242, the mapper and locator engine 244, the data transmitter 246, the privacy architecture 408, the motion state estimator 410, the eye tracking engine 412, the body/head pose tracking engine 414, the content selector 422, the content manager 430, the operation modality manager 440, and the rendering engine 450 are shown as residing on a single device (e.g., the controller 110), it should be understood that in other implementations, any combination of the data obtainer 242, the mapper and locator engine 244, the data transmitter 246, the privacy architecture 408, the motion state estimator 410, the eye tracking engine 412, the body/head pose tracking engine 414, the content selector 422, the content manager 430, the operation modality manager 440, and the rendering engine 450 may be located in separate computing devices.

In some implementations, the functions and/or components of the controller 110 are combined with or provided by the electronic device 120 shown below in FIG. 3. Moreover, FIG. 2 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
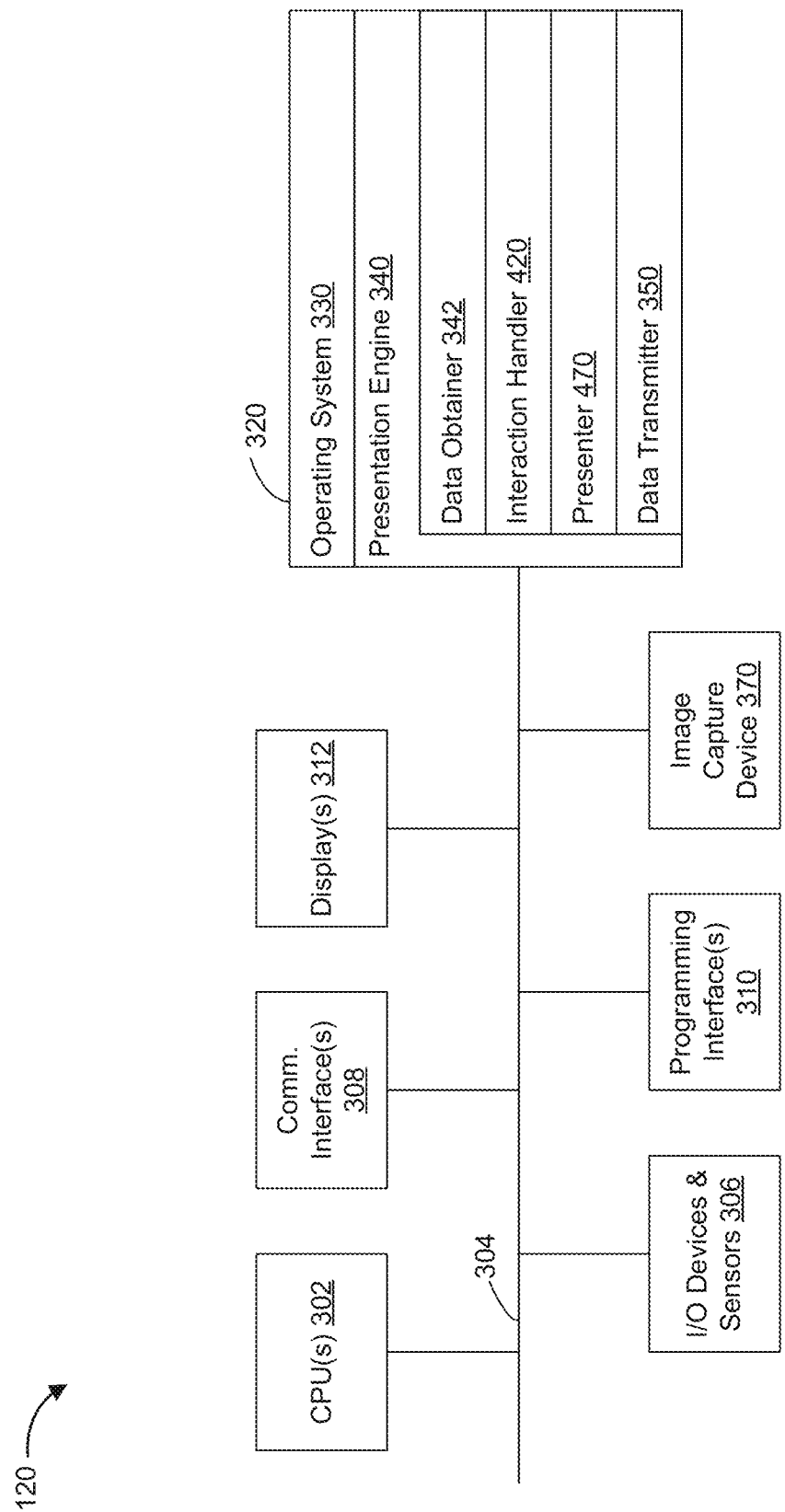
FIG. 3 is a block diagram of an example electronic device in accordance with some implementations.

FIG. 3 is a block diagram of an example of the electronic device 120 (e.g., a mobile phone, tablet, laptop, near-eye system, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, an image capture device 370 (e.g., one or more optional interior- and/or exterior-facing image sensors), a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oximetry monitor, blood glucose monitor, etc.), one or more microphones, one or more speakers, a haptics engine, a heating and/or cooling unit, a skin shear engine, one or more depth sensors (e.g., structured light, time-of-flight, LiDAR, or the like), a localization and mapping engine, an eye tracking engine, a body/head pose tracking engine, a hand/limb/finger/extremity tracking engine, a camera pose tracking engine, and/or the like.

In some implementations, the one or more displays 312 are configured to present the XR environment to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the image capture device 370 correspond to one or more RGB cameras (e.g., with a complementary metal-oxide-semiconductor (CMOS) image sensor or a charge-coupled device (CCD) image sensor), IR image sensors, event-based cameras, and/or the like. In some implementations, the image capture device 370 includes a lens assembly, a photodiode, and a front-end architecture. In some implementations, the image capture device 370 includes exterior-facing and/or interior-facing image sensors.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present media items and/or XR content to the user via the one or more displays 312. To that end, in various implementations, the presentation engine 340 includes a data obtainer 342, a presenter 470, an interaction handler 420, and a data transmitter 350.

In some implementations, the data obtainer 342 is configured to obtain data (e.g., presentation data such as rendered image frames associated with the user interface or the XR environment, input data, user interaction data, head tracking information, camera pose tracking information, eye tracking information, hand/limb/finger/extremity tracking information, sensor data, location data, etc.) from at least one of the I/O devices and sensors 306 of the electronic device 120, the controller 110, and the remote input devices. To that end, in various implementations, the data obtainer 342 includes instructions and/or logic therefor, and heuristics and metadata therefor.

In some implementations, the interaction handler 420 is configured to detect user interactions with the presented A/V content and/or XR content (e.g., gestural inputs detected via hand/extremity tracking, eye gaze inputs detected via eye tracking, voice commands, etc.). To that end, in various implementations, the interaction handler 420 includes instructions and/or logic therefor, and heuristics and metadata therefor.

In some implementations, the presenter 470 is configured to present and update A/V content and/or XR content (e.g., the rendered image frames associated with the user interface or the XR environment 128 including the VA(s), the XR content, one or more UI elements associated with the XR content, and/or the like) via the one or more displays 312. To that end, in various implementations, the presenter 470 includes instructions and/or logic therefor, and heuristics and metadata therefor.

In some implementations, the data transmitter 350 is configured to transmit data (e.g., presentation data, location data, user interaction data, head tracking information, camera pose tracking information, eye tracking information, hand/limb/finger/extremity tracking information, etc.) to at least the controller 110. To that end, in various implementations, the data transmitter 350 includes instructions and/or logic therefor, and heuristics and metadata therefor.

Although the data obtainer 342, the interaction handler 420, the presenter 470, and the data transmitter 350 are shown as residing on a single device (e.g., the electronic device 120), it should be understood that in other implementations, any combination of the data obtainer 342, the interaction handler 420, the presenter 470, and the data transmitter 350 may be located in separate computing devices.

Moreover, FIG. 3 is intended more as a functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4A is a block diagram of a first portion 400A of an example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the controller 110 shown in FIGS. 1 and 2; the electronic device 120 shown in FIGS. 1 and 3; and/or a suitable combination thereof.

As shown in FIG. 4A, one or more local sensors 402 of the controller 110, the electronic device 120, and/or a combination thereof obtain local sensor data 403 associated with the physical environment 105. For example, the local sensor data 403 includes images or a stream thereof of the physical environment 105, simultaneous location and mapping (SLAM) information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the local sensor data 403 includes un-processed or post-processed information.

Similarly, as shown in FIG. 4A, one or more remote sensors 404 associated with the optional remote input devices within the physical environment 105 obtain remote sensor data 405 associated with the physical environment 105. For example, the remote sensor data 405 includes images or a stream thereof of the physical environment 105, SLAM information for the physical environment 105 and the location of the electronic device 120 or the user 150 relative to the physical environment 105, ambient lighting information for the physical environment 105, ambient audio information for the physical environment 105, acoustic information for the physical environment 105, dimensional information for the physical environment 105, semantic labels for objects within the physical environment 105, and/or the like. In some implementations, the remote sensor data 405 includes un-processed or post-processed information.

According to some implementations, the privacy architecture 408 ingests the local sensor data 403 and the remote sensor data 405. In some implementations, the privacy architecture 408 includes one or more privacy filters associated with user information and/or identifying information. In some implementations, the privacy architecture 408 includes an opt-in feature where the electronic device 120 informs the user 150 as to what user information and/or identifying information is being monitored and how the user information and/or the identifying information will be used. In some implementations, the privacy architecture 408 selectively prevents and/or limits the content delivery architecture 400A/400B or portions thereof from obtaining and/or transmitting the user information. To this end, the privacy architecture 408 receives user preferences and/or selections from the user 150 in response to prompting the user 150 for the same. In some implementations, the privacy architecture 408 prevents the content delivery architecture 400A/400B from obtaining and/or transmitting the user information unless and until the privacy architecture 408 obtains informed consent from the user 150. In some implementations, the privacy architecture 408 anonymizes (e.g., scrambles, obscures, encrypts, and/or the like) certain types of user information. For example, the privacy architecture 408 receives user inputs designating which types of user information the privacy architecture 408 anonymizes. As another example, the privacy architecture 408 anonymizes certain types of user information likely to include sensitive and/or identifying information, independent of user designation (e.g., automatically).

According to some implementations, the motion state estimator 410 obtains the local sensor data 403 and the remote sensor data 405 after it has been subjected to the privacy architecture 408. In some implementations, the motion state estimator 410 obtains (e.g., receives, retrieves, or determines/generates) a motion state vector 411 based on the input data and updates the motion state vector 411 over time.

FIG. 4B shows an example data structure for the motion state vector 411 in accordance with some implementations. As shown in FIG. 4B, the motion state vector 411 may correspond to an N-tuple characterization vector or characterization tensor that includes a timestamp 471 (e.g., the most recent time the motion state vector 411 was updated), a motion state descriptor 472 for the electronic device 120 (e.g., stationary, in-motion, car, boat, bus, train, plane, or the like), translational movement values 474 associated with the electronic device 120 (e.g., a heading, a velocity value, an acceleration value, etc.), angular movement values 476 associated with the electronic device 120 (e.g., an angular velocity value, an angular acceleration value, and/or the like for each of the pitch, roll, and yaw dimensions), and/or miscellaneous information 478. One of ordinary skill in the art will appreciate that the data structure for the motion state vector 411 in FIG. 4B is merely an example that may include different information portions in various other implementations and be structured in myriad ways in various other implementations.

According to some implementations, the eye tracking engine 412 obtains the local sensor data 403 and the remote sensor data 405 after it has been subjected to the privacy architecture 408. In some implementations, the eye tracking engine 412 obtains (e.g., receives, retrieves, or determines/generates) an eye tracking vector 413 based on the input data and updates the eye tracking vector 413 over time.

FIG. 4B shows an example data structure for the eye tracking vector 413 in accordance with some implementations. As shown in FIG. 4B, the eye tracking vector 413 may correspond to an N-tuple characterization vector or characterization tensor that includes a timestamp 481 (e.g., the most recent time the eye tracking vector 413 was updated), one or more angular values 482 for a current gaze direction (e.g., roll, pitch, and yaw values), one or more translational values 484 for the current gaze direction (e.g., x, y, and z values relative to the physical environment 105, the world-at-large, and/or the like), and/or miscellaneous information 486. One of ordinary skill in the art will appreciate that the data structure for the eye tracking vector 413 in FIG. 4B is merely an example that may include different information portions in various other implementations and be structured in myriad ways in various other implementations.

For example, the gaze direction indicates a point (e.g., associated with x, y, and z coordinates relative to the physical environment 105 or the world-at-large), a physical object, or a region of interest (ROI) in the physical environment 105 at which the user 150 is currently looking. As another example, the gaze direction indicates a point (e.g., associated with x, y, and z coordinates relative to the XR environment 128), an XR object, or a region of interest (ROI) in the XR environment 128 at which the user 150 is currently looking.

According to some implementations, the body/head pose tracking engine 414 obtains the local sensor data 403 and the remote sensor data 405 after it has been subjected to the privacy architecture 408. In some implementations, the body/head pose tracking engine 414 obtains (e.g., receives, retrieves, or determines/generates) a pose characterization vector 415 based on the input data and updates the pose characterization vector 415 over time.

FIG. 4B shows an example data structure for the pose characterization vector 415 in accordance with some implementations. As shown in FIG. 4B, the pose characterization vector 415 may correspond to an N-tuple characterization vector or characterization tensor that includes a timestamp 491 (e.g., the most recent time the pose characterization vector 415 was updated), a head pose descriptor 492A (e.g., upward, downward, neutral, etc.), translational values for the head pose 492B, rotational values for the head pose 492C, a body pose descriptor 494A (e.g., standing, sitting, prone, etc.), translational values for body sections/extremities/limbs/joints 494B, rotational values for the body sections/extremities/limbs/joints 494C, and/or miscellaneous information 496. In some implementations, the pose characterization vector 415 also includes information associated with finger/hand/extremity tracking. One of ordinary skill in the art will appreciate that the data structure for the pose characterization vector 415 in FIG. 4B is merely an example that may include different information portions in various other implementations and be structured in myriad ways in various other implementations. According to some implementations, the motion state vector 411, the eye tracking vector 413 and the pose characterization vector 415 are collectively referred to as an input vector 419.

According to some implementations, the characterization engine 442 obtains the motion state vector 411, the eye tracking vector 413 and the pose characterization vector 415. In some implementations, the characterization engine 442 obtains (e.g., receives, retrieves, or determines/generates) the characterization vector 443 based on the motion state vector 411, the eye tracking vector 413, and the pose characterization vector 415.

FIG. 4B shows an example data structure for the characterization vector 443 in accordance with some implementations. As shown in FIG. 4B, the characterization vector 443 may correspond to an N-tuple characterization vector or characterization tensor that includes a timestamp 4101 (e.g., the most recent time the characterization vector 443 was updated), motion state information 4102 (e.g., the motion state descriptor 472), gaze direction information 4104 (e.g., a function of the one or more angular values 482 and the one or more translational values 484 within the eye tracking vector 413), head pose information 4106A (e.g., the head pose descriptor 492A), body pose information 4106B (e.g., a function of the body pose descriptor 494A within the pose characterization vector 415), extremity tracking information 4106C (e.g., a function of the body pose descriptor 494A within the pose characterization vector 415 that is associated with extremities of the user 150 that are being tracked by the controller 110, the electronic device 120, and/or a combination thereof), location information 4108 (e.g., a household location such as a kitchen or living room, a vehicular location such as an automobile, plane, etc., and/or the like), and/or miscellaneous information 4109.

Figure 4C:
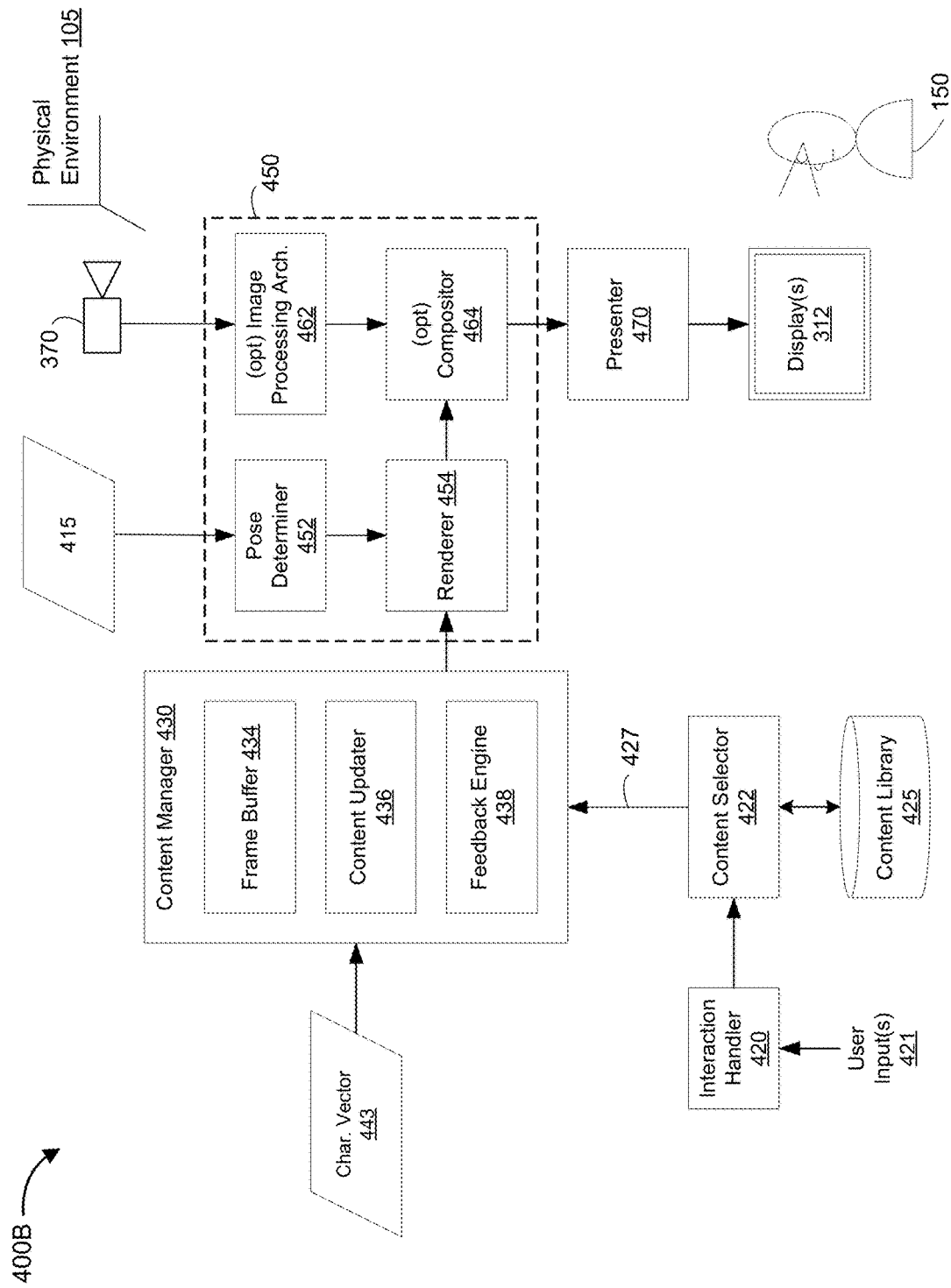
FIG. 4C is a block diagram of a second portion of the example content delivery architecture in accordance with some implementations.

FIG. 4C is a block diagram of a second portion 400B of the example content delivery architecture in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the content delivery architecture is included in a computing system such as the controller 110 shown in FIGS. 1 and 2; the electronic device 120 shown in FIGS. 1 and 3; and/or a suitable combination thereof. FIG. 4C is similar to and adapted from FIG. 4A. Therefore, similar reference numbers are used in FIGS. 4A and 4C. As such, only the differences between FIGS. 4A and 4C will be described below for the sake of brevity.

According to some implementations, the interaction handler 420 obtains (e.g., receives, retrieves, or detects) one or more user inputs 421 provided by the user 150 that are associated with selecting A/V content, one or more VAs, and/or XR content for presentation. For example, the one or more user inputs 421 correspond to a gestural input selecting XR content from a UI menu detected via hand/extremity tracking, an eye gaze input selecting XR content from the UI menu detected via eye tracking, a voice command selecting XR content from the UI menu detected via a microphone, and/or the like. In some implementations, the content selector 422 selects XR content 427 from the content library 425 based on one or more user inputs 421 (e.g., a voice command, a selection from a menu of XR content items, and/or the like).

In various implementations, the content manager 430 manages and updates the layout, setup, structure, and/or the like for the XR environment 128, including one or more of VAs, XR content, one or more UI elements associated with the XR content, and/or the like, based on the characterization vector 443, (optionally) the user inputs 421, and/or the like. To that end, the content manager 430 includes the frame buffer 434, the content updater 436, and the feedback engine 438.

In some implementations, the frame buffer 434 includes XR content, a rendered image frame, and/or the like for one or more past instances and/or frames. In some implementations, the content updater 436 modifies the XR environment 128 over time based on the characterization vector 443, the user inputs 421 associated with modifying and/or manipulating the XR content or VA(s), translational or rotational movement of objects within the physical environment 105, translational or rotational movement of the electronic device 120 (or the user 150), and/or the like. In some implementations, the feedback engine 438 generates sensory feedback (e.g., visual feedback such as text or lighting changes, audio feedback, haptic feedback, etc.) associated with the XR environment 128.

According to some implementations, the pose determiner 452 determines a current camera pose of the electronic device 120 and/or the user 150 relative to the XR environment 128 and/or the physical environment 105 based at least in part on the pose characterization vector 415. In some implementations, the renderer 454 renders the VA(s), the XR content 427, one or more UI elements associated with the XR content, and/or the like according to the current camera pose relative thereto.

According to some implementations, the optional image processing architecture 462 obtains an image stream from an image capture device 370 including one or more images of the physical environment 105 from the current camera pose of the electronic device 120 and/or the user 150. In some implementations, the image processing architecture 462 also performs one or more image processing operations on the image stream such as warping, color correction, gamma correction, sharpening, noise reduction, white balance, and/or the like. In some implementations, the optional compositor 464 composites the rendered XR content with the processed image stream of the physical environment 105 from the image processing architecture 462 to produce rendered image frames of the XR environment 128. In various implementations, the presenter 470 presents the rendered image frames of the XR environment 128 to the user 150 via the one or more displays 312. One of ordinary skill in the art will appreciate that the optional image processing architecture 462 and the optional compositor 464 may not be applicable for fully virtual environments (or optical see-through scenarios).

Figure 5A:
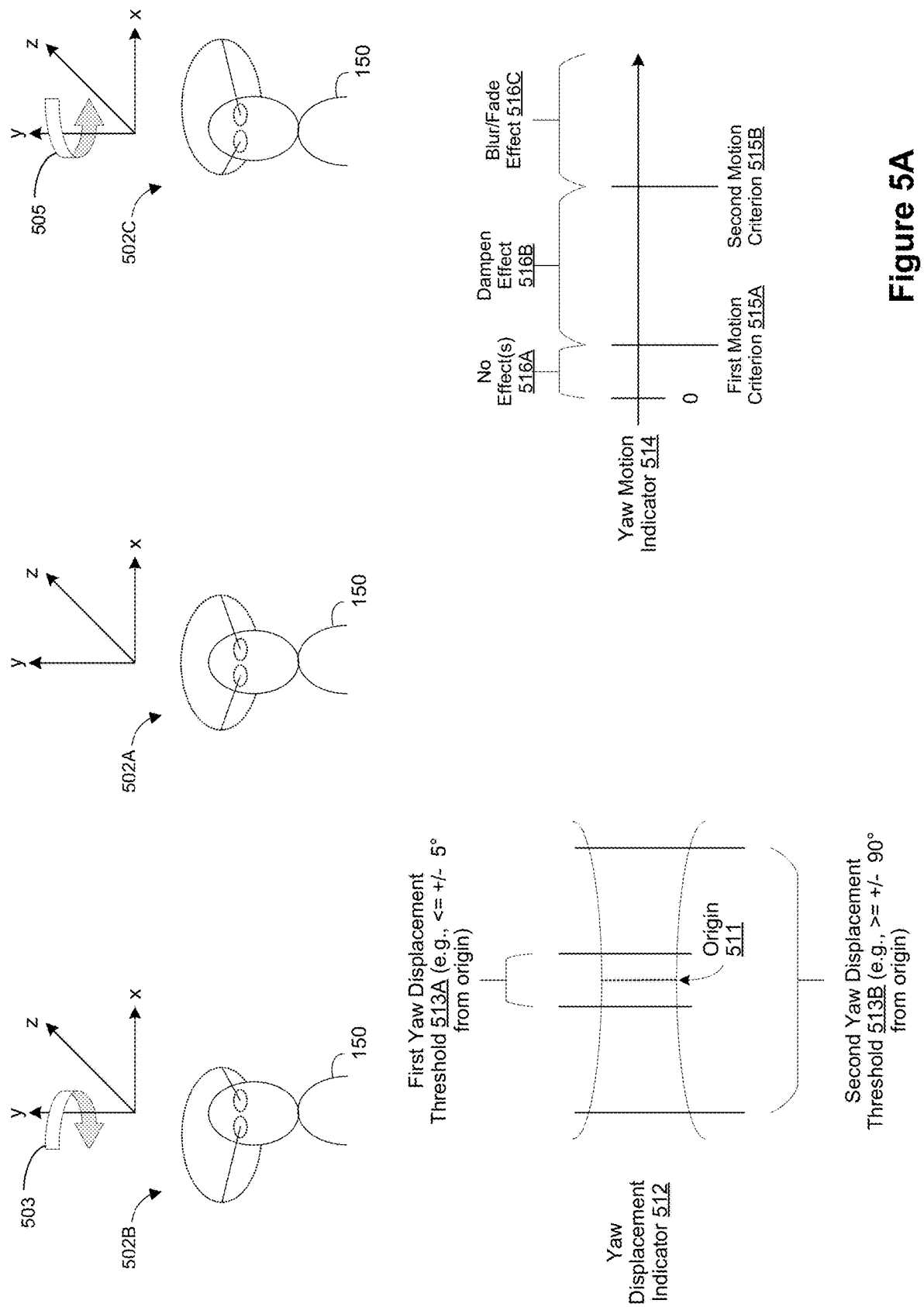
FIG. 5A illustrates an example scenario with yaw motion in accordance with some implementations.

FIG. 5A illustrates an example scenario with yaw motion in accordance with some implementations. FIG. 5A shows a second head pose 502B, which corresponds to a yaw angular motion 503 relative to a first head pose 502A (e.g., −45° yaw rotation relative to an origin). FIG. 5A also shows a third head pose 502C, which corresponds to yaw angular motion 505 relative to the first head pose 502A (e.g., 45° yaw rotation relative to the origin).

FIG. 5A also illustrates a yaw motion indicator 514 with a first motion criterion 515A (e.g., a first yaw displacement threshold value, a first yaw velocity threshold value, a first yaw acceleration threshold value, a first yaw jerk threshold value, or the like) and a second motion criterion 515B (e.g., a second yaw displacement threshold value, a second yaw velocity threshold value, a second yaw acceleration threshold value, a second yaw jerk threshold value, or the like). In some implementations, the computing system (e.g., the electronic device 120 shown in FIGS. 1 and 3; the controller 110 in FIGS. 1 and 2; or a suitable combination thereof) applies no effect(s) 516A to virtual content (e.g., a rigid follow mode) according to a determination that a yaw motion associated with a change between the first head pose 502A and the second head pose 502B or a change between the first head pose 502A and the third head pose 502C does not satisfy (e.g., does not exceed) the first motion criterion 515A (e.g., as shown in FIG. 5B).

Figure 5B:
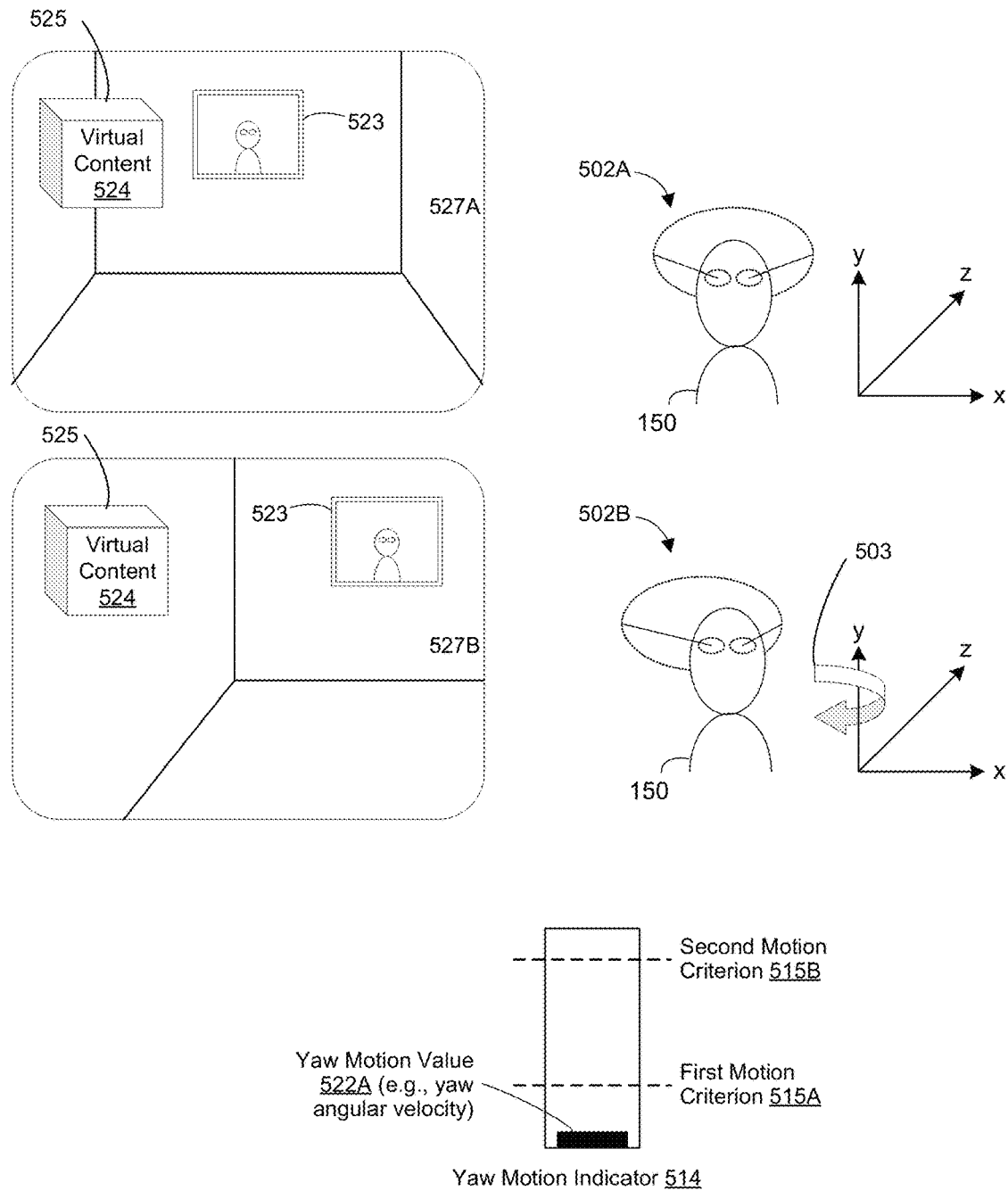
FIGS. 5B-5D illustrate different sequences of instances for a content delivery scenario in accordance with some implementations.
Figure 5C:
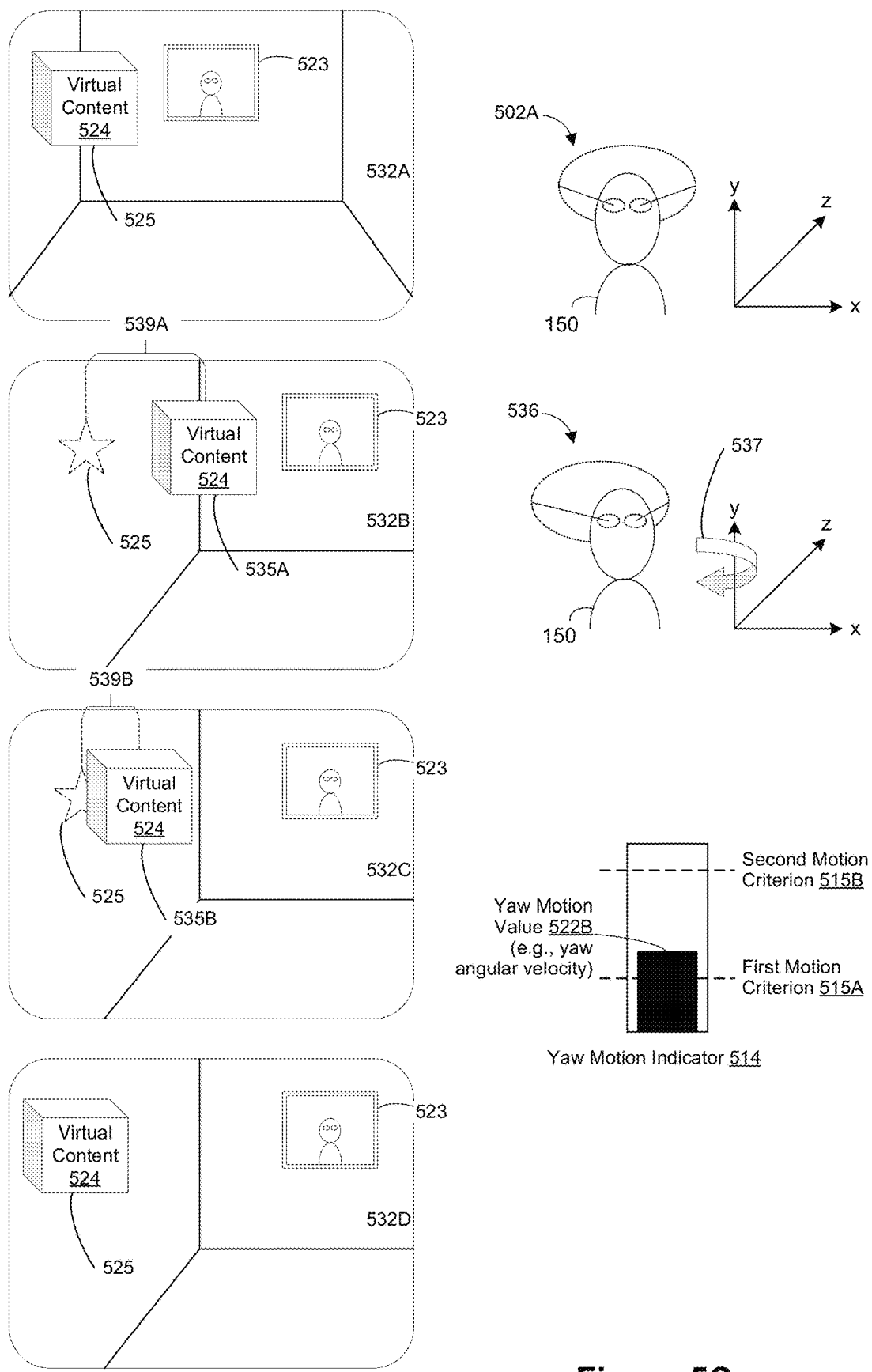
Figure 5D:
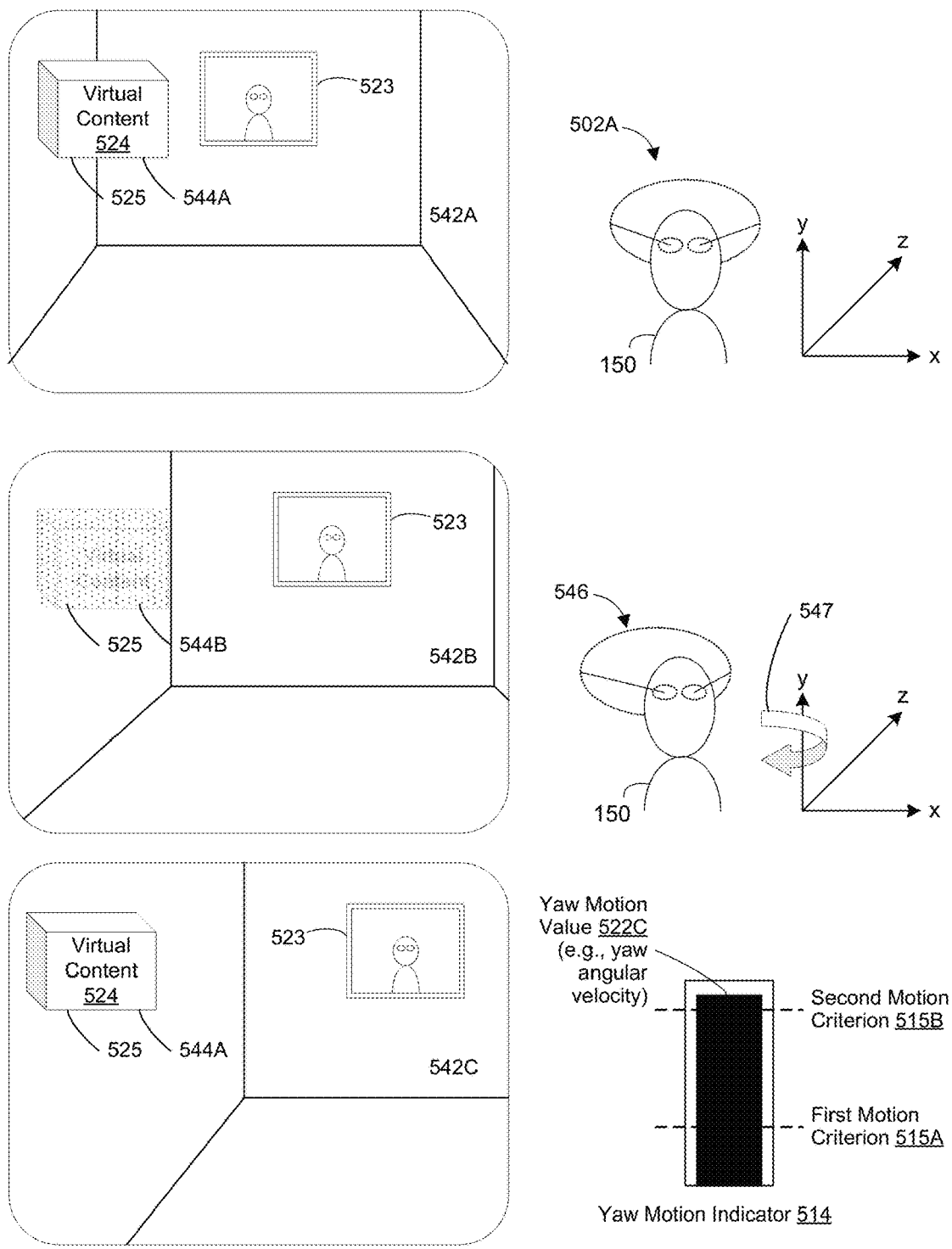

In some implementations, the computing system applies a dampening effect 516B (sometimes also herein referred to as a "delayed follow" or "lazy follow" mode) to the virtual content according to a determination that a yaw motion associated with a change between the first head pose 502A and the second head pose 502B or a change between the first head pose 502A and the third head pose 502C satisfies (e.g., exceeds) the first motion criterion 515A (e.g., as shown in FIG. 5C). According to some implementations, when the computing system applies the dampening effect 516B to the virtual content, the virtual content remains within the FOV of the user 150. For example, if the user performs a fast 1800 left-to-right rotation of their head, the computing system maintains the virtual content within the user's FOV while applying the dampening effect 516B, but the computing system may at least temporarily present the virtual content adjacent to the left edge of the user's FOV. In some implementations, the computing system applies a blurring or fade-out effect 516C to the virtual content according to a determination that a yaw motion associated with a change between the first head pose 502A and the second head pose 502B or a change between the first head pose 502A and the third head pose 502C satisfies (e.g., exceeds) the second motion criterion 515B (e.g., as shown in FIG. 5D). In some implementations, the computing system applies a blurring or fade-out effect 516C and the dampening effect 516B to the virtual content according to a determination that a yaw motion associated with a change between the first head pose 502A and the second head pose 502B or a change between the first head pose 502A and the third head pose 502C satisfies (e.g., exceeds) the second motion criterion 515B (e.g., as shown in FIG. 5D).

FIG. 5A further illustrates a yaw displacement indicator 512 with an origin 511 (e.g., corresponding to the first head pose 502A), a first yaw displacement threshold 513A (e.g., ≤+/−5° from the origin 511), and a second yaw displacement threshold 513B (e.g., ≥+/−90° from the origin 511). In some implementations, the computing system forgoes the effects 516B and 516C according to a determination that a yaw displacement value associated with the yaw motion is less than or equal to the first yaw displacement threshold 513A. In some implementations, the computing system forgoes the effects 516B and 516C according to a determination that a yaw displacement value associated with the yaw motion is greater than or equal to the second yaw displacement threshold 513B.

FIGS. 5B-5D illustrate different sequences of instances for a content delivery scenario in accordance with some implementations. FIG. 5B illustrates a sequence of instances 527A and 527B for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 527A and 527B are rendered and presented by a computing system such as the controller 110 shown in FIGS. 1 and 2; the electronic device 120 shown in FIGS. 1 and 3; and/or a suitable combination thereof.

For example, as shown in FIG. 5B, the sequence of instances 527A and 527B include a physical environment and an XR environment displayed on the display 122 of the electronic device 120 (e.g., associated with the user 150). The electronic device 120 presents the XR environment to the user 150 while the user 150 is physically present within the physical environment that includes a portrait 523, which is currently within the FOV 111 of an exterior-facing image sensor of the electronic device 120. As such, in some implementations, the user 150 holds the electronic device 120 in their hand(s) similar to the operating environment 100 in FIG. 1. In other words, in some implementations, the electronic device 120 is configured to present XR content (e.g., the virtual content 524) and to enable optical see-through or video pass-through of at least a portion of the physical environment 105 (e.g., the portrait 523) on the display 122. For example, the electronic device 120 corresponds to a mobile phone, tablet, laptop, near-eye system, wearable computing device, or the like.

For example, during the instance 527A (e.g., associated with time $T_1$), the electronic device 120 presents the virtual content 524 in a first presentation mode (e.g., head/display-locked mode) at a first location 525 while detecting the first head pose 502A. Continuing with this example, the electronic device 120 detects a change from the first head pose 502A to the second head pose 502B, which corresponds to the yaw angular motion 503 relative to the first head pose 502A (e.g., −45° yaw rotation relative to an origin).

As shown in FIG. 5B, the yaw motion indicator 514 indicates a yaw motion value 522A associated with the change from the first head pose 502A to the second head pose 502B. In this example, the yaw motion value 522A does not satisfy (e.g., exceed) the first motion criterion 515A. In some implementations, the yaw motion value 522A corresponds to one of an angular displacement value, an angular velocity value, an angular acceleration value, or an angular jerk value associated with the change from the first head pose 502A to the second head pose 502B.

For example, during the instance 527B (e.g., associated with time $T_2$), the electronic device 120 maintains presentation of the virtual content 524 in the first presentation mode (e.g., head/display-locked mode) at the first location 525 while detecting the second head pose 502B. According to some implementations, the virtual content corresponds to head/display-locked content that maintains its position on the display 122 in response to detecting a change to the head pose, body pose, motion state, and/or the like.

FIG. 5C illustrates a sequence of instances 532A, 532B, 532C, and 532D for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 532A, 532B, 532C, and 532D are rendered and presented by a computing system such as the controller 110 shown in FIGS. 1 and 2; the electronic device 120 shown in FIGS. 1 and 3; and/or a suitable combination thereof. FIG. 5C is similar to and adapted from FIG. 5B. Therefore, similar reference numbers are used in FIGS. 5B and 5C. As such, only the differences between FIGS. 5B and 5C will be described below for the sake of brevity.

For example, during the instance 532A (e.g., associated with time $T_1$), the electronic device 120 presents the virtual content 524 in a first presentation mode (e.g., head/display-locked mode) at a first location 525 while detecting the first head pose 502A. Continuing with this example, the electronic device 120 detects a change from the first head pose 502A to a second head pose 536, which corresponds to the yaw angular motion 537 relative to the first head pose 502A (e.g., −45° yaw rotation relative to an origin).

As shown in FIG. 5C, the yaw motion indicator 514 indicates a yaw motion value 522B associated with the change from the first head pose 502A to the second head pose 536. In this example, the yaw motion value 522B satisfies (e.g., exceeds) the first motion criterion 515A. In some implementations, the yaw motion value 522B corresponds to one of an angular displacement value, an angular velocity value, an angular acceleration value, or an angular jerk value associated with the change from the first head pose 502A to the second head pose 536.

For example, during the instance 532B (e.g., associated with time $T_2$), the electronic device 120 presents the virtual content 524 in a second presentation mode (e.g., lazy follow mode) at a second location 535A while detecting the second head pose 536. As shown in the instance 532B, a first positional offset 539A exists between the first location 525 and the second location 535A.

According to some implementations, as described above with reference to FIG. 5A, the electronic device 120 applies the dampening effect 516B (sometimes also herein referred to as "delayed follow" or "lazy follow") to the virtual content 524 according to a determination that the yaw motion value 522B associated with the change from the first head pose 502A to the second head pose 536 satisfies (e.g., exceeds) the first motion criterion 515A. As such, the electronic device 120 applies the dampening effect 516B to the virtual content 524 by moving the virtual content 524 from the second location 535A in the instance 532B to a third location 535B in the instance 535C and finally to the first location 525 in the instance 532D. As shown in the instances 532B-532D in FIG. 5C, the dampening effect 516B (sometimes also herein referred to as "delayed follow" or "lazy follow") causes the virtual content 524 to move a fractional amount per frame or unit of time until the virtual content 524 is again situated at the first location 525 in the instance 532D similar to the instance 532A. In some examples, the fractional amount may be a fraction of the remaining distance to be traveled. As a result, the rate of movement may decrease as the virtual content 524 approaches the intended destination (e.g., the first location 525).

According to some implementations, when the computing system applies the dampening effect 516B to the virtual content 524, the virtual content 524 remains within the FOV of the user 150. For example, if the user 150 performs a fast 900 right-to-left rotation of their head, the computing system maintains the virtual content 524 within the user's FOV while applying the dampening effect 516B, but the computing system may at least temporarily present the virtual content 524 adjacent to the right edge of the user's FOV.

Continuing with this example, during the instance 532C (e.g., associated with time $T_3$), the electronic device 120 presents the virtual content 524 in the second presentation mode (e.g., lazy follow mode) at a third location 535B while detecting the second head pose 536. As shown in the instance 532C, a second positional offset 539B exists between the first location 525 and the third location 535B.

Continuing with this example, during the instance 532D (e.g., associated with time $T_4$), the electronic device 120 presents the virtual content 524 in the first presentation mode (e.g., head/display-locked mode) at the first location 525 while detecting the second head pose 536. According to some implementations, after moving the virtual content 524 from the second location 535A in the instance 532B back to the first location 525 in the instance 532D, the electronic device 120 changes the virtual content 524 from the second presentation mode (e.g., lazy follow mode) to the first presentation mode (e.g., head/display-locked mode).

FIG. 5D illustrates a sequence of instances 542A, 542B, and 542C for a content delivery scenario in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the sequence of instances 542A, 542B, and 542C are rendered and presented by a computing system such as the controller 110 shown in FIGS. 1 and 2; the electronic device 120 shown in FIGS. 1 and 3; and/or a suitable combination thereof. FIG. 5D is similar to and adapted from FIG. 5B. Therefore, similar reference numbers are used in FIGS. 5B and 5D. As such, only the differences between FIGS. 5B and 5D will be described below for the sake of brevity.

For example, during the instance 542A (e.g., associated with time $T_1$), the electronic device 120 presents the virtual content 524 with a first appearance 544A (e.g., opaque) in a first presentation mode (e.g., head/display-locked mode) at a first location 525 while detecting the first head pose 502A. Continuing with this example, the electronic device 120 detects a change from the first head pose 502A to a second head pose 546, which corresponds to the yaw angular motion 547 relative to the first head pose 502A (e.g., −45° yaw rotation relative to an origin).

As shown in FIG. 5D, the yaw motion indicator 514 indicates a yaw motion value 522C associated with the change from the first head pose 502A to the second head pose 546. In this example, the yaw motion value 522C satisfies (e.g., exceeds) the second motion criterion 515B. In some implementations, the yaw motion value 522C corresponds to one of an angular displacement value, an angular velocity value, an angular acceleration value, or an angular jerk value associated with the change from the first head pose 502A to the second head pose 546.

For example, during the instance 542B (e.g., associated with time $T_2$), the electronic device 120 presents the virtual content 524 with a second appearance 544B (e.g., at least partially translucent, transparent, blurred, pixelated, etc.) in the first presentation mode (e.g., head/display-locked mode) at the first location 525 while detecting the second head pose 546. According to some implementations, as described above with reference to FIG. 5A, the electronic device 120 applies the blurring/fading-out effect 516C to the virtual content 524 according to a determination that the yaw motion value 522C associated with the change from the first head pose 502A to the second head pose 546 satisfies (e.g., exceeds) the second motion criterion 515B. As such, the electronic device 120 applies the blurring/fading-out effect 516C to the virtual content 524 by changing the virtual content 524 from the first appearance 544A in the instance 542A to the second appearance 544B in the instance 542B.

For example, during the instance 542C (e.g., associated with time $T_3$), the electronic device 120 presents the virtual content 524 with the first appearance 544A (e.g., opaque) in the first presentation mode (e.g., head/display-locked mode) at the first location 525 while detecting the second head pose 546.

Figure 6:
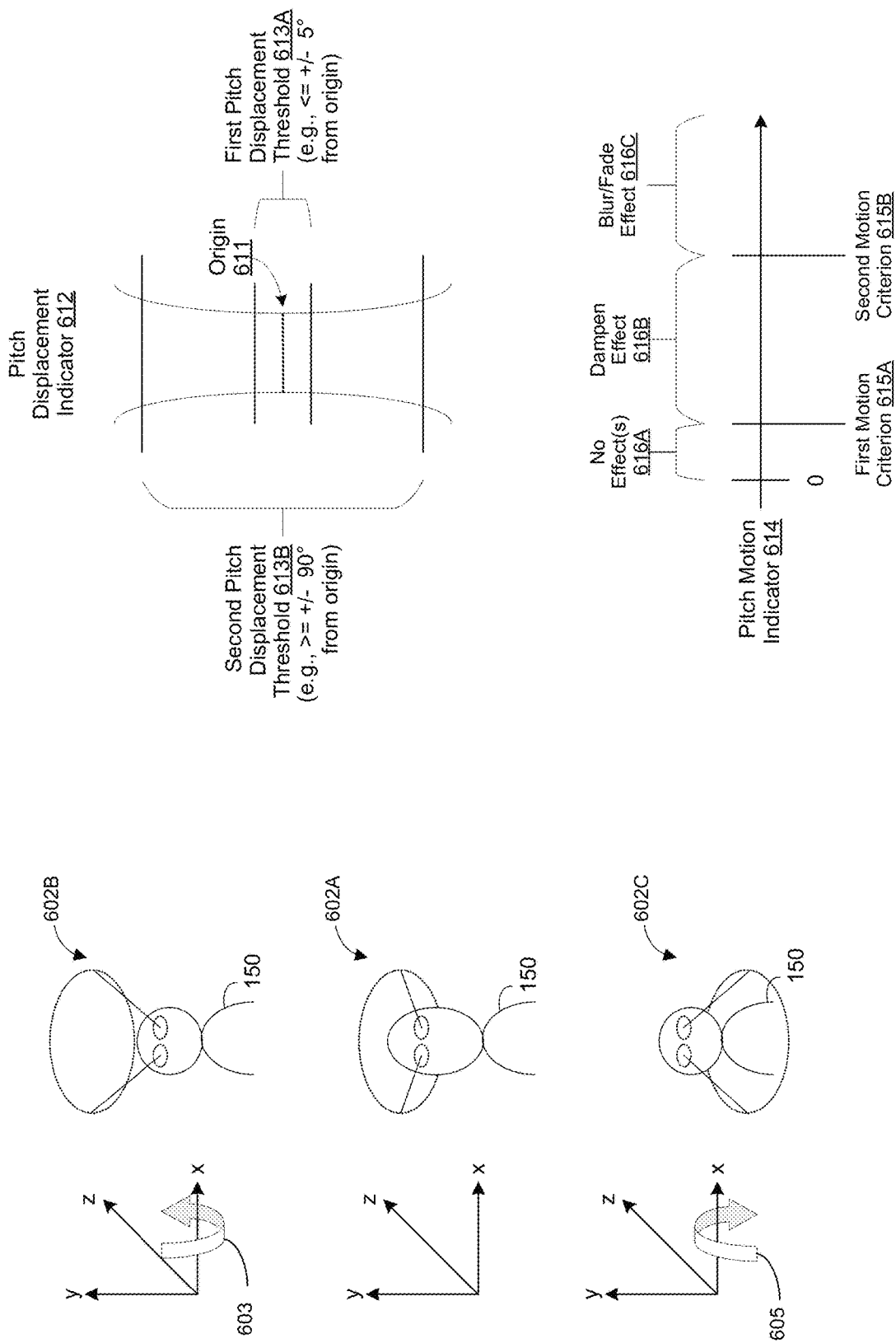
FIG. 6 illustrates an example scenario with pitch motion in accordance with some implementations.

FIG. 6 illustrates an example scenario with pitch motion in accordance with some implementations. FIG. 6 shows a second head pose 602B, which corresponds to a pitch angular motion 603 relative to a first head pose 602A (e.g., −45° pitch rotation relative to an origin). FIG. 6 also shows a third head pose 602C, which corresponds to a pitch angular motion 605 relative to the first head pose 602A (e.g., 45° yaw rotation relative to the origin).

FIG. 6 also illustrates a pitch motion indicator 614 with a first motion criterion 615A (e.g., a first pitch displacement threshold value, a first pitch velocity threshold value, a first pitch acceleration threshold value, a first pitch jerk threshold value, or the like) and a second motion criterion 615B (e.g., a second pitch displacement threshold value, a second pitch velocity threshold value, a second pitch acceleration threshold value, a second pitch jerk threshold value, or the like). In some implementations, the computing system (e.g., the electronic device 120 shown in FIGS. 1 and 3; the controller 110 in FIGS. 1 and 2; or a suitable combination thereof) applies no effect(s) 616A to the virtual content (e.g., a rigid follow mode) according to a determination that a pitch motion associated with a change between the first head pose 602A and the second head pose 602B or a change between the first head pose 602A and the third head pose 602C does not satisfy (e.g., does not exceed) the first motion criterion 615A.

In some implementations, the computing system applies a dampening effect 616B (sometimes also herein referred to as "delayed follow" or "lazy follow") to the virtual content according to a determination that a pitch motion associated with a change between the first head pose 602A and the second head pose 602B or a change between the first head pose 602A and the third head pose 602C satisfies (e.g., exceeds) the first motion criterion 615A. In some implementations, the computing system applies a blurring or fade-out effect 616C to the virtual content according to a determination that a pitch motion associated with a change between the first head pose 602A and the second head pose 602B or a change between the first head pose 602A and the third head pose 602C satisfies (e.g., exceeds) the second motion criterion 615B. In some implementations, the computing system applies a blurring or fade-out effect 616C and the dampening effect 616B to the virtual content according to a determination that a pitch motion associated with a change between the first head pose 602A and the second head pose 602B or a change between the first head pose 602A and the third head pose 602C satisfies (e.g., exceeds) the second motion criterion 615B.

FIG. 6 further illustrates a pitch displacement indicator 612 with an origin 611 (e.g., corresponding to the first head pose 602A), a first pitch displacement threshold 613A (e.g., ≤+/−5° from the origin 611), and a second pitch displacement threshold 613B (e.g., ≥+/−900 from the origin 611). In some implementations, the computing system forgoes the effects 616B and 616C according to a determination that the pitch displacement values associated with the pitch motion is less than or equal to the first pitch displacement threshold 613A. In some implementations, the computing system forgoes the effects 616B and 616C according to a determination that the pitch displacement values associated with the pitch motion is greater than or equal to the second pitch displacement threshold 613B.

Figure 7:
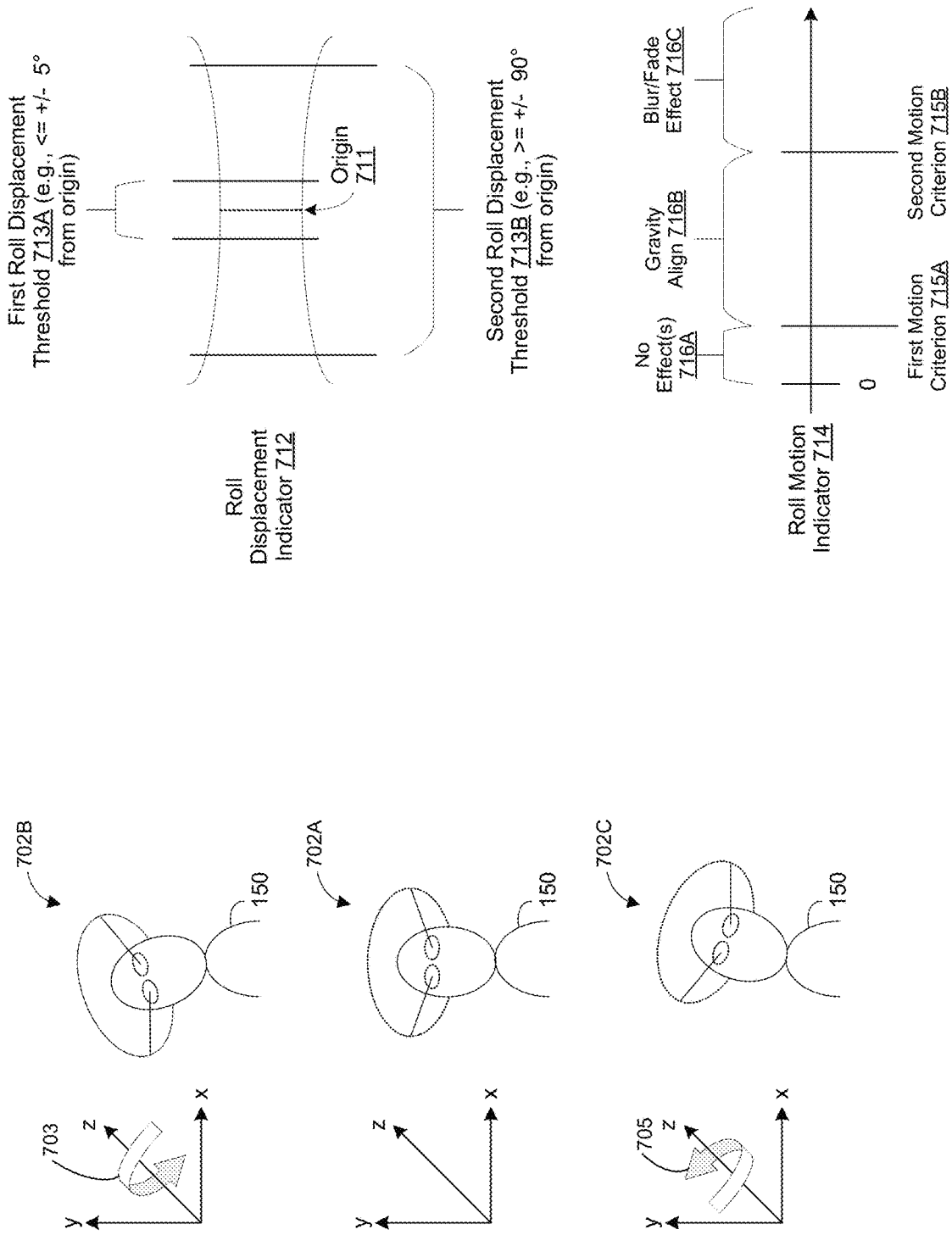
FIG. 7 illustrates an example scenario with roll motion in accordance with some implementations.

FIG. 7 illustrates an example scenario with roll motion in accordance with some implementations. FIG. 7 shows a second head pose 702B, which corresponds to a roll angular motion 703 relative to a first head pose 702A (e.g., −45° roll rotation relative to an origin). FIG. 7 also shows a third head pose 702C, which corresponds to a roll angular motion 705 relative to the first head pose 702A (e.g., 45° yaw rotation relative to the origin).

FIG. 7 also illustrates a roll motion indicator 714 with a first motion criterion 715A (e.g., a first roll displacement threshold value, a first roll velocity threshold value, a first roll acceleration threshold value, a first roll jerk threshold value, or the like) and a second motion criterion 715B (e.g., a second roll displacement threshold value, a second roll velocity threshold value, a second roll acceleration threshold value, a second roll jerk threshold value, or the like). In some implementations, the computing system (e.g., the electronic device 120 shown in FIGS. 1 and 3; the controller 110 in FIGS. 1 and 2; or a suitable combination thereof) applies no effect(s) 716A to virtual content (e.g., a rigid follow mode) according to a determination that a roll motion associated with a change between the first head pose 702A and the second head pose 702B or a change between the first head pose 702A and the third head pose 702C does not satisfy (e.g., does not exceed) the first motion criterion 715A.

In some implementations, the computing system applies a gravity align effect 716B to the virtual content according to a determination that a roll motion associated with a change between the first head pose 702A and the second head pose 702B or a change between the first head pose 702A and the third head pose 702C satisfies (e.g., exceeds) the first motion criterion 715A. In some implementations, the computing system applies a blurring or fade-out effect 716C to the virtual content according to a determination that a roll motion associated with a change between the first head pose 702A and the second head pose 702B or a change between the first head pose 702A and the third head pose 702C satisfies (e.g., exceeds) the second motion criterion 715B. In some implementations, the computing system applies a blurring or fade-out effect 716C and the gravity align effect 716B to the virtual content according to a determination that a roll motion associated with a change between the first head pose 702A and the second head pose 702B or a change between the first head pose 702A and the third head pose 702C satisfies (e.g., exceeds) the second motion criterion 715B.

In some implementations, the computing system applies the gravity align effect 716B to the virtual content whenever roll motion is detected regardless of the first motion criterion 715A. For example, the computing system rigidly applies the gravity align effect 716B to virtual content during roll motion, and, instead, the computing system rigidly applies the dampening effect (discussed above with respect to FIGS. 5A and 6) to the virtual content according to a determination that the roll motion associated with the change between the first head pose 702A and the second head pose 702B or a change between the first head pose 702A and the third head pose 702C satisfies (e.g., exceeds) the first motion criterion 715A.

FIG. 7 further illustrates a roll displacement indicator 712 with an origin 711 (e.g., corresponding to the first head pose 702A), a first roll displacement threshold 713A (e.g., ≤+/−5° from the origin 711), and a second roll displacement threshold 713B (e.g., ≥+/−900 from the origin 711). In some implementations, the computing system forgoes the effects 716B and 716C according to a determination that the roll displacement values associated with the roll motion is less than or equal to the roll pitch displacement threshold 713A. In some implementations, the computing system forgoes the effects 716B and 716C according to a determination that the roll displacement values associated with the roll motion is greater than or equal to the second roll displacement threshold 713B.

Figure 8B:
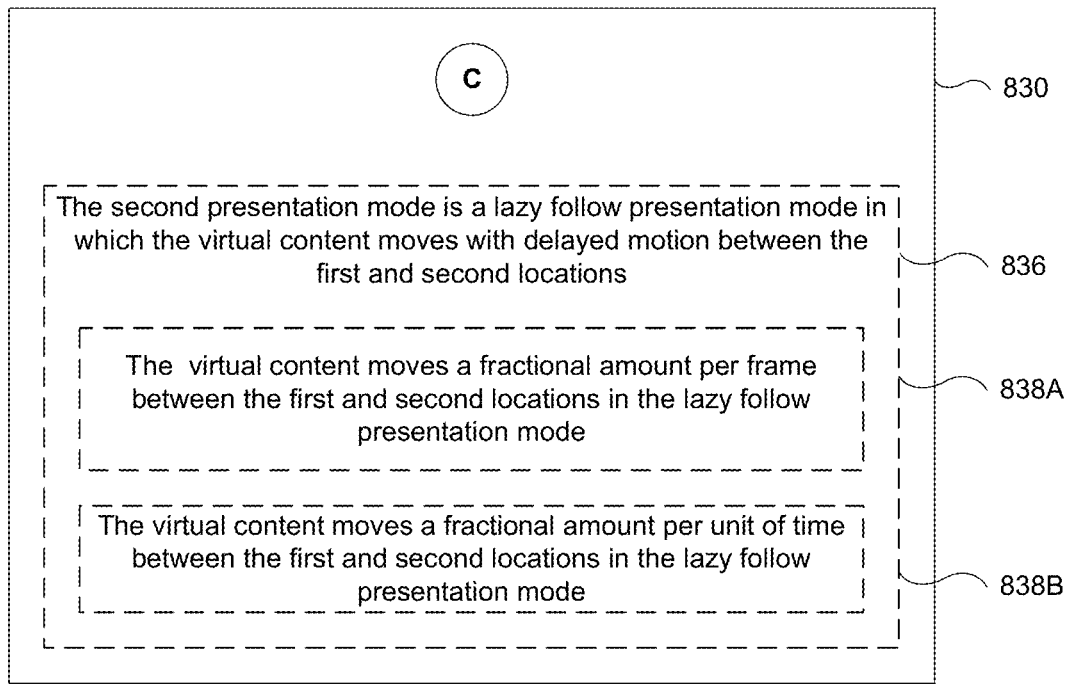
Figure 8B:
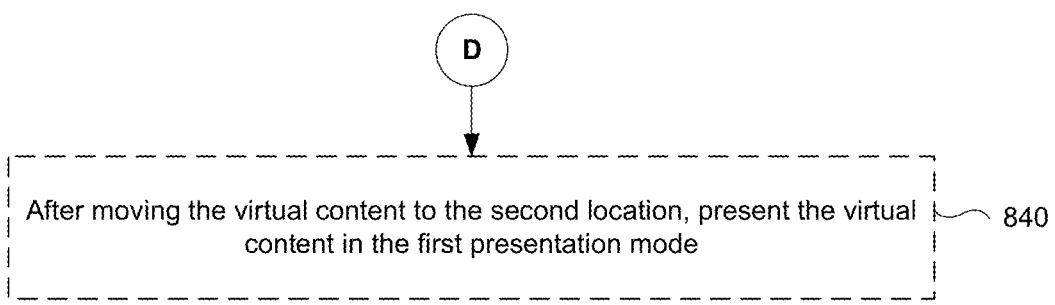

FIGS. 8A-8C illustrate a flowchart representation of a method 800 of improving the comfortability of virtual content in accordance with some implementations. In various implementations, the method 800 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the method 800 is performed by processing logic, including hardware, firmware, software, or a combination thereof. In some implementations, the method 800 is performed by a processor executing code stored in a non-transitory computer-readable medium (e.g., a memory). In some implementations, the computing system corresponds to one of a tablet, a laptop, a mobile phone, a near-eye system, a wearable computing device, or the like. In some implementations, the one or more input devices correspond to a computer vision (CV) engine that uses an image stream from one or more exterior-facing image sensors, a finger/hand/extremity tracking engine, an eye tracking engine, a touch-sensitive surface, one or more microphones, and/or the like.

As discussed above, head-locked content is typically expected to remain stationary within a user's field of view during head rotational movements. However, device limitations and properties of the human visual system may cause the head-locked content to appear jumpy or jittery in relation to the environment on which it is overlaid or composited with. According to various implementations, the method described herein enables a lazy follow mode for the head-locked content when yaw and pitch motion of a rotational head movement is greater than a first motion criterion (e.g., a first angular displacement, velocity, acceleration, jerk, etc. threshold value). For example, the head-locked content drifts from its origin location to a new location at a rate that is slower than the rotational head movement. In some implementations, the method described herein blurs or fades the head-locked content when the yaw motion of the rotational head movement is greater than a second motion criterion (e.g., a second angular displacement, velocity, acceleration, jerk, etc. threshold value), which is, in turn, greater than the first motion criterion. As such, the technology described herein improves the comfort of head-locked content during certain head movements by enabling a lazy follow mode instead of a typical rigid follow mode.

As represented by block 810, while detecting a first head pose, the method 800 includes presenting, via the display device, virtual content in a first presentation mode at a first location that is a first set of offset values relative to the first head pose. In some implementations, as represented by block 812, the virtual content corresponds to head-locked virtual content while presented in the first presentation mode that is presented at the first location corresponding to the first set of offset values. In some implementations, while in the first presentation mode, the virtual content corresponds to head/display-locked (HL) extended reality (XR) content presented within an XR environment that is overlaid on or composited with a physical environment. As one example, with reference to FIG. 5B, during the instance 527A (e.g., associated with time T₁), the electronic device 120 presents the virtual content 524 in a first presentation mode (e.g., head/display-locked mode) at a first location 525 while detecting the first head pose 502A. As another example, with reference to FIG. 5C, during the instance 532A (e.g., associated with time T₁), the electronic device 120 presents the virtual content 524 in a first presentation mode (e.g., head/display-locked mode) at a first location 525 while detecting the first head pose 502A.

For example, the computing system or a component thereof (e.g., the interaction handler 420 in FIGS. 3 and 4C) is capable of obtaining (e.g., receiving, retrieving, or detecting) user input(s) directed to the virtual content such as a hand/extremity tracking input, an eye tracking input, an audio/speech input, a touch input, or the like. In this example, the user input(s) may cause a change to the translational and/or rotational values of the virtual content. Continuing with this example, the user input(s) may cause a change to the appearance of the XR content such as changing a color of the XR content, changing a texture of the XR content, changing a shape of the XR content, or changing a brightness value of the XR content.

For example, the first head pose is associated with a first set of values such as x, y, and/or z positional values and/or yaw, roll, and/or pitch rotational values. In one example, the first set of offset values relative to the first head pose corresponds to a spatial offset in at least one of x, y, or z dimensions relative to the first head pose. In another example, the first set of offset values relative to the first head pose corresponds to a spatial offset in at least one of x, y, or z dimensions relative to a ray projected from the user's head based on the first head pose such as from a centroid of the user's face, a predefined point on the user's face (e.g., chin, forehead, tip of nose, center point between eyes, etc.), gaze direction, or the like.

In some implementations, the computing system obtains (e.g., receives, retrieves, or determines/generates) the first head pose and/or a first body pose. As one example, with reference to FIGS. 4A and 4B, the computing device or a portion thereof (e.g., the characterization engine 442 in FIG. 4A) obtains (e.g., receives, retrieves, or determines/generates) a characterization vector 443 based at least in part on a pose characterization vector 415 (e.g., including the first head pose and the first body pose). In some implementations, obtaining the first characterization vector corresponds to generating the first characterization vector based on sensor data collected by the computing system. In some implementations, the sensor data is collected by a combination of optional remote sensors, the electronic device 120, and the controller 110. As shown in FIG. 4A, for example, the characterization vector 443 is based on the local sensor data 403 and/or the remote sensor data 405.

In some implementations, the display device corresponds to a transparent lens assembly, and wherein presenting the virtual content includes projecting the virtual content onto the transparent lens assembly. In some implementations, the display device corresponds to a near-eye system, and wherein presenting the virtual content includes compositing the virtual content with one or more images of a physical environment captured by an exterior-facing image sensor.

As represented by block 820, the method 800 includes detecting, via the one or more input devices, a change from the first head pose to a second head pose. For example, the second head pose is associated with a second set of values such as x, y, and/or z positional values and/or yaw, roll, and/or pitch rotational values. In one example, the computing system detects the change to the head pose based on changes to the input data such as IMU data, accelerometer data, gyroscope data, VIO data, etc. As one example, with reference to FIGS. 4A and 4B, the computing device or a portion thereof (e.g., the characterization engine 442 in FIG. 4A) detects a change to the characterization vector 443 based on a change to at least one of the motion state vector 411, the eye tracking vector 413, or the pose characterization vector 415 over time.

As one example, with reference to FIG. 5B, the electronic device 120 detects a change from the first head pose 502A to the second head pose 502B between the instances 527A and 527B, which corresponds to the yaw angular motion 503 relative to the first head pose 502A (e.g., −45° yaw rotation relative to an origin). As another example, with reference to FIG. 5C, the electronic device 120 detects a change from the first head pose 502A to a second head pose 536 between the instances 532A and 532B, which corresponds to the yaw angular motion 537 relative to the first head pose 502A (e.g., −45° yaw rotation relative to an origin).

In some implementations, the computing system provides feedback in response to detecting the change from the first head pose to the second head pose such as displaying visual information, providing an audio output, providing haptic feedback, etc. indicating the change in head pose. In some implementations, the computing system provides the feedback in response to changing presentation modes such as between the instances 532A and 532B in FIG. 5C or between the instances 542A and 542B in FIG. 5D.

As represented by block 830, in response to detecting the change to the second head pose and in accordance with a determination that the difference between the first and second head poses indicates a motion that satisfies a first motion criterion, the method 800 includes presenting, via the display device, the virtual content in a second presentation mode while moving the virtual content away from the first location towards a second location that is the first set of offset values relative to the second head pose. In some implementations, the second presentation mode corresponds to a lazy follow mode that mimics a delayed spring. For example, the virtual content moves a fractional amount per frame or unit of time that may be less than the difference between the first and second head poses. In some examples, the fractional amount may be a fraction of the remaining distance to be traveled. As a result, the rate of movement may decrease as the virtual content approaches the intended destination.

In some implementations, as represented by block 832, the motion corresponds to one of: rotational motion relative to at least one of a yaw, pitch, or roll rotational dimension; or translational motion relative at least one of an X, Y, or Z axis. In some implementations, as represented by block 834A, the motion satisfies the first motion criterion when the motion corresponds to the rotational motion with at least one of an angular displacement value, an angular velocity value, an angular acceleration value, or an angular jerk value that exceeds the first motion criterion. In some implementations, as represented by block 834B, the motion satisfies the first motion criterion when the motion corresponds to the translational motion with at least one of a translational displacement value, a translational velocity value, a translational acceleration value, or a translational jerk value that exceeds the first motion criterion.

For example, the computing system detects the motion (and the angular/translational displacement value, the angular/translational velocity value, the angular/translational acceleration value, and/or the angular/translational jerk) based on changes to the input data such as IMU data, accelerometer data, gyroscope data, VIO data, etc. As one example, with reference to FIGS. 4A and 4B, the computing device or a portion thereof (e.g., the characterization engine 442 in FIG. 4A) detects a change to the characterization vector 443 based on a change to at least one of the motion state vector 411, the eye tracking vector 413, or the pose characterization vector 415 over time.

In some implementations, the computing system presents the virtual content in the second presentation mode (e.g., the "delayed follow" or "lazy follow" mode) while moving the virtual content away from the first location towards a second location when the motion corresponds to rotational motion relative to the yaw, pitch or roll dimensions. In some implementations, the computing system presents the virtual content in the second presentation mode (e.g., the "delayed follow" or "lazy follow" mode) while moving the virtual content away from the first location towards a second location when the motion corresponds to translational motion relative to the X axis (e.g., left-to-right or right-to-left motion) and the Y axis (e.g., upward or downward motion) but not the Z axis (e.g., forward or background motion). As such, if the motion corresponds to translational motion relative to the Z axis, the computing system maintains the virtual content in the rigid follow mode.

In some implementations, the first motion criterion and the second motion criterion correspond to predefined angular displacement values, angular velocity values, angular acceleration values, angular jerk values, or the like. In some implementations, the first motion criterion and the second motion criterion correspond to non-deterministic angular displacement values, angular velocity values, angular acceleration values, angular jerk values, or the like that are dynamically determined/updated based on head pose, body pose, motion state, current foreground application, environmental information, contextual information, etc. In some implementations, the computing system increases or decreases the first motion criterion and the second motion during specific motion states.

In some implementations, the first motion criterion and the second motion criterion correspond to predefined translational displacement values, translational velocity values, translational acceleration values, translational jerk values, or the like. In some implementations, the first motion criterion and the second motion criterion correspond to non-deterministic translational displacement values, translational velocity values, translational acceleration values, translational jerk values, or the like that are dynamically determined/updated based on head pose, body pose, motion state, current foreground application, environmental information, contextual information, etc. In some implementations, the computing system increases or decreases the first motion criterion and the second motion during specific motion states.

In some implementations, the first motion criterion and the second motion criterion for a heuristic based on angular motion is the same as the first motion criterion and the second motion criterion for a heuristic based on translational motion. In some implementations, the first motion criterion and the second motion criterion for the heuristic based on the angular motion are different from the first motion criterion and the second motion criterion for the heuristic based on the translational motion.

In some implementations, as represented by block 836, the second presentation mode is a lazy follow presentation mode in which the virtual content moves with delayed motion between the first and second locations. In some implementations, as represented by block 838A, the virtual content moves a fractional amount per frame between the first and second locations in the lazy follow presentation mode. In some implementations, as represented by block 838B, the virtual content moves a fractional amount per unit of time between the first and second locations in the lazy follow presentation mode. In some examples, the fractional amount may be a fraction of the remaining distance to be traveled relative to the velocity or acceleration of the head pose change.

In some implementations, the virtual content that is world/object-locked or head/display-locked may exhibit the lazy follow behavior, which reduces or delays motion of the world/object-locked or head/display-locked virtual content relative to movement of a point of reference which the virtual content is following (e.g., the point of reference corresponds to the first set of offset values relative to the second head pose). In some implementations, while exhibiting the lazy follow behavior, the computing system intentionally delays movement of the virtual content when detecting movement of the point of reference (e.g., a portion of the environment, the viewpoint, or a point that is fixed relative to the viewpoint or gaze direction, such as a point that is between 5-300 cm from the viewpoint or the gaze direction), which the virtual content is following. For example, when the point of reference (e.g., the portion of the environment, the viewpoint, or the point that is fixed relative to the viewpoint or gaze direction) moves with a first speed, the computing system moves the virtual content to remain locked to the point of reference but moves with a second speed that is slower than the first speed (e.g., until the point of reference stops moving or slows down, at which point the virtual content starts to catch up to the point of reference).

In some implementations, while exhibiting the lazy follow behavior, the computing system ignores small amounts of movement associated with the point of reference (e.g., ignoring movement of the point of reference that is below a threshold amount of movement such as movement by 0-5 degrees or movement by 0-50 cm). As one example, when the point of reference (e.g., the portion of the environment, the viewpoint, or the point that is fixed relative to the viewpoint or gaze direction) moves by a first amount, a distance between the point of reference and the virtual content increases (e.g., because the virtual content is being presented so as to maintain a fixed or substantially fixed position relative to the portion of the environment, the viewpoint, or the point that is fixed relative to the viewpoint or gaze direction that is different from the point of reference to which the virtual content is locked). As another example, when the point of reference (e.g., the portion of the environment, the viewpoint, or the point that is fixed relative to the viewpoint or gaze direction) moves by a second amount that is greater than the first amount, a distance between the point of reference and the virtual content initially increases (e.g., because the virtual content is being displayed so as to maintain a fixed or substantially fixed position relative to the portion of the environment, the viewpoint, or the point that is fixed relative to the viewpoint or gaze direction that is different from the point of reference to which the virtual content is locked) and then decreases as the amount of movement of the point of reference increases above a threshold (e.g., a "lazy follow" threshold) because the virtual content is moved by the computing system to maintain a fixed or substantially fixed position relative to the point of reference. In some implementations, the virtual content maintaining a substantially fixed position relative to the point of reference includes the virtual content being displayed within a threshold distance (e.g., 1, 2, 3, 5, 15, 20, 50, etc. cm) of the point of reference in one or more dimensions (e.g., up/down, left/right, and/or forward/backward relative to the position of the point of reference).

According to some implementations, with respect to rotational motion/movement, the computing system applies a dampening effect to virtual content according to a determination that the rotational motion relative to at least one of pitch, roll, or yaw dimensions satisfies a first motion criterion (e.g., displacement, velocity, acceleration, jerk, etc. of one or more rotational values greater than a first threshold value). As one example, with respect to yaw rotational motion, the computing system applies a dampening effect 516A to virtual content according to a determination that the yaw motion satisfies the first motion criterion 515A in FIG. 5A. As another example, with respect to pitch rotational motion, the computing system applies a dampening effect 616A to virtual content according to a determination that the pitch motion satisfies the first motion criterion 615A in FIG. 6.

According to some implementations, with respect to translational motion/movement, the computing system applies a dampening effect to virtual content according to a determination that the translational motion relative to at least one of an X (e.g., left-to-right or right-to-left motion), Y (e.g., upward or downward motion), or Z (e.g., forward or backward motion) axes satisfies a first motion criterion (e.g., displacement, velocity, acceleration, jerk, etc. of one or more translational values greater than a first threshold value). As one example, the computing system applies the dampening effect to virtual content according to a determination that the translational motion relative to the X and/or Y axis, but not the Z axis, satisfies the first motion criterion.

As described above, with reference to FIG. 5C, the electronic device 120 transitions the virtual content 524 from a first presentation mode (e.g., the head/display-locked mode) in the instance 532A to a second presentation mode (e.g., the lazy follow mode) in the instances 532B and 532C. In this example, with reference to FIG. 5C, the electronic device 120 detects a change from the first head pose 502A to a second head pose 536 between the instances 532A and 532B, which corresponds to the yaw angular motion 537 relative to the first head pose 502A (e.g., −45° yaw rotation relative to an origin). In this example, the yaw motion value 522B satisfies (e.g., exceeds) the first motion criterion 515A. In some implementations, the yaw motion value 522B corresponds to one of an angular displacement value, an angular velocity value, an angular acceleration value, or an angular jerk value associated with the change from the first head pose 502A to the second head pose 536.

Continuing with the above example, with continued reference to FIG. 5C, during the instance 532B (e.g., associated with time $T_2$), the electronic device 120 presents the virtual content 524 in a second presentation mode (e.g., the lazy follow mode) at a second location 535A while detecting the second head pose 536. As shown in the instance 532B, a first positional offset 539A exists between the first location 525 and the second location 535A.

According to some implementations, as described above with reference to FIG. 5A, the electronic device 120 applies the dampening effect 516B (sometimes also herein referred to as the "delayed follow" or "lazy follow" mode) to the virtual content 524 according to a determination that the yaw motion value 522B associated with the change from the first head pose 502A to the second head pose 536 satisfies (e.g., exceeds) the first motion criterion 515A. As such, the electronic device 120 applies the dampening effect 516B to the virtual content 524 by moving the virtual content 524 from the second location 535A in the instance 532B to a third location 535B in the instance 535C and finally to the first location 525 in the instance 532D. As shown in the instances 532B-532D in FIG. 5C, the dampening effect 516B (sometimes also herein referred to as the "delayed follow" or "lazy follow" mode) causes the virtual content 524 to move a fractional amount per frame or unit of time until the virtual content 524 is again situated at the first location 525 in the instance 532D similar to the instance 532A.

Continuing with this example, with continued reference to FIG. 5C, during the instance 532C (e.g., associated with time $T_3$), the electronic device 120 presents the virtual content 524 in the second presentation mode (e.g., lazy follow mode) at a third location 535B while detecting the second head pose 536. As shown in the instance 532C, a second positional offset 539B exists between the first location 525 and the third location 535B. Continuing with this example, during the instance 532D (e.g., associated with time $T_4$), the electronic device 120 presents the virtual content 524 in the first presentation mode (e.g., head/display-locked mode) at the first location 525 while detecting the second head pose 536. According to some implementations, after moving the virtual content 524 from the second location 535A in the instance 532B back to the first location 525 in the instance 532D, the electronic device 120 changes the virtual content 524 from the second presentation mode (e.g., lazy follow mode) to the first presentation mode (e.g., head/display-locked mode).

In some implementations, as represented by block 840, after moving the virtual content to the second location, the method 800 includes presenting, via the display device, the virtual content in the first presentation mode. According to some implementations, with reference to FIG. 5C, after moving the virtual content 524 from the second location 535A in the instance 532B back to the first location 525 in the instance 532D, the electronic device 120 changes the virtual content 524 from the second presentation mode (e.g., the lazy follow mode) to the first presentation mode (e.g., the head/display-locked mode). With reference to FIG. 5C, during the instance 532D (e.g., associated with time $T_4$), the electronic device 120 presents the virtual content 524 in the first presentation mode (e.g., the head/display-locked mode) at the first location 525 while detecting the second head pose 536.

As represented by block 850, in response to detecting the change to the second head pose and in accordance with a determination that the difference between the first and second head poses indicates a motion that satisfies a second motion criterion different from the first motion criterion, the method 800 includes changing an appearance of the virtual content. As one example, changing the appearance of the virtual content corresponds to at least partially blurring the virtual content, at least partially pixelating the virtual content, or fading the virtual content out. As another example, changing the appearance of the virtual content corresponds to changing a brightness, contrast, color, texture, size, shape, or the like of the virtual content.

In some implementations, as represented by block 852, changing the appearance of the virtual content corresponds to one of blurring or fading-out the virtual content. In some implementations, as represented by block 854A, the motion satisfies the second motion criterion when the motion corresponds to the rotational motion with at least one of an angular displacement value, an angular velocity value, an angular acceleration value, or an angular jerk value that exceeds the second motion criterion. In some implementations, as represented by block 854B, the motion satisfies the second motion criterion when the motion corresponds to the translational motion with at least one of a translational displacement value, a translational velocity value, a translational acceleration value, or a translational jerk value that exceeds the second motion criterion.

According to some implementations, with respect to rotational motion/movement, the computing system applies a blurring effect to virtual content according to a determination that the rotational motion relative to at least one of pitch, roll, or yaw dimensions satisfies a second motion criterion (e.g., displacement, velocity, acceleration, jerk, etc. of one or more rotational values greater than a second threshold value). As one example, with respect to yaw rotational motion, the computing system applies a blurring effect 516B to virtual content according to a determination that the yaw motion satisfies the second motion criterion 515B in FIG. 5A.

According to some implementations, with respect to translational motion/movement, the computing system applies a blurring effect to virtual content according to a determination that the translational motion relative to at least one of an X (e.g., left-to-right or right-to-left motion), Y (e.g., upward or downward motion), or Z (e.g., forward or backward motion) axes satisfies a second motion criterion (e.g., displacement, velocity, acceleration, jerk, etc. of one or more translational values greater than a second threshold value). As one example, the computing system applies the blurring effect to virtual content according to a determination that the translational motion relative to the X, Y and/or Z axis satisfies the second motion criterion.

With reference to FIG. 5D, the electronic device 120 detects a change from the first head pose 502A to a second head pose 546 between the instances 542A and 542B, which corresponds to the yaw angular motion 547 relative to the first head pose 502A (e.g., −45° yaw rotation relative to an origin). In this example, the yaw motion value 522C satisfies (e.g., exceeds) the second motion criterion 515B. In some implementations, the yaw motion value 522C corresponds to one of an angular displacement value, an angular velocity value, an angular acceleration value, or an angular jerk value associated with the change from the first head pose 502A to the second head pose 546.

Continuing with the above example, with continued reference to FIG. 5D, during the instance 542B (e.g., associated with time $T_2$), the electronic device 120 presents the virtual content 524 with a second appearance 544B (e.g., at least partially translucent, transparent, blurred, pixelated, etc.) in the first presentation mode (e.g., head/display-locked mode) at the first location 525 while detecting the second head pose 546. According to some implementations, as described above with reference to FIG. 5A, the electronic device 120 applies the blurring/fading-out effect 516C to the virtual content 524 according to a determination that the yaw motion value 522C associated with the change from the first head pose 502A to the second head pose 546 satisfies (e.g., exceeds) the second motion criterion 515B. As such, the electronic device 120 applies the blurring/fading-out effect 516C to the virtual content 524 by changing the virtual content 524 from the first appearance 544A in the instance 542A to the second appearance 544B in the instance 542B.

In some implementations, in response to detecting the change to the second head pose and in accordance with a determination that the difference between the first and second head poses indicates a motion that satisfies a second motion criterion different from the first motion criterion, the computing system changes the appearance of the virtual content and the computing systems also presents the virtual content in the second presentation mode while moving the virtual content away from the first location towards a second location. As such, for example, the computing system concurrently applies the dampening and blurring effects to the virtual content when the motion satisfies the second motion criterion.

In some implementations, the method 800 includes: while presenting the virtual content in the first presentation mode at the first location, detecting, via the one or more inputs devices, a change from a first body pose to a second body pose; in response to detecting the change to the second body pose: in accordance with a determination that the difference between the first and second body poses indicates a motion that satisfies a first motion criterion, presenting, via the display device, the virtual content in a second presentation mode while moving the virtual content away from the first location towards a second location that is the first set of offset values relative to the second head pose; and in accordance with a determination that the difference between the first and second head poses indicates a motion that satisfies a second motion criterion different from the first motion criterion, changing an appearance of the virtual content. As such, one of ordinary skill in the art will appreciate that in various implementations the computing system may perform a similar heuristic for body pose changes as the heuristic described above with respect to blocks 810-850.

In some implementations, as represented by block 860, in response to detecting the change to the second head pose and in accordance with a determination that the difference between the first and second head poses indicates a motion that does not satisfy the first motion criterion or the second motion criterion, the method 800 includes maintaining presentation of the virtual content in the first presentation mode at the first location (sometimes referred to herein as a "rigid follow mode"). As one example, with reference to FIG. 5B, the electronic device 120 detects a change from the first head pose 502A to the second head pose 502B between the instances 527A and 527B, which corresponds to the yaw angular motion 503 relative to the first head pose 502A (e.g., −45° yaw rotation relative to an origin). In this example, the yaw motion value 522A does not satisfy (e.g., exceed) the first motion criterion 515A. In some implementations, the yaw motion value 522A corresponds to one of an angular displacement value, an angular velocity value, an angular acceleration value, or an angular jerk value associated with the change from the first head pose 502A to the second head pose 502B.

Continuing with the above example, with continued reference to FIG. 5B, during the instance 527B (e.g., associated with time $T_2$), the electronic device 120 maintains presentation of the virtual content 524 in the first presentation mode (e.g., the head/display-locked mode) at the first location 525 while detecting the second head pose 502B. According to some implementations, the virtual content corresponds to head/display-locked content that maintains its position on the display 122 in response to detecting a change to the head pose, body pose, motion state, and/or the like.

In some implementations, in response to detecting the change to the second head pose and in accordance with a determination that the difference between the first and second head poses indicates a motion that satisfies the first motion criterion and in accordance with a determination that a current motion state corresponds to one of a plurality of specified motion states, the method 800 includes maintaining presentation of the virtual content in the first presentation mode at the first location. As one example, with reference to FIGS. 4A and 4B, the computing device or a portion thereof (e.g., the characterization engine 442 in FIG. 4A) obtains (e.g., receives, retrieves, or determines/generates) a characterization vector 443 based at least in part on a motion state vector 411 (e.g., including the current motion state). For example, the plurality of specified motion states includes running, cycling, driving, etc. As such, in some implementations, in response to detecting the change to the second head pose, the computing system continues presenting the virtual content in the first presentation mode (e.g., the head/display locked mode) when the current motion state corresponds to one of a plurality of specified motion states even if the rotational and/or translational motion associated with the change to the second head pose satisfies the first motion criterion.

In some implementations, in response to detecting the change to the second head pose and in accordance with a determination that the difference between the first and second head poses indicates a motion that satisfies the second motion criterion and in accordance with a determination that a current motion state corresponds to one of a plurality of specified motion states, the method 800 includes maintaining presentation of the virtual content in the first presentation mode at the first location. As one example, with reference to FIGS. 4A and 4B, the computing device or a portion thereof (e.g., the characterization engine 442 in FIG. 4A) obtains (e.g., receives, retrieves, or determines/generates) a characterization vector 443 based at least in part on a motion state vector 411 (e.g., including the current motion state). For example, the plurality of specified motion states includes running, cycling, driving, etc. As such, in some implementations, in response to detecting the change to the second head pose, the computing system continues presenting the virtual content in the first presentation mode (e.g., the head/display locked mode) when the current motion state corresponds to one of a plurality of specified motion states even if the rotational and/or translational motion associated with the change to the second head pose satisfies the second motion criterion.

In some implementations, in response to detecting the change to the second head pose, the method 800 includes determining a roll motion based on a difference between the first and second head poses, wherein the roll motion is associated with one of an angular displacement value, an angular velocity value, an angular acceleration value, or an angular jerk value. In some implementations, in accordance with a determination that the roll motion satisfies the first motion criterion, the method 800 includes maintaining alignment of the virtual content with a gravity direction estimate. FIG. 7 shows a second head pose 702B, which corresponds to a roll angular motion 703 relative to a first head pose 702A (e.g., −45° roll rotation relative to an origin). FIG. 7 also shows a third head pose 702C, which corresponds to a roll angular motion 705 relative to the first head pose 702A (e.g., 45° yaw rotation relative to the origin). In some implementations, with reference to FIG. 7, the computing system applies a gravity align effect 716B to the virtual content according to a determination that a roll motion associated with a change between the first head pose 702A and the second head pose 702B or a change between the first head pose 702A and the third head pose 702C satisfies (e.g., exceeds) the first motion criterion 715A.

In some implementations, in response to detecting the change to the second head pose, the method 800 includes maintaining alignment of the virtual content with a gravity direction estimate. In some implementations, the computing system maintains gravity alignment of the virtual content by identifying a gravity vector (e.g., via a gravity estimation measurement, via horizontal line identification within the physical environment, via vertical line identification within the physical environment, or the like) and aligning the virtual content to the gravity vector. In one example, the computing system performs maintains gravity alignment for motion in any of 6DOF (six degrees of freedom). In one example, the computing system maintains gravity alignment of the virtual content for at least some of the 3DOF (three degrees of freedom) with respect to rotational motions. In another example, the computing system maintains gravity alignment of the virtual content for all 3DOF with respect to rotational motions. In yet another example, the computing system maintains gravity alignment of the virtual content for at least some of the 3DOF with respect to translational motions. In yet another example, the computing maintains gravity alignment of the virtual content for all 3DOF with respect to translational motions.

In some implementations, in response to detecting the change to the second head pose, the method 800 includes maintaining presentation of the virtual content relative to the second head pose. As one example, the computing system maintains the virtual content within the user's FOV regardless of how fast and/or how far the user rotates their head/body. As another example, the computing system maintains the virtual content within the user's FOV regardless of how fast and/or how far the user translates their head/body.

In some implementations, in response to detecting the change to the second head pose, the method 800 includes determining a displacement value based on a difference between the first and second head poses. For example, the computing system detects the displacement value based on changes to the input data such as IMU data, accelerometer data, gyroscope data, VIO data, etc. As one example, with reference to FIGS. 4A and 4B, the computing device or a portion thereof (e.g., the characterization engine 442 in FIG. 4A) detects a change to the characterization vector 443 based on a change to at least one of the motion state vector 411, the eye tracking vector 413, or the pose characterization vector 415 over time. For example, the displacement value corresponds to at least one of an angular displacement value or a translational displacement value. As one example, the displacement value corresponds to angular displacement in at least one of the yaw, roll, or pitch dimensions. As another example, the displacement value corresponds to translational displacement relative to at least one of X, y, or Z axes.

In some implementations, in accordance with a determination that the displacement value is less than a first (minimum) displacement threshold, the method 800 includes maintaining presentation of the virtual content in the first presentation mode at the first location while detecting the change to the second head pose. For example, with reference to FIG. 5A, the computing system forgoes the effects 516B and 516C according to a determination that a yaw displacement value associated with the yaw motion 503 or 505 is less than or equal to the first yaw displacement threshold 513A even when the yaw motion 503 or 505 satisfies the first motion criterion 515A or the second motion criterion 515B.

In some implementations, in accordance with a determination that the displacement value is greater than a second (maximum) displacement threshold, the method 800 includes maintaining presentation of the virtual content in the first presentation mode at the first location while detecting the change to the second head pose. For example, with reference to FIG. 5A, the computing system forgoes the effects 516B and 516C according to a determination that a yaw displacement value associated with the yaw motion 503 or 505 is greater than or equal to the second yaw displacement threshold 513B even when the yaw motion 503 or 505 satisfies the first motion criterion 515A or the second motion criterion 515B.

In some implementations, the virtual content is presented in the second presentation mode in accordance with a determination that the difference between the first and second head poses indicates that the motion satisfies the first motion criterion and in accordance with a determination that the angular displacement value is greater than a first (minimum) displacement threshold and less than a second (maximum) displacement threshold. For example, with reference to FIG. 5A, the computing system applies the dampening effect 516A to the virtual content according to a determination that the yaw displacement value associated with the yaw motion 503 or 505 is between the first yaw displacement threshold 513A and the second yaw displacement threshold 513B and according to a determination that the yaw motion 503 or 505 satisfies the first motion criterion 515A.

In some implementations, the appearance of the virtual content is changed in accordance with a determination that the difference between the first and second head poses indicates that the motion satisfies the second motion criterion and in accordance with a determination that the angular displacement value is greater than a first (minimum) displacement threshold and less than a second (maximum) displacement threshold. For example, with reference to FIG. 5A, the computing system applies the dampening effect 516A to the virtual content according to a determination that the yaw displacement value associated with the yaw motion 503 or 505 is between the first yaw displacement threshold 513A and the second yaw displacement threshold 513B and according to a determination that the yaw motion 503 or 505 satisfies the second motion criterion 515B.

Figure 9:
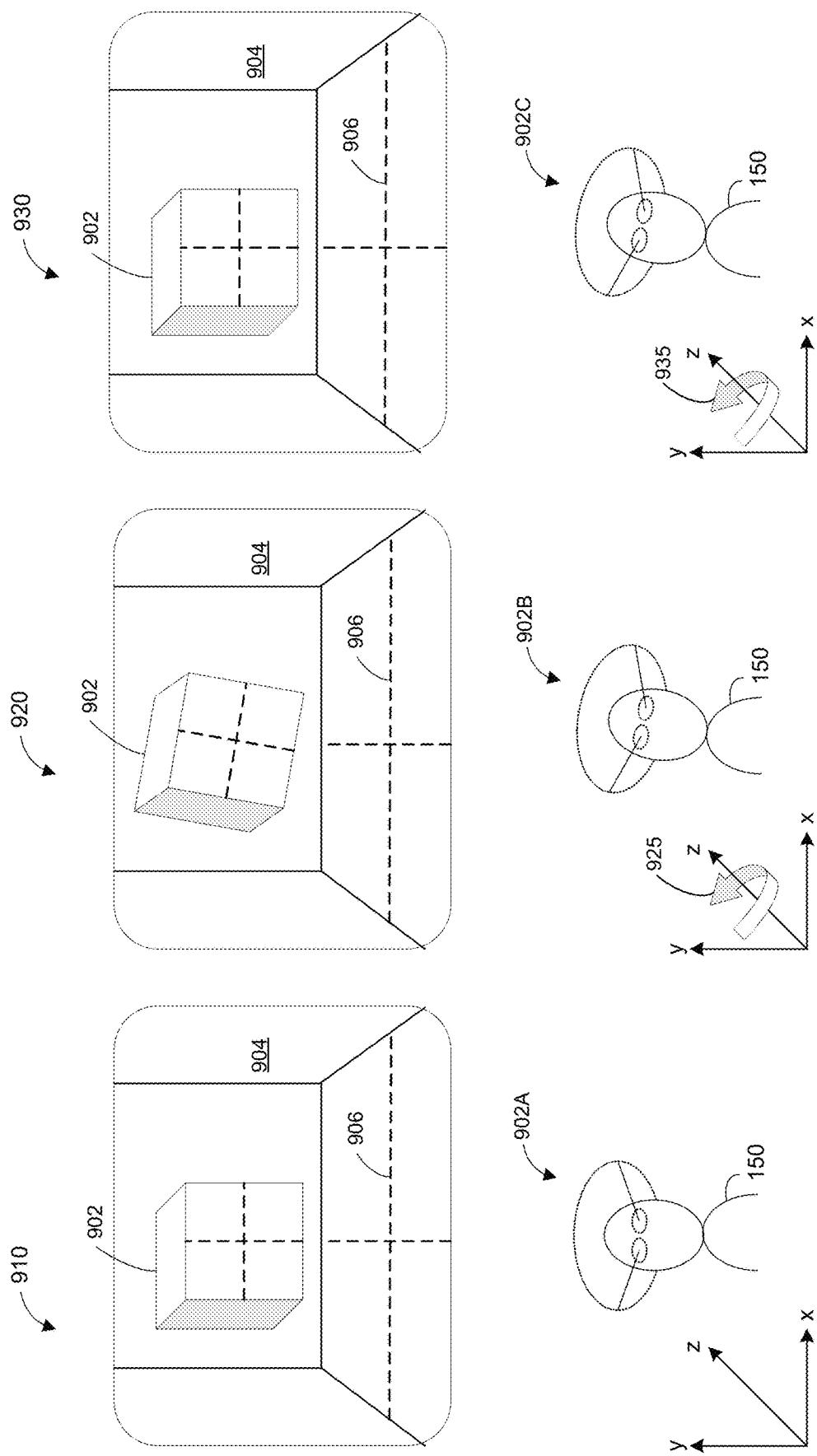
FIG. 9 illustrates example scenarios associated with head roll motion in accordance with some implementations.

FIG. 9 illustrates example scenarios 910-930 associated with head roll motion in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the example scenarios 910-930 are rendered and presented by a computing system such as the controller 110 shown in FIGS. 1 and 2; the electronic device 120 shown in FIGS. 1 and 3; and/or a suitable combination thereof.

As shown in FIG. 9, the computing system presents virtual content 902 within an XR environment 904 in scenario 910. In scenario 910, the virtual content 902 is presented parallel to a plane 906 associated with the XR environment 904 (e.g., a scene origin plane, a ground plane associated with a gravity vector, or the like). With reference to scenario 910, the computing system detects a first head pose 902A of the user 150.

As one example, with continued reference to FIG. 9, the computing system detects a head roll motion 925 associated with a change from the first head pose 902A in scenario 910 to a second head pose 902B in scenario 920. In response to detecting the head roll motion 925, the computing system presents the virtual content 902 askew relative to the plane 906 within the XR environment 904. As such, the computing system presents the virtual content 902 in a first presentation mode (e.g., a head/display-locked mode) in scenario 920 and does not apply roll rotation to the virtual content 902 relative to the computing system.

As another example, with continued reference to FIG. 9, the computing system detects a head roll motion 935 associated with a change from the first head pose 902A in scenario 910 to a third head pose 902C in scenario 930. In response to detecting the head roll motion 935, the computing system presents the virtual content 902 parallel to the plane 906 within the XR environment 904 (e.g., the scene origin plane, the ground plane associated with the gravity vector, or the like). As such, the computing system presents the virtual content 902 in a second presentation mode (e.g., a scene origin-locked mode, a horizon-locked mode, or a gravity-aligned mode) in scenario 930 where a counter roll rotation is applied to the virtual content 902 to compensate for the head roll motion 935.

FIGS. 10A-10D illustrate a sequences of instances 1000-1030 for presenting virtual content during head roll motion in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the instances 1000-1030 are rendered and presented by a computing system such as the controller 110 shown in FIGS. 1 and 2; the electronic device 120 shown in FIGS. 1 and 3; and/or a suitable combination thereof.

Figure 10A:
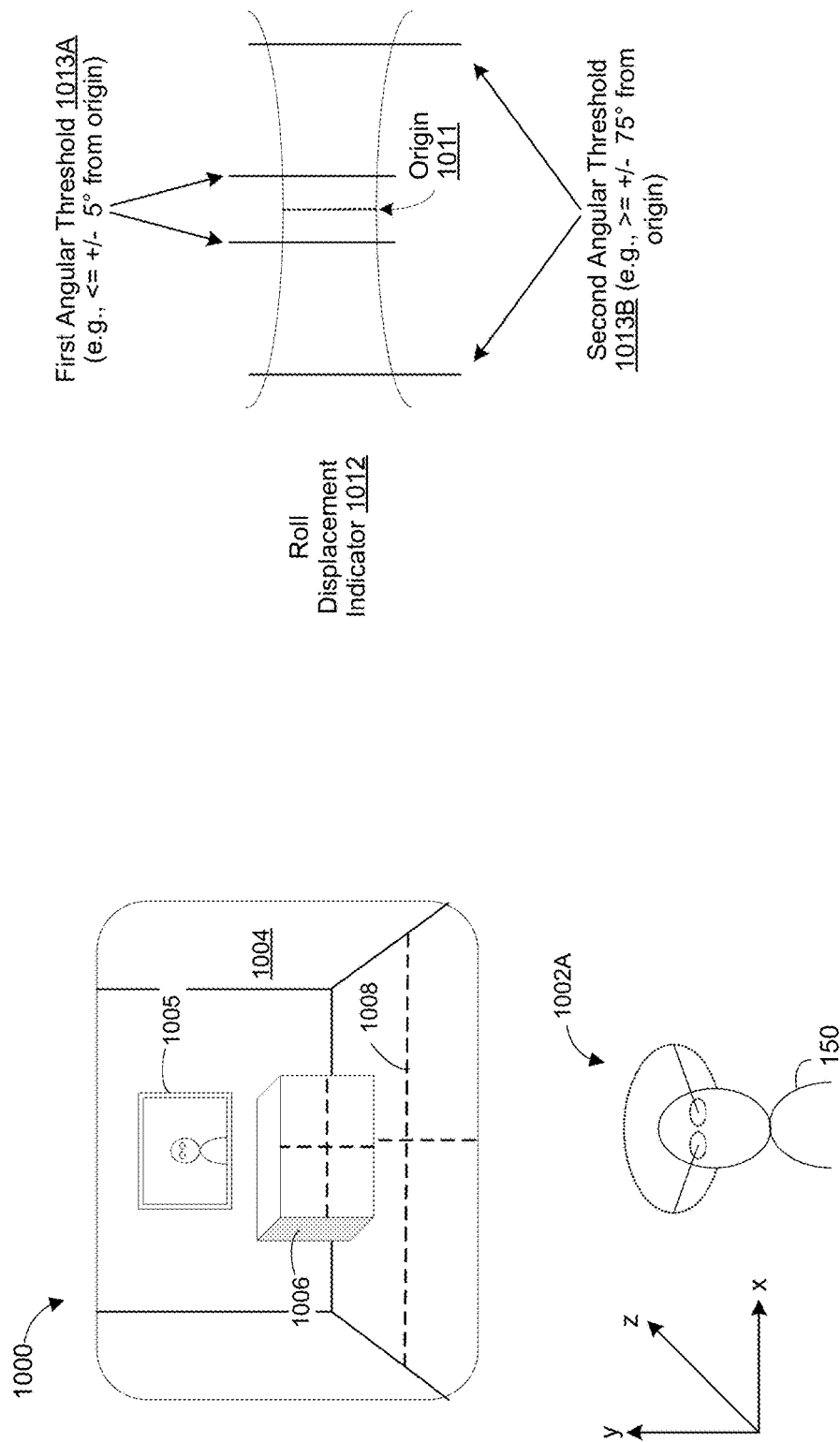
FIGS. 10A-10D illustrate a sequences of instances for presenting virtual content during head roll motion in accordance with some implementations.

As shown in FIG. 10A, the computing system presents virtual content 1006 within an XR environment 1004 that includes a portrait 1005 in instance 1000. In instance 1000, the virtual content 1006 is presented parallel to a plane 1008 (e.g., a scene origin plane, a ground plane associated with a gravity vector, or the like) associated with the XR environment 1004. With reference to FIG. 10A, the computing system detects a first head pose 1002A of the user 150 (e.g., the origin head pose).

FIGS. 10A-10D also illustrate a roll displacement indicator 1012 with an origin 1011 (e.g., corresponding to the first head pose 1002A in FIG. 10A), a first angular threshold 1013A (e.g., ≤+/−5° from the origin 1011), and a second angular threshold 1013B (e.g., ≥+/−750 from the origin 1011). As shown in FIG. 10A, the roll displacement indicator 1012 does not indicate a displacement value as the first head pose 1002A corresponds to an origin head pose.

Figure 10B:
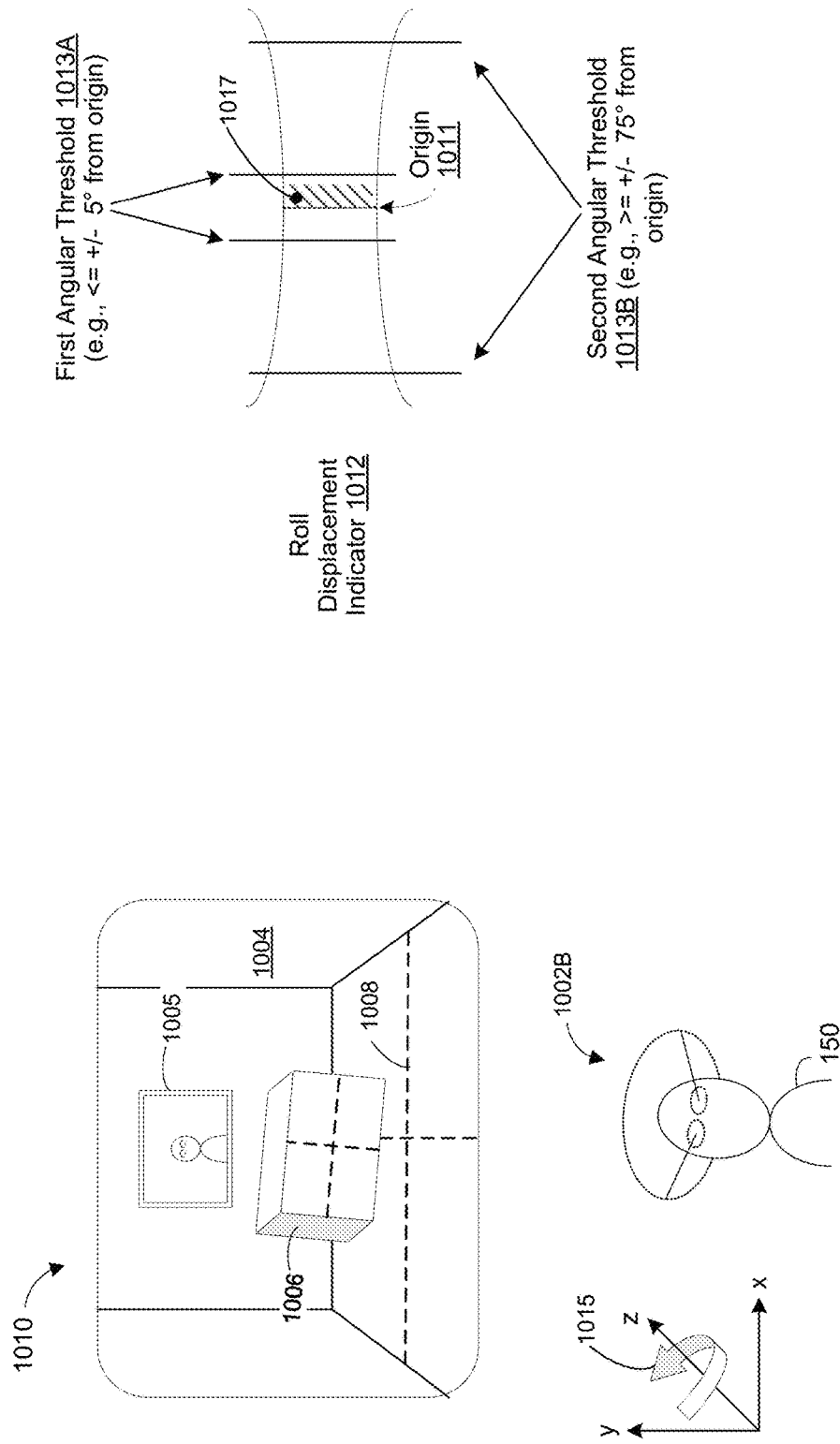

As shown in FIG. 10B, the computing system detects a head roll motion 1015 associated with a change from the first head pose 1002A in FIG. 10A to a second head pose 1002B in FIG. 10B. As shown in FIG. 10B, the roll displacement indicator 1012 includes a roll displacement value 1017 associated with the head roll motion 1015 that is less than the first angular threshold 1013A.

With continued reference to FIG. 10B, in response to detecting the head roll motion 1015 less than the first angular threshold 1013A, the computing system presents the virtual content 1006 askew relative to the plane 1008 associated with the XR environment 1004. As such, the computing system presents the virtual content 1006 in a first presentation mode (e.g., a head/display-locked mode) in instance 1010 and does not apply roll rotation to the virtual content 1006 relative to the computing system.

Figure 10C:
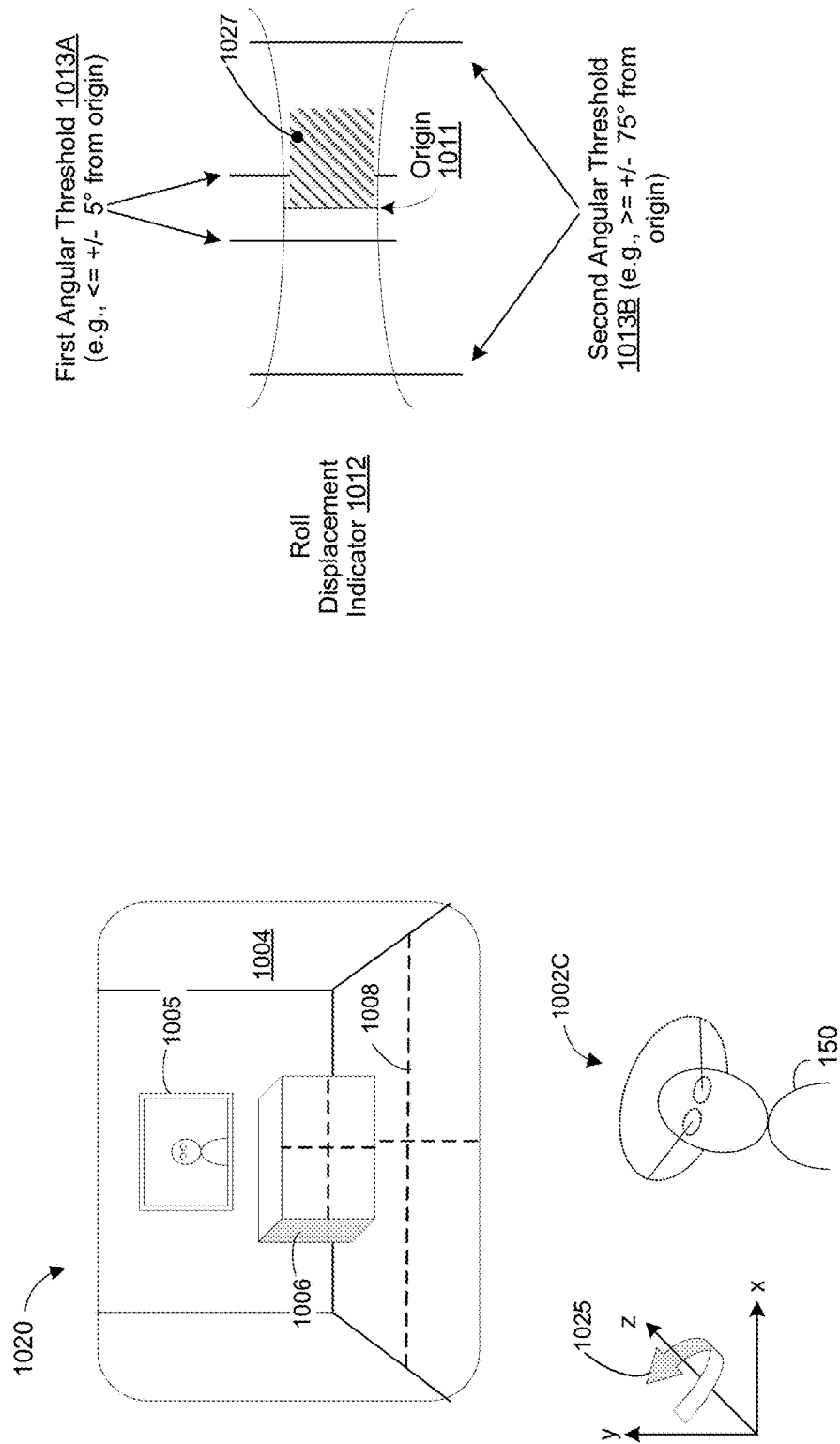

As shown in FIG. 10C, the computing system detects ahead roll motion 1025 associated with a change from the first head pose 1002A in FIG. 10A to a third head pose 1002C in FIG. 10C. As shown in FIG. 10C, the roll displacement indicator 1012 includes a roll displacement value 1027 associated with the head roll motion 1025 that is greater than the first angular threshold 1013A.

With continued reference to FIG. 10C, in response to detecting the head roll motion 1025 greater than the first angular threshold 1013A, the computing system presents the virtual content 1006 parallel to the plane 1008 within the XR environment 1004 (e.g., the scene origin plane, the ground plane associated with the gravity vector, or the like). As such, the computing system presents the virtual content 1006 in a second presentation mode (e.g., a scene origin-locked mode sometimes also referred to herein as a horizon-locked mode or a gravity-aligned mode) in instance 1020 where a counter roll rotation is applied to the virtual content 1006 to compensate for the head roll motion 1025.

Figure 10D:
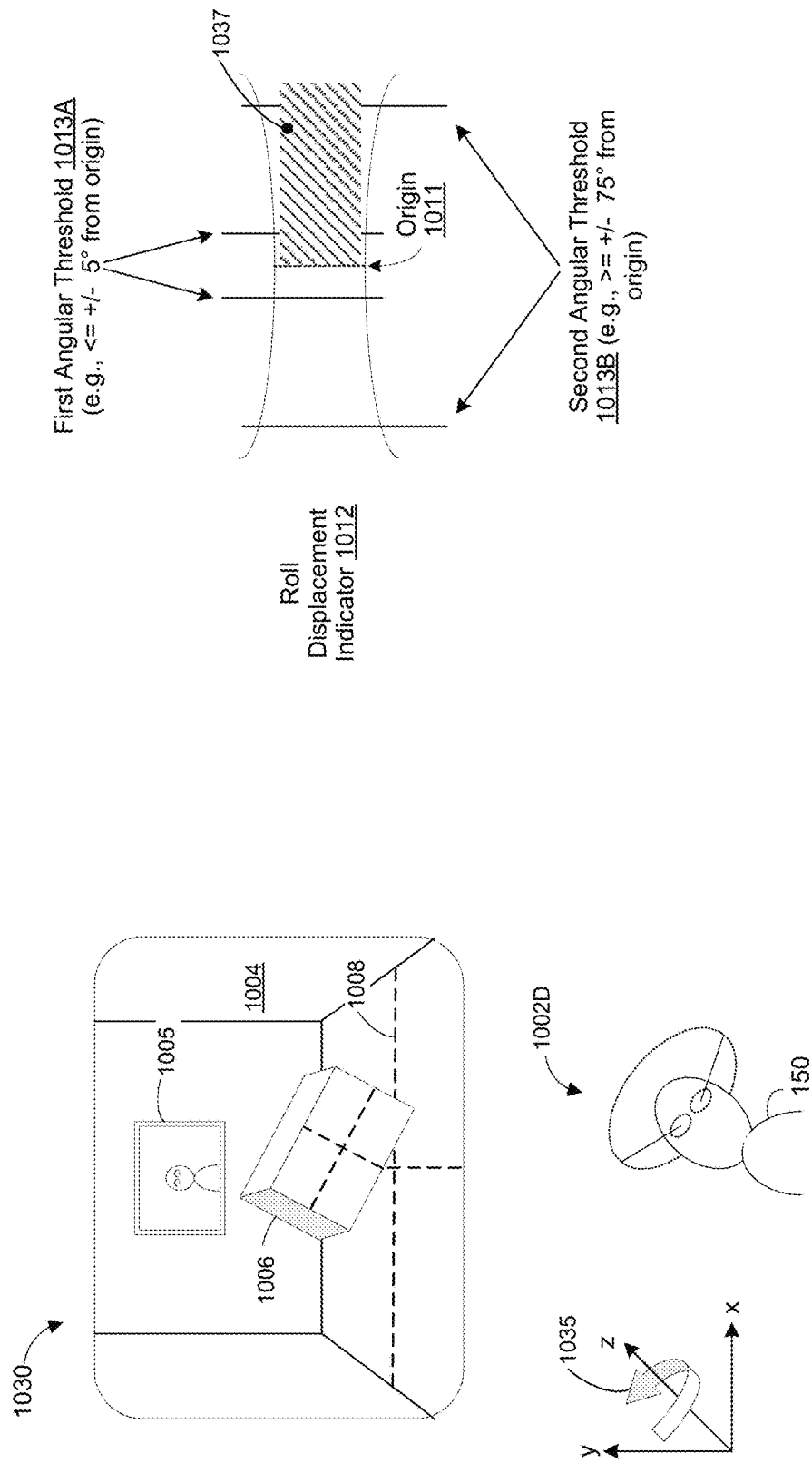

As shown in FIG. 10D, the computing system detects a head roll motion 1035 associated with a change from the first head pose 1002A in FIG. 10A to a fourth head pose 1002D in FIG. 10D. As shown in FIG. 10D, the roll displacement indicator 1012 includes a roll displacement value 1037 associated with the head roll motion 1035 that is greater than the second angular threshold 1013B.

With continued reference to FIG. 10D, in response to detecting the head roll motion 1035 greater than the second angular threshold 1013B, the computing system presents the virtual content 1006 askew relative to the plane 1008 within the XR environment 1004. As such, the computing system presents the virtual content 1006 in the first presentation mode (e.g., the head/display-locked mode) in instance 1030 and does not apply roll rotation to the virtual content 1006 relative to the computing system.

FIG. 11A-11D illustrate various plots 1110-1140 associated with content roll values for virtual content during head roll motion in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the plots 1110-1140 are shown relative to an x-axis that corresponds to a head pose roll angle 1104 detected by the computing system relative to a coordinate system of the XR environment and a y-axis that corresponds to a counter roll angle 1102 applied to virtual content by the computing system.

In the examples described below with reference to FIGS. 11A-11D, a content roll value may be defined relative to the coordinate system of the XR environment (e.g., a coordinate system associated with the XR environment 904 having the plane 906 in FIG. 9, a coordinate system associated with the XR environment 1004 having the plane 1008 in FIGS. 10A-10D—sometimes also referred to herein as the scene origin plane or the ground plane) and correspond to a difference between the head pose roll angle 1104 and the counter roll angle 1102.

Figure 11A:
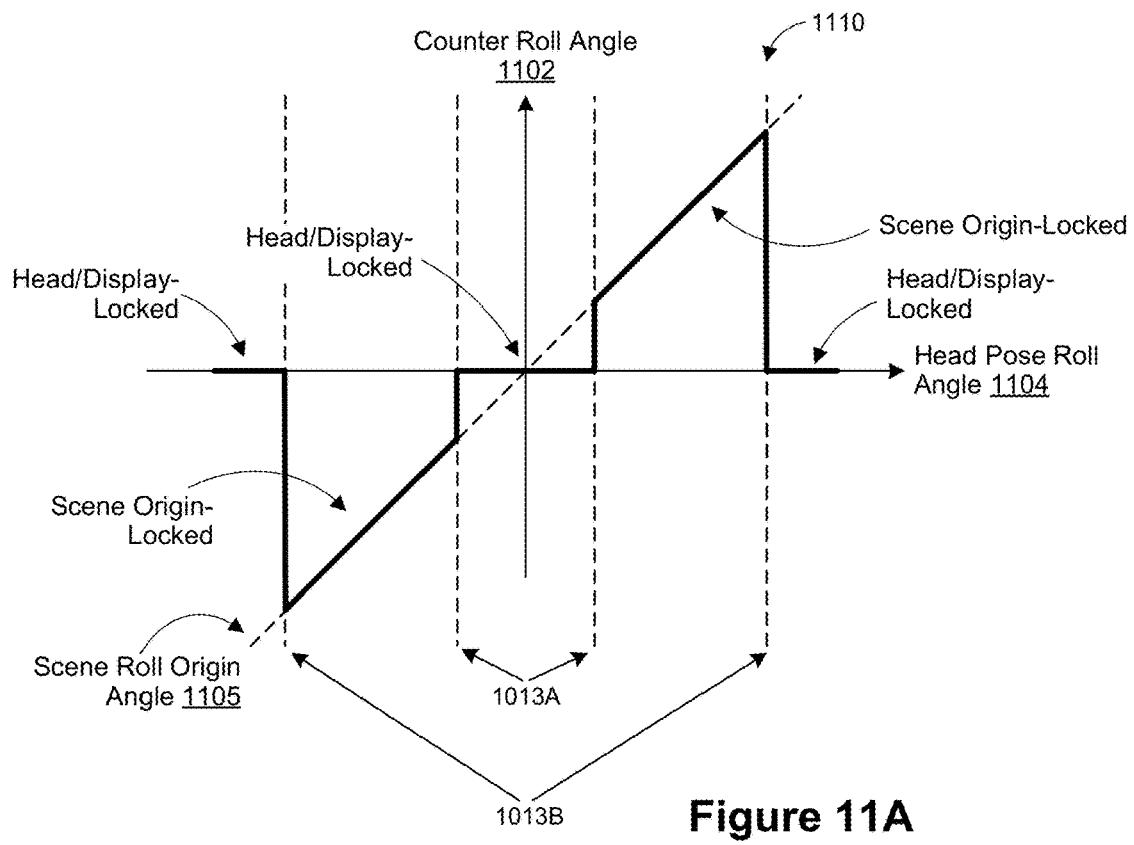
FIGS. 11A-11D illustrate various plots associated with content roll values for virtual content during head roll motion in accordance with some implementations.

FIG. 11A illustrates a plot 1110 associated with content roll values for virtual content (e.g., the virtual content 1006 in FIGS. 10A-10D). In FIG. 11A, the content roll values for the virtual content are equal to the head pose roll angle 1104 when the head pose roll angle 1104 is less than the first angular threshold 1013A. As such, with reference to the plot 1110, the virtual content is head/display-locked when the head pose roll angle 1104 is less than the first angular threshold 1013A.

With continued reference to FIG. 11A, the content roll values for the virtual content are zero (e.g., the scene roll origin angle 1105) when the head pose roll angle 1104 is greater than the first angular threshold 1013A but less than the second angular threshold 1013B. As such, with reference to the plot 1110, the virtual content is scene origin-locked when the head pose roll angle 1104 is greater than the first angular threshold 1013A but less than the second angular threshold 1013B.

With continued reference to FIG. 11A, the content roll values for the virtual content are equal to the head pose roll angle 1104 when the head pose roll angle 1104 is greater than the second angular threshold 1013B. As such, with reference to the plot 1110, the virtual content is head/display-locked when the head pose roll angle 1104 is greater than the second angular threshold 1013B.

Presenting virtual content in the first presentation mode (e.g., head/display-locked) when the head pose roll angle 1104 is less than the first angular threshold 1013A advantageously saves power by not requiring the system to rotate the virtual content in response to small roll movements. Moreover, presenting virtual content in the first presentation mode (e.g., head/display-locked) when the head pose roll angle 1104 is greater than the second angular threshold 1013A advantageously positions the virtual content in a way that is often more easily viewed by a user (e.g., text will be aligned with the user's head, rather than the scene origin at extreme angles).

Figure 11B:
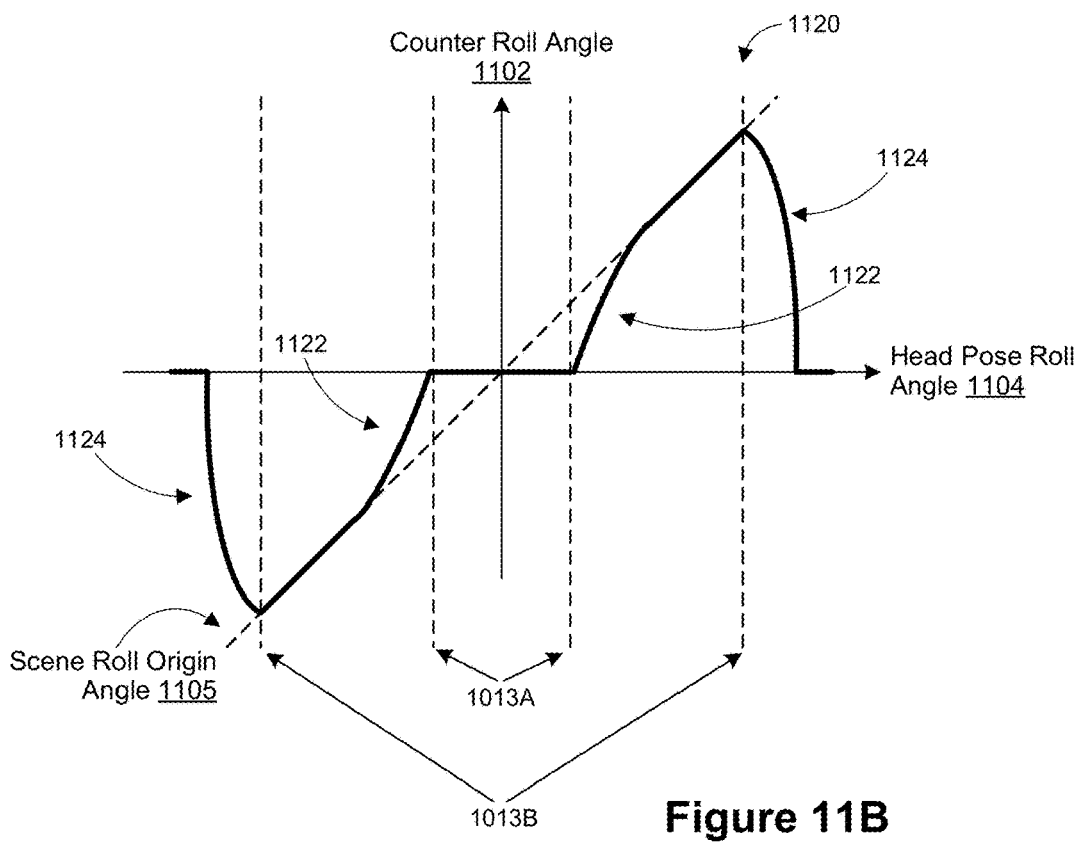

In some examples, presenting virtual content as shown in FIG. 11A may cause an undesirable jarring roll motion around the first angular threshold 1013A and the second angular threshold 1013B. To this end, FIG. 11B illustrates another plot 1120 associated with content roll values for virtual content. In FIG. 11B, the content roll values for the virtual content are equal to the head pose roll angle 1104 when the head pose roll angle 1104 is less than the first angular threshold 1013A. As such, with reference to the plot 1120, the virtual content is head/display-locked when the head pose roll angle 1104 is less than the first angular threshold 1013A.

With continued reference to FIG. 11B, the content roll values for the virtual content are smoothed such that the content roll values gradually transition between the head pose roll angle 1104 when the head pose roll angle 1104 is below the first angular threshold 1013A (e.g., the first presentation mode associated with head/display-locked content) and zero (e.g., the scene roll origin angle 1105) when the head pose roll angle 1104 is greater than the first angular threshold 1013A but less than the second angular threshold 1013B (e.g., the second presentation mode associated with scene origin-locked content) as shown by smoothing curve 1122. This may prevent a jarring roll motion of the virtual content that would otherwise occur when the head pose roll angle 1104 crosses the first angular threshold 1013A.

With continued reference to FIG. 11B, the content roll values for the virtual content may be further smoothed such that the content roll values gradually transition between zero (e.g., the scene roll origin angle 1105) when the head pose roll angle 1104 is greater than the first angular threshold 1013A but less than the second angular threshold 1013B (e.g., the second presentation mode associated with scene origin-locked content) and the head pose roll angle 1104 when the head pose roll angle 1104 is greater than the second angular threshold 1013B 1013A (e.g., the first presentation mode associated with head/display-locked content) as shown by smoothing curve 1124. This may prevent a jarring roll motion of the virtual content that would otherwise occur when the head pose roll angle 1104 crosses the second angular threshold 1013B. One of ordinary skill in the art will appreciate that the smoothing curves 1122 and 1124 are merely examples that may be replaced in various other implementations.

Presenting virtual content as shown in FIG. 11B provides the power saving and viewability advantages noted above with reference to FIG. 11A while also reducing the jarring motion that may occur around the first angular threshold 1013A and the second angular threshold 1013B.

Figure 11C:
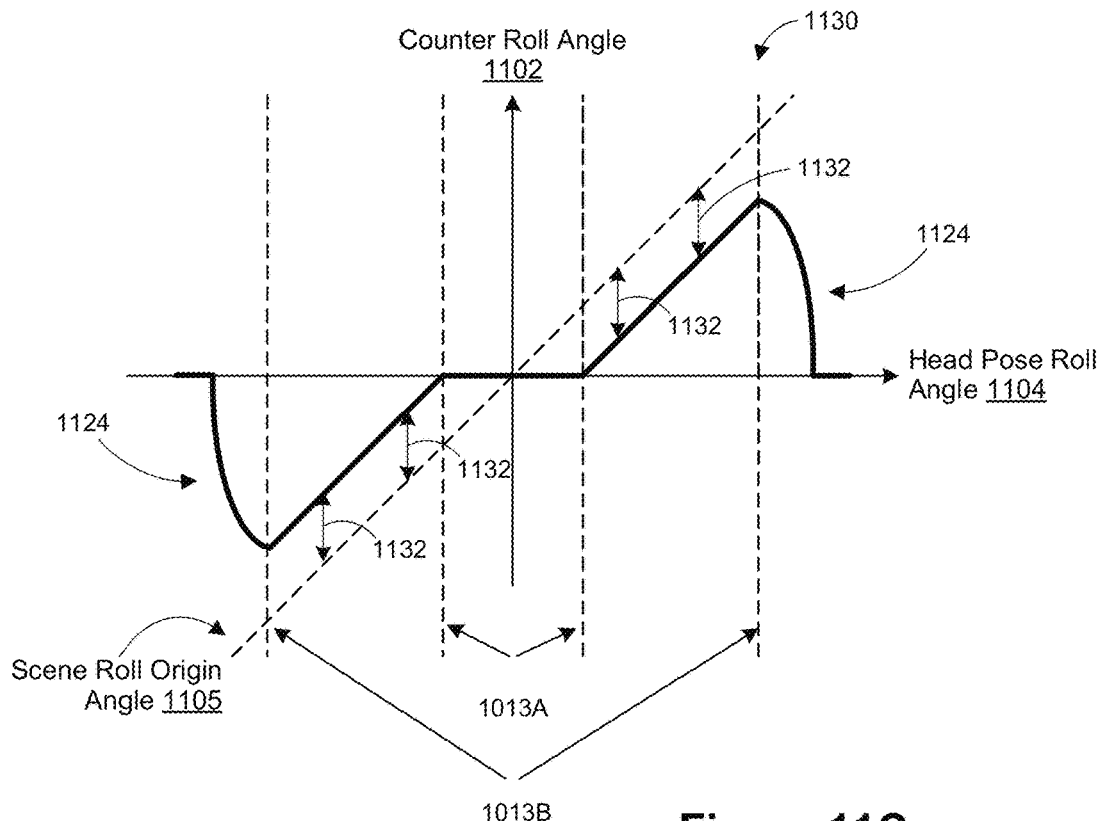

In some examples, presenting virtual content as shown in FIG. 11B may cause discomfort due to the smoothing curve 1122 giving the appearance that the scene origin (e.g., the horizon) is moving. To this end, FIG. 11C illustrates yet another plot 1130 associated with content roll values for virtual content. In FIG. 11C, the content roll values for the virtual content are equal to the head pose roll angle 1104 when the head pose roll angle 1104 is less than the first angular threshold 1013A. As such, with reference to the plot 1130, the virtual content is head/display-locked when the head pose roll angle 1104 is less than the first angular threshold 1013A.

With continued reference to FIG. 11C, the content roll values for the virtual content are equal to the scene roll origin angle 1105 minus an offset 1132 when the head pose roll angle 1104 is greater than the first angular threshold 1013A but less than the second angular threshold 1013B. As such, with reference to the plot 1130, the virtual content is scene origin-locked minus the offset 1132 when the head pose roll angle 1104 is greater than the first angular threshold 1013A but less than the second angular threshold 1013B. One of ordinary skill in the art will appreciate that the offset 1132 is merely an example that may be replaced in various other implementations.

With continued reference to FIG. 11C, the content roll values for the virtual content are smoothed such that the content roll values gradually transition between the offset 1132 when the head pose roll angle 1104 is greater than the first angular threshold 1013A but less than the second angular threshold 1013B (e.g., the second presentation mode associated with scene origin-locked content minus an offset) and the head pose roll angle 1104 when the head pose roll angle 1104 is greater than the second angular threshold 1013B (e.g., the first presentation mode associated with head/display-locked content) as shown by the smoothing curve 1124. This may prevent a jarring roll motion of the virtual content that would otherwise occur when the head pose roll angle 1104 crosses the second angular threshold 1013B.

Presenting virtual content as shown in FIG. 11C provides the power saving and viewability advantages noted above with reference to FIGS. 11A and 11B while further reducing the discomfort caused by the smoothing curve 1122 giving the appearance that the scene origin (e.g., the horizon) is moving.

Figure 11D:
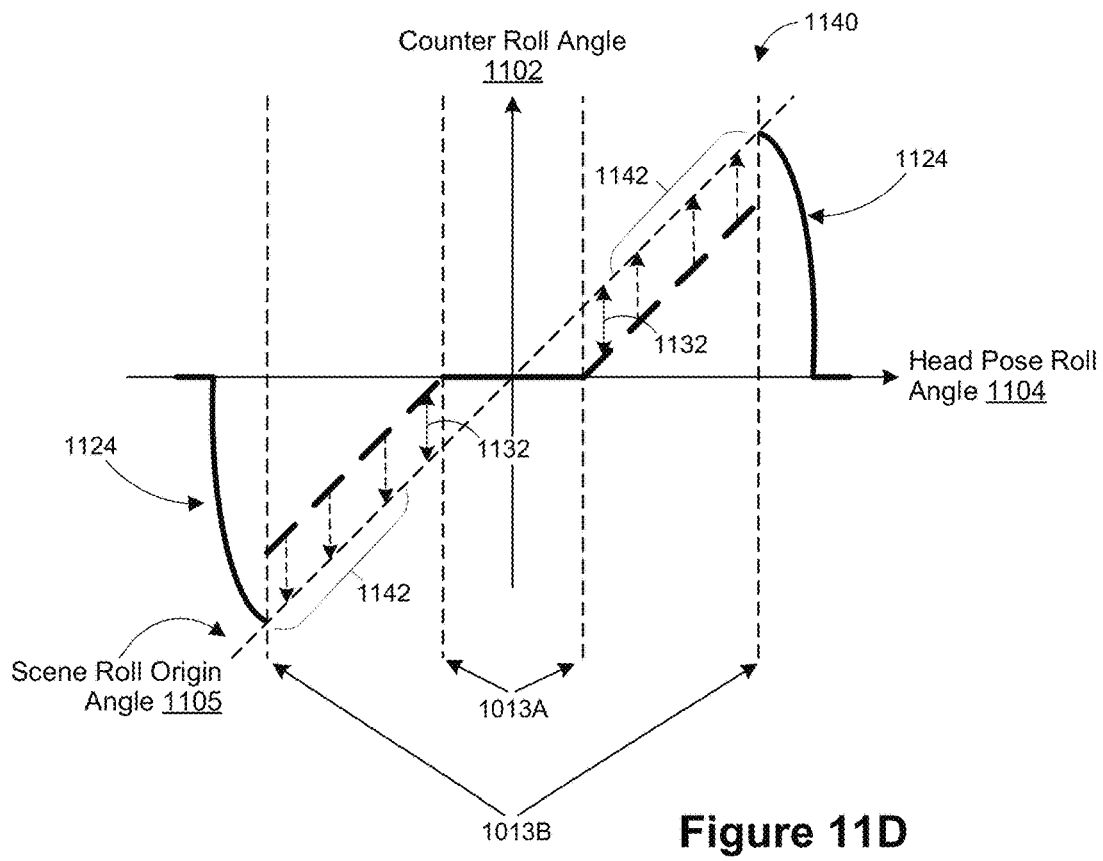

In some examples, presenting virtual content as shown in FIG. 11C may be undesirable because the virtual content may not be aligned with the scene origin (e.g., the horizon) when the head pose roll angle 1104 is greater than the first angular threshold 1013A but less than the second angular threshold 1013B (e.g., the virtual content will be misaligned by the offset 1132). As such, FIG. 11D illustrates yet another plot 1140 associated with content roll values for virtual content. In FIG. 11D, the content roll values for the virtual content are equal to the head pose roll angle 1104 when the head pose roll angle 1104 is less than the first angular threshold 1013A. As such, with reference to the plot 1140, the virtual content is head/display-locked when the head pose roll angle 1104 is less than the first angular threshold 1013A.

With continued reference to FIG. 11D, the content roll values for the virtual content are equal to the scene roll origin angle 1105 minus the offset 1132 when the head pose roll angle 1104 is greater than the first angular threshold 1013A but less than the second angular threshold 1013B, similar to the content roll values in FIG. 11C. However, temporal smoothing may be applied by increasing the counter roll angle 1102 (e.g., slowly over time) according to a smoothing function as shown by arrows 1142 when the head pose roll angle 1104 is greater than the first angular threshold 1013A but less than the second angular threshold 1013B.

With continued reference to FIG. 11D, the content roll values for the virtual content are further smoothed such that the content roll values gradually transition between the offset 1132 (or zero, depending on how long the smoothing function was applied) when the head pose roll angle 1104 is greater than the first angular threshold 1013A but less than the second angular threshold 1013B (e.g., the second presentation mode associated with scene origin-locked content) and the head pose roll angle 1104 when the head pose roll angle 1104 is greater than the second angular threshold 1013B (e.g., the first presentation mode associated with head/display-locked content) as shown by the smoothing curve 1124. This may prevent a jarring roll motion of the virtual content that would otherwise occur when the head pose roll angle 1104 crosses the second angular threshold 1013B.

Presenting virtual content as shown in FIG. 11D provides the power saving and viewability advantages noted above with reference to FIGS. 11A-11C while further reducing misalignment between the scene origin (e.g., the horizon) and the virtual content.

In some examples, the counter roll angle 1102 may be set to zero in any of FIGS. 11A-D only when the head pose roll angle 1104 is less than the first angular threshold 1013A for greater than a threshold amount of time. As a result, the virtual content may advantageously remain presented aligned with the scene origin during relatively quick roll rotations that traverse the angles between the positive and negative first threshold values 1013A.

In some examples, the first angular threshold 1013A and the second angular threshold 1013B may be defined relative to a dynamically adjusted head pose roll angle 1104 origin. For example, a user may roll their head at an angle relative to gravity and remain there for a threshold length of time. In this example, the new roll angle may be used as an origin rather than the zero head pose roll angle 1104 shown in FIGS. 11A-11D.

Figure 12:
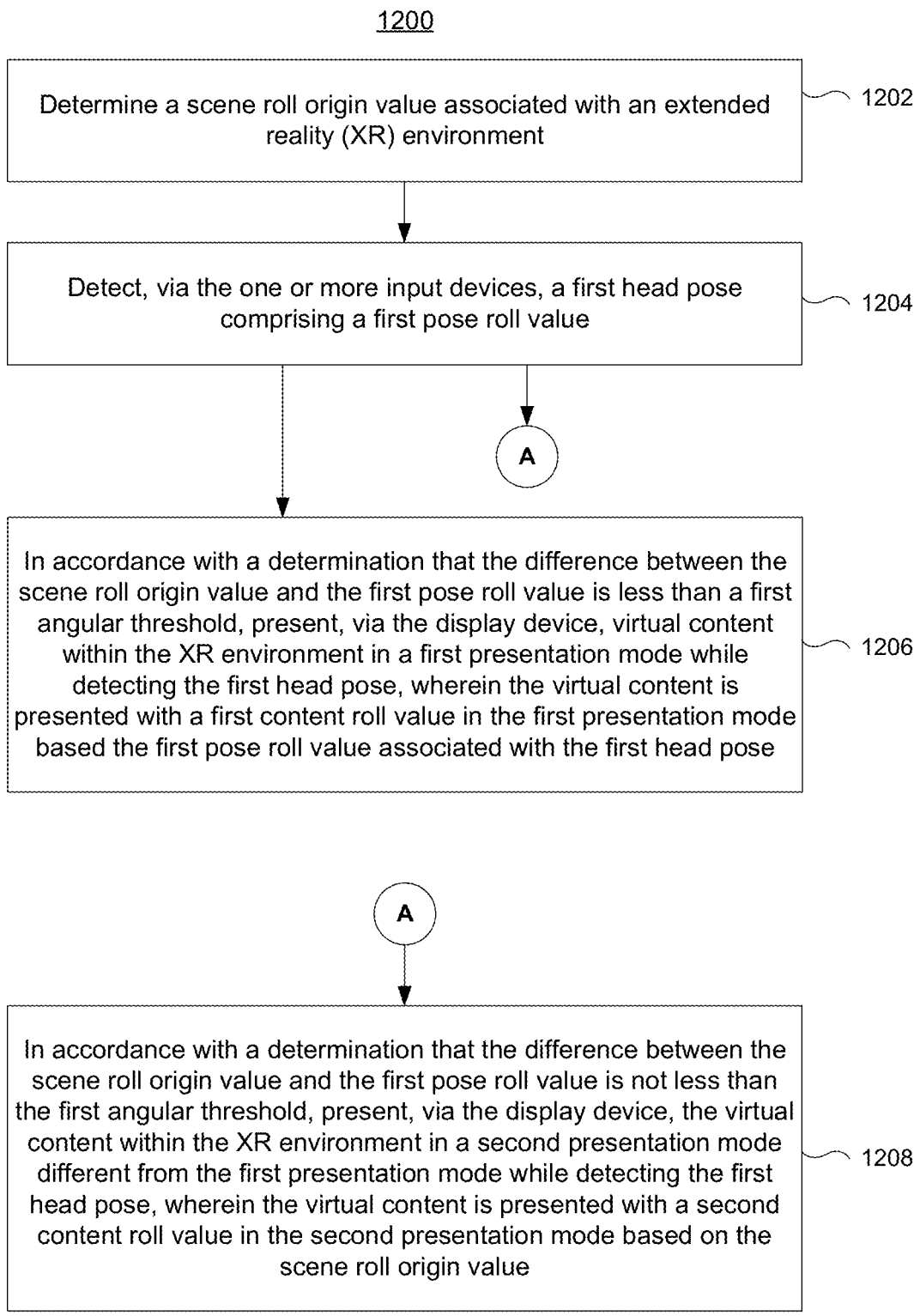
FIG. 12 illustrates a flowchart representation of a method of improving comfortability of virtual content during head roll motions in accordance with some implementations.

FIG. 12 illustrates a flowchart representation of a method of improving comfortability of virtual content during head roll motions in accordance with some implementations. In various implementations, the method 1200 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the method 1200 is performed by processing logic, including hardware, firmware, software, or a combination thereof. In some implementations, the method 1200 is performed by a processor executing code stored in a non-transitory computer-readable medium (e.g., a memory). In some implementations, the computing system corresponds to one of a tablet, a laptop, a mobile phone, a near-eye system, a wearable computing device, or the like. In some implementations, the one or more input devices correspond to a computer vision (CV) engine that uses an image stream from one or more exterior-facing image sensors, a finger/hand/extremity tracking engine, an eye tracking engine, a touch-sensitive surface, one or more microphones, and/or the like.

A variety of ameliorative features may be applied to virtual content to maintain its comfortability, including: (A) scene origin-locking (sometimes also referred to herein as horizon-locking or gravity-aligning), (B) lazy follow (e.g., dampening movement of virtual content in response to yaw and/or pitch movement of a user or the electronic device), (C) billboarding (e.g., rotating virtual content to face towards the user or the electronic device), and (D) comfortable depth (e.g., placing virtual content at a depth corresponding to a physical object in the user's FOV or the electronic device's FOV). The ameliorative features provide both a comfortable and a high-resolution user experience, but the ameliorative features place a significant burden on limited computational and power resources of the computing system. The method described herein aims to reduce computation and power consumption when performing scene origin-locking by forgoing scene origin-locking below a threshold amount of angular displacement for head roll motions (e.g., a "dead-zone" for +/−5 degrees of roll motion) and performing scene origin-locking above the threshold amount of angular displacement for head roll motions.

As represented by block 1202, the method 1200 includes determining a scene roll origin value associated with an extended reality (XR) environment. In some implementations, the scene roll origin value is based on a gravity vector associated with the XR environment, a physical environment, or the like. As one example, the gravity vector is obtained from an IMU associated with the computing system. As another example, the gravity vector is obtained by analyzing horizontal and/or vertical lines within the XR environment and/or one or more images of a physical environment. In some implementations, the scene roll origin value is determined based on a previous head pose detected prior to the first head pose.

For example, the scene roll origin value corresponds to the horizon within the XR environment, a physical environment, or the like. As one example, with reference to FIGS. 10A-10D, the scene roll origin value corresponds to the plane 1008 (e.g., the scene origin plane, the ground plane associated with the gravity vector, or the like).

As represented by block 1204, the method 1200 includes detecting, via the one or more input devices, a first head pose comprising a first pose roll value. In some implementations, the first head pose is associated with a first set of 6DOF values such as x, y, and/or z positional pose values and/or yaw, roll, and/or pitch rotational pose values. In some implementations, the first head pose is associated with a first set of 3DOF values such as yaw, roll, and/or pitch rotational pose values. As one example, with reference to FIG. 10B, the computing system detects a second head pose 1002B associated with a roll displacement value 1017 associated with the head roll motion 1015. As another example, with reference to FIG. 10C, the computing system detects a second head pose 1002C associated with a roll displacement value 1027 associated with the head roll motion 1025.

In some implementations, the computing system obtains (e.g., receives, retrieves, or determines/generates) the first head pose and/or a first body pose. As one example, with reference to FIGS. 4A and 4B, the computing device or a portion thereof (e.g., the characterization engine 442 in FIG. 4A) obtains (e.g., receives, retrieves, or determines/generates) a characterization vector 443 based at least in part on a pose characterization vector 415 (e.g., including the first head pose and the first body pose). In some implementations, obtaining the first characterization vector corresponds to generating the first characterization vector based on sensor data collected by the computing system. In some implementations, the sensor data is collected by a combination of optional remote sensors, the electronic device 120, and the controller 110. As shown in FIG. 4A, for example, the characterization vector 443 is based on the local sensor data 403 and/or the remote sensor data 405.

In accordance with a determination that the difference between the scene roll origin value and the first pose roll value is less than a first angular threshold, as represented by the block 1206, the method 1200 includes presenting, via the display device, virtual content within the XR environment in a first presentation mode while detecting the first head pose, wherein the virtual content is presented with a first content roll value in the first presentation mode based the first pose roll value associated with the first head pose. In some implementations, the first presentation mode corresponds to a head/display-locked mode or an efficiency mode that allows a GPU or rendering module of the computing system to remain idle with respect to the XR environment. In some implementations, the first content roll value matches the first pose roll value while the head roll motion is less than first angular threshold. In some implementations, the computing system forgoes application of roll rotation to the virtual content relative to the computing system.

In some implementations, the first angular threshold corresponds to deterministic or non-deterministic number of degrees of angular displacement. In some implementations, the first content roll value in the first presentation mode is not based on the scene roll origin value. In some implementations, the first content roll value is equal to the first pose roll value. In some implementations, the virtual content corresponds to head/display-locked virtual content while presented in the first presentation mode.

As one example, with reference to FIG. 10B, in response to detecting the head roll motion 1015 less than the first angular threshold 1013A, the computing system presents the virtual content 1006 askew relative to the display plane 1008 within the XR environment 1004. As such, the computing system presents the virtual content 1006 in the first presentation mode (e.g., a head/display-locked mode) in instance 1010 and does not apply roll rotation to the virtual content 1006 relative to the computing system.

According to some implementations, the first content roll value corresponds to zero degrees of roll rotation relative to the computing system. For example, while at rest, the virtual content is presented level within the user's FOV such as a zero degree roll angle relative to the computing system. According to some implementations, the first content roll value corresponds to an initial head pose roll value relative to the scene roll origin value. For example, while at rest, the virtual content is presented level within the user's FOV but slightly askew relative to the scene roll origin value if the user has a slight roll to one side relative to the scene roll origin value while at rest.

In accordance with a determination that the difference between the scene roll origin value and the first pose roll value is not less than the first angular threshold, as represented by the block 1208, the method 1200 includes presenting, via the display device, the virtual content within the XR environment in a second presentation mode different from the first presentation mode while detecting the first head pose, wherein the virtual content is presented with a second content roll value in the second presentation mode based on the scene roll origin value. In some implementations, the second presentation mode corresponds to a gravity-aligned mode (sometimes also referred to herein as a scene origin-locked mode or a horizon locked mode) or a performance mode that uses the GPU or a rendering module to rotate the XR environment and/or the virtual content therein. In some implementations, the computing system applies a counter roll rotation (e.g., the counter roll angle 1102 described above in FIGS. 11A-11D) to virtual content relative to the XR environment in the second presentation mode. In other words, the computing system gravity-aligns the virtual content in the second presentation mode.

In some implementations, the virtual content corresponds to gravity-aligned virtual content while presented in the second presentation mode. In some implementations, a counter roll rotation is applied to the virtual content relative to the XR environment in the second presentation mode, and the counter roll rotation is not applied to the virtual content in the first presentation mode. In some implementations, the counter roll rotation causes a horizontal axis of the virtual content to be parallel to a plane associated with the XR environment (e.g., a scene origin plane or a ground plane associated with a gravity vector such as the plane 906 in FIG. 9 or the plane 1008 in FIGS. 10A-10D).

As one example, with reference to FIG. 10C, in response to detecting the head roll motion 1025 greater than the first angular threshold 1013A, the computing system presents the virtual content 1006 parallel to the plane 1008 within the XR environment 1004 (e.g., the scene origin plane, the ground plane associated with the gravity vector, or the like). As such, the computing system presents the virtual content 1006 in the second presentation mode (e.g., a scene origin-locked mode, a horizon-locked mode, or a gravity-aligned mode) in instance 1020 where a counter roll rotation is applied to the virtual content 1006 to compensate for the head roll motion 1025.

According to some implementations, the second content roll value is equal to the scene roll origin value. In some implementations, the second content roll value matches the scene roll origin value while the head pose roll value is greater than first angular threshold. As such, the computing system rigidly gravity aligns the content roll angle to the scene roll origin. As one example, with reference to FIG. 11A, the content roll values for the virtual content are equal to zero (e.g., the scene roll origin angle 1105) when the head pose roll angle 1104 is greater than the first angular threshold 1013A but less than the second angular threshold 1013B. As such, with reference to the plot 1110, the virtual content is scene origin-locked when the head pose roll angle 1104 is greater than the first angular threshold 1013A but less than the second angular threshold 1013B.

According to some implementations, the second content roll value is further based on the first pose roll value. In some implementations, the second content roll value decreases over multiple head pose roll values to match the scene roll origin value while the head pose roll value is greater than first angular threshold. As such, the computing system enables a smooth transition to the second content roll value prior to gravity aligning the content roll angle to the scene roll origin. As one example, with reference to FIG. 11B, the content roll values for the virtual content are smoothed such that the content roll values gradually transition between the head pose roll angle 1104 when the head pose roll angle 1104 is below the first angular threshold 1013A (e.g., the first presentation mode associated with head/display-locked content) and zero (e.g., the scene roll origin angle 1105) when the head pose roll angle 1104 is greater than the first angular threshold 1013A but less than the second angular threshold 1013B (e.g., the second presentation mode associated with scene origin-locked content) as shown by smoothing curve 1122. As such, with reference to the plot 1120, the virtual content is scene origin-locked based on the smoothing curve 1122 when the head pose roll angle 1104 is greater than the first angular threshold 1013A but less than the second angular threshold 1013B. This may prevent a jarring roll motion of the virtual content that would otherwise occur when the head pose roll angle 1104 crosses the first angular threshold 1013A.

According to some implementations, a difference between the second content roll value and the scene roll origin value is inversely related to the difference between the first pose roll value and the first angular threshold.

According to some implementations, the second content roll value is equal to a predetermined offset from the scene roll origin value. In some implementations, the second content roll value corresponds to the scene roll origin value minus an offset while the head pose roll value is greater than first angular threshold. As such, the computing system rigidly gravity aligns the content roll angle to the scene roll origin minus an offset. As one example, with reference to FIG. 11C, the content roll values for the virtual content are equal to the scene roll origin angle 1105 minus an offset 1132 when the head pose roll angle 1104 is greater than the first angular threshold 1013A but less than the second angular threshold 1013B. As such, with reference to the plot 1130, the virtual content is scene origin-locked minus the offset 1132 when the head pose roll angle 1104 is greater than the first angular threshold 1013A but less than the second angular threshold 1013B.

According to some implementations, the second content roll value is further based on a time since determining that the difference between the scene roll origin value and the first pose roll value is not less than the first angular threshold. In some implementations, the second content roll value corresponds to the scene roll origin value minus an offset that is decreased over time while the head pose roll value is greater than first angular threshold until the second content roll value matches the scene roll origin value. As such, the computing system gravity aligns the content roll angle to the scene roll origin minus an offset and smoothly decreases the offset over time such that the content roll angle eventually equals the scene roll origin. As one example, with reference to FIG. 11D, the content roll values for the virtual content are equal to the scene roll origin angle 1105 minus the offset 1132 when the head pose roll angle 1104 is greater than the first angular threshold 1013A but less than the second angular threshold 1013B, similar to the content roll values in FIG. 11C. However, temporal smoothing may be applied by increasing the counter roll angle 1102 (e.g., slowly over time) according to a smoothing function as shown by arrows 1142 when the head pose roll angle 1104 is greater than the first angular threshold 1013A but less than the second angular threshold 1013B. As such, with reference to the plot 1140, the content roll values for the virtual content converge to zero (e.g., the scene roll origin angle 1105) based on the smoothing function shown by the arrows 1142.

According to some implementations, the virtual content is presented in the second presentation mode further in accordance with a determination that the difference between the scene roll origin value and the first pose roll value is less than a second angular threshold, the second angular threshold being greater than the first angular threshold. For example, FIGS. 11A-11D includes a first angular threshold 1013A (e.g., ≤+/−5° from the origin) that is less than a second angular threshold 1013B (e.g., ≤+/−750 from the origin).

In some implementations, in accordance with a determination that the difference between the scene roll origin value and the first pose roll value is not less than the second angular threshold, the method 1200 includes presenting, via the display device, the virtual content within the XR environment in the first presentation mode while detecting the first head pose, wherein the virtual content is presented with the first content roll value in the first presentation mode based the first pose roll value associated with the first head pose. As one example, with reference to FIG. 11A, the content roll values for the virtual content are equal to the head pose roll angle 1104 when the head pose roll angle 1104 is greater than the second angular threshold 1013B. As such, with reference to the plot 1110, the virtual content is head/display-locked when the head pose roll angle 1104 is greater than the second angular threshold 1013B.

In some implementations, the virtual content is presented in the first presentation mode further in accordance with a determination that the first pose roll value is less than the first angular threshold for greater than a threshold length of time. As such, a time out may be applied to presenting the virtual content in the first presentation mode (e.g., the head/display-locked mode) when the difference between the scene roll origin value and the first pose roll value is less than the first angular threshold for short periods of time (e.g., fast head roll motions from the origin to a pose roll value greater than the first angular threshold, or vice versa).

Figure 13A:
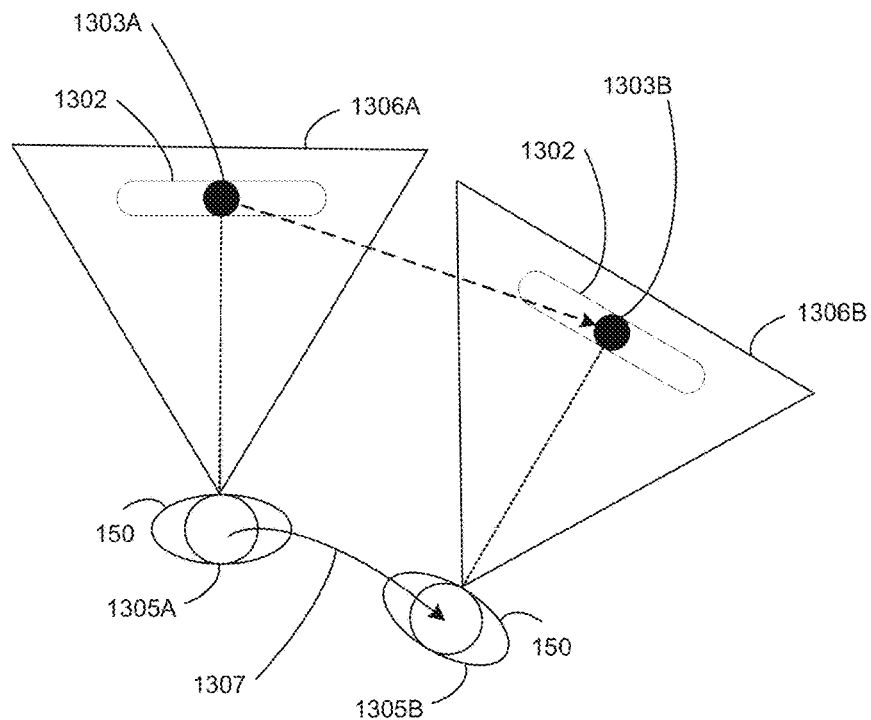
FIG. 13A illustrates head/display-locked virtual content during a head yaw motion in accordance with some implementations.

FIG. 13A illustrates head/display-locked virtual content during a head yaw motion in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, FIG. 13A illustrates virtual content 1302 presented by the computing system at a first location 1303A within a first viewing frustum 1306A associated with a first pose 1305A of the user 150.

FIG. 13A further illustrates head yaw motion 1307 from the first pose 1305A of the user 150 to the second pose 1305B of the user 150. In FIG. 13A, the computing system presents the virtual content 1302 at a second location 1303B within the second viewing frustum 1306B associated with the second pose 1305B in response to detecting the head yaw motion 1307 while the virtual content 1302 is presented in a first presentation mode (e.g., the head/display-locked mode). In this example, the first location 1303A for the virtual content 1302 relative to the first viewing frustum 1306A is similar to the second location 1303B for the virtual content 1302 relative to the second viewing frustum 1306B (e.g., the same z-depth and x,y coordinates relative to the current viewing frustum).

Figure 13B:
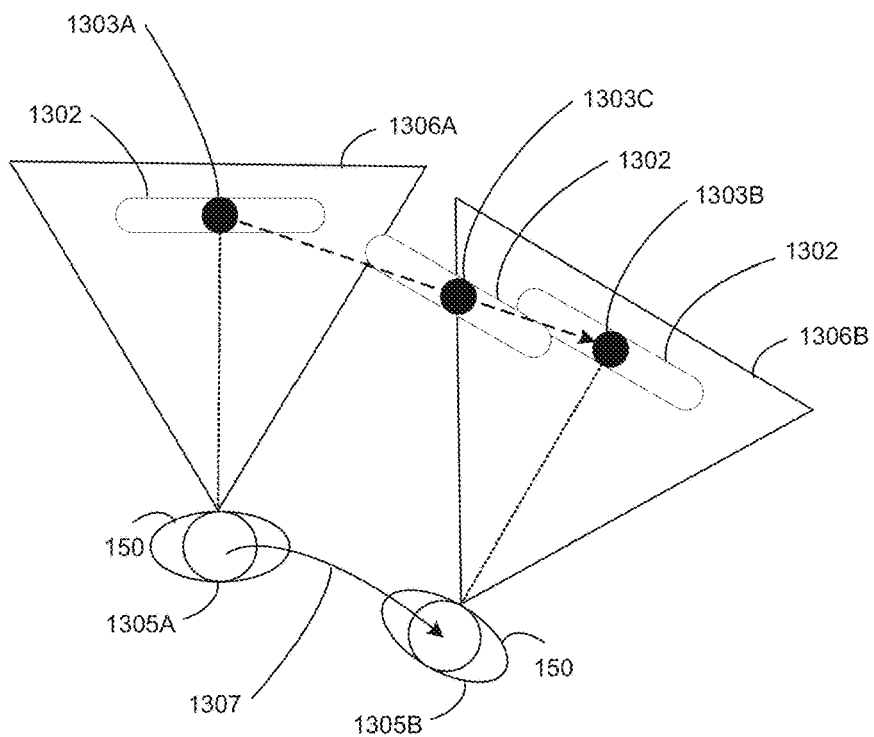
FIG. 13B illustrates lazy follow virtual content during a head yaw motion in accordance with some implementations.

FIG. 13B illustrates lazy follow virtual content during a head yaw motion in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, FIG. 13B illustrates virtual content 1302 presented by the computing system at a first location 1303A within a first viewing frustum 1306A associated with a first pose 1305A of the user 150.

FIG. 13B further illustrates head yaw motion 1307 from the first pose 1305A of the user 150 to the second pose 1305B of the user 150. In FIG. 13B, in response to detecting the head yaw motion 1307, the computing system presents the virtual content 1302 at an intermediate location 1303C prior to presenting the virtual content 1302 at the second location 1303B within the second viewing frustum 1306B associated with the second pose 1305B while the virtual content 1302 is presented in a second presentation mode (e.g., the lazy follow mode, which dampens movement of the virtual content in response to yaw and/or pitch movement of the user or the electronic device as described above with reference to FIGS. 5A-5D and 8). In this example, the intermediate location 1303C for the virtual content 1302 leaves a portion of the virtual content 1302 outside of the second viewing frustum 1306B while moving the virtual content 1302 from the first location 1303A to the second location 1302B according to the lazy follow mode. As such, the virtual content 1302 is not contained within the second viewing frustum 1306B during the head yaw motion 1307.

Figure 14:
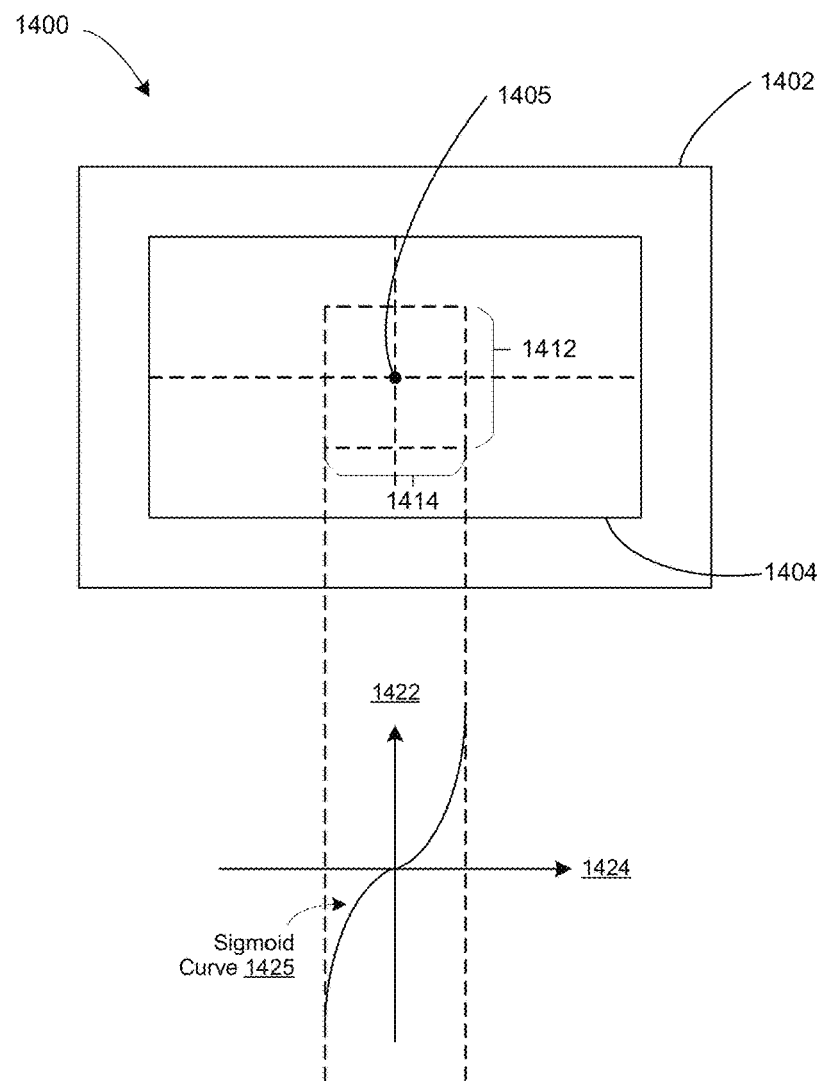
FIG. 14 illustrates a bounding box for lazy follow virtual content in accordance with some implementations.

FIG. 14 illustrates a bounding box for lazy follow virtual content in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, FIG. 14 illustrates virtual content 1404 relative to a display space 1402 and a bounding box with a bounding height 1412 and a bounding width 1414 centered on the center-point or centroid 1405 of the virtual content 1404.

According to some implementations, the bounding box aims to solve the virtual content containment issue mentioned above with reference to FIG. 13B when the virtual content 1404 is presented in the second presentation mode (e.g., the lazy follow mode) by bounding vertical and/or horizontal lazy follow of the virtual content 1404 with an easing function (e.g., a sigmoid function such as tanh, or the like). In contrast to FIG. 13B, the bounding box in FIG. 14 limits the amount of vertical and/or horizontal lazy follow according to the bounding height 1412 and the bounding width 1414 of the bounding box.

For example, FIG. 14 illustrates an example sigmoid curve 1425 (e.g., tanh) plotted against the unbounded movement input 1422 on the y-axis and the bounded virtual content offset output 1424 on the x-axis that limits the amount of lazy follow in the vertical and/or horizontal directions. In some examples, the unbounded movement input 1422 may represent an amount of movement of the user 150 or the electronic device from one point in time to another (e.g., from times corresponding to the display of one frame to another) and the bounded virtual content offset output 1424 may represent the amount of horizontal and/or vertical offset between the center-point or centroid 1405 of the virtual content 1404 and the bounding box. One of ordinary skill in the art will appreciate that the sigmoid curve 1425 is merely an example that may be replaced with another easing function or the like in various other implementations.

FIG. 15 illustrates a flowchart representation of a method of improving comfortability of virtual content during head yaw or pitch motions in accordance with some implementations. In various implementations, the method 1500 is performed at a computing system including non-transitory memory and one or more processors, wherein the computing system is communicatively coupled to a display device and one or more input devices (e.g., the electronic device 120 shown in FIGS. 1 and 3; the controller 110 in FIGS. 1 and 2; or a suitable combination thereof). In some implementations, the method 1500 is performed by processing logic, including hardware, firmware, software, or a combination thereof. In some implementations, the method 1500 is performed by a processor executing code stored in a non-transitory computer-readable medium (e.g., a memory). In some implementations, the computing system corresponds to one of a tablet, a laptop, a mobile phone, a near-eye system, a wearable computing device, or the like. In some implementations, the one or more input devices correspond to a computer vision (CV) engine that uses an image stream from one or more exterior-facing image sensors, a finger/hand/extremity tracking engine, an eye tracking engine, a touch-sensitive surface, one or more microphones, and/or the like.

A variety of ameliorative features may be applied to virtual content to maintain its comfortability, including: (A) scene origin-locking (sometimes also referred to herein as horizon-locking or gravity-aligning), (B) lazy follow (e.g., dampening movement of virtual content in response to yaw and/or pitch movement of a user or the electronic device), (C) billboarding (e.g., rotating virtual content to face towards the user or electronic device), and (D) comfortable depth (e.g., placing virtual content at a depth corresponding to a physical object in the user's FOV or the electronic device's FOV). The ameliorative features provide both a comfortable and a high-resolution user experience, but the ameliorative features place a significant burden on limited computational and power resources of the computing system. To this end, lazy follow is currently calculated using 6DOF tracking, which is expensive from a computational and power perspective. Furthermore, lazy follow fails to contain virtual content within the user's viewing frustum when transitioning from its initial location prior to head yaw and/or pitch rotational motion to its subsequent location after the head yaw and/or pitch rotational motion. The method described herein aims to reduce computation and power consumption when performing lazy follow by using 3DOF tracking. The method described herein also aims to solve the virtual content containment issue when performing lazy follow by bounding vertical and/or horizontal lazy follow with an easing function (e.g., a sigmoid function such as tanh, or the like).

While detecting a first head pose, as represented by block 1502, the method 1500 includes presenting, via the display device, virtual content at a first location that is a first set of offset values relative to the first head pose. For example, the first head pose is associated with a first set of values such as x, y, and/or z positional values and/or yaw, roll, and/or pitch rotational values.

As one example, the first set of offset values relative to the first head pose corresponds to a spatial offset in at least one of x, y, or z dimensions relative to the first head pose. As another example, the first set of offset values relative to the first head pose corresponds to a spatial offset in at least one of x, y, or z dimensions relative to a ray projected from the user's head based on the first head pose such as from a centroid of the user's face, a predefined point on the user's face (e.g., chin, forehead, tip of nose, center point between eyes, etc.), gaze direction, or the like.

In some implementations, the computing system obtains (e.g., receives, retrieves, or determines/generates) the first head pose and/or a first body pose. As one example, with reference to FIGS. 4A and 4B, the computing device or a portion thereof (e.g., the characterization engine 442 in FIG. 4A) obtains (e.g., receives, retrieves, or determines/generates) a characterization vector 443 based at least in part on a pose characterization vector 415 (e.g., including the first head pose and the first body pose). In some implementations, obtaining the first characterization vector corresponds to generating the first characterization vector based on sensor data collected by the computing system. In some implementations, the sensor data is collected by a combination of optional remote sensors, the electronic device 120, and the controller 110. As shown in FIG. 4A, for example, the characterization vector 443 is based on the local sensor data 403 and/or the remote sensor data 405.

As represented by block 1504, the method 1500 includes detecting, via the one or more input devices, a change from the first head pose to a second head pose associated with a yaw or pitch head motion. As one example, the second head pose is associated with a second set of values such as x, y, and/or z positional values and/or yaw, roll, and/or pitch rotational values. For example, the change to the head pose is detected via changes in the input data such as IMU data, accelerometer data, gyroscope data, VIO data, etc.)

In response to detecting the change to the second head pose associated with the yaw or pitch head motion, as represented by block 1506, the method 1500 includes moving, via the display device, the virtual content away from the first location towards a second location that is the first set of offset values relative to the second head pose, wherein a rate at which the virtual content is moved is based on a distance between the virtual content and the second location, and wherein at least a portion of the virtual content is maintained within a bounding box relative to a display space associated with the display device.

According to some implementations, the virtual content moves a fractional amount per frame or unit of time that may be less than the difference between the first and second head poses. According to some implementations, the position of the virtual content is interpolated temporally across frames while moving from the first location to the second location. According to some implementations, the virtual content moves with delayed motion while moving away from the first location towards the second location. As such, as one example, the virtual content mimics a delayed spring in the lazy follow mode.

In some implementations, the yaw or pitch head motion corresponds to one of an angular displacement value, an angular velocity value, an angular acceleration value, or an angular jerk value. In some implementations, a center-point of the virtual content is updated based on a location from the last frame and a difference the between first and second head poses. In some implementations, the second location is included within a user interface presented via the display device. As such, in one example, the virtual content remains within the user's FOV or viewing frustum regardless of how fast and/or how far the user turns their head.

See the below example calculations for maintaining the center-point or the centroid of the virtual content within the bounding box. According to some implementations, step 3 may be performed in cartesian coordinates or spherical coordinates.

1. Update x and y coordinates for the center-point or the centroid of the virtual content by multiplying the previous coordinates associated with the first head pose by the change to the second head pose associated with the yaw or pitch head motion.

2. Multiply the x and y coordinates for the center-point or the centroid of the virtual content by the current dampening value between 0 and 1. As one example, a dampening (or laziness) value=0 corresponds to head/display-locked virtual content. As another example, a dampening (or laziness) value=1 corresponds to world-locked virtual content.
3. Apply the easing function (e.g., a sigmoid function such as tanh, or the like) to the x and y coordinates for the center-point or the centroid of the virtual content. With reference to FIG. 14, for example, the bounded height output (e.g., y coordinate)=tanh (unbounded height input/bounding height 1412)*bounding height 1412, and the bounded width output (e.g., x coordinate)=tanh (unbounded width input/bounding width 1414)*bounding width 1414.

For example, with reference to FIG. 14, the bounding height 1412 and the bounding width 1414 are based on a difference between the dimensions of the display space 1402 and the virtual content 1404.

In some implementations, the computing system initially presents the virtual content in a first presentation mode, such as the head/display-locked mode, and, in response to detecting the change to the second head pose associated with the yaw or pitch head motion, the computing system presents the virtual content in a second presentation mode, such as the lazy follow mode. In some implementations, the computing system presents the virtual content in the second presentation mode in response to detecting the change to the second head pose associated with the yaw or pitch head motion and in accordance with a determination that the difference between the first and second head poses indicates a yaw or pitch head motion (e.g., an angular displacement, velocity, acceleration, jerk, etc. value) that satisfies a first motion criterion. In some implementations, after moving the virtual content to the second location while in the second presentation mode, the computing system changes the virtual content from the second presentation mode to the first presentation mode.

As one example, the first motion criterion corresponds to a predefined or deterministic angular displacement value, angular velocity value, angular acceleration value, angular jerk value, or the like. As another example, the first motion criterion corresponds to non-deterministic angular displacement value, angular velocity value, angular acceleration value, angular jerk value, or the like that is dynamically determined/updated based on head pose, body pose, motion state, current foreground application, environmental information, contextual information, etc.

In some implementations, in response to detecting the change to the second head pose and in accordance with a determination that the difference between the first and second head poses indicates a yaw or pitch head motion that does not satisfy the first motion criterion, the computing system maintains presentation of the virtual content in the first presentation mode at the first location while detecting the change to the second head pose. As such, in this example, the computing system maintains the rigid response/first presentation mode when the yaw or pitch head motion does not satisfy first motion criterion.

In some implementations, in response to detecting the change to the second head pose: in accordance with a determination that the difference between the first and second head poses indicates a yaw or pitch head motion that satisfies the first motion criterion and in accordance with a determination that a current motion state corresponds to one of a plurality of specified motion states, the computing system maintains presentation of the virtual content in the first presentation mode at the first location while detecting the change to the second head pose. For example, the plurality of specified motion states includes running, cycling, driving, and/or the like.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first media item could be termed a second media item, and, similarly, a second media item could be termed a first media item, which changing the meaning of the description, so long as the occurrences of the "first media item" are renamed consistently and the occurrences of the "second media item" are renamed consistently. The first media item and the second media item are both media items, but they are not the same media item.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:
1. A method comprising:
at a computing system including non-transitory memory and one or more processors, wherein the computing system is communicatively coupled to a display device and one or more input devices:

determining a scene roll origin value associated with an extended reality (XR) environment;

detecting, via the one or more input devices, a first head pose comprising a first pose roll value;

in accordance with a determination that a difference between the scene roll origin value and the first pose roll value is less than a first angular threshold, presenting, via the display device, virtual content within the XR environment in a first presentation mode while detecting the first head pose, wherein the virtual content is presented with a first content roll value in the first presentation mode based the first pose roll value associated with the first head pose;

in accordance with a determination that the difference between the scene roll origin value and the first pose roll value is not less than the first angular threshold and less than a second angular threshold, presenting, via the display device, the virtual content within the XR environment in a second presentation mode different from the first presentation mode while detecting the first head pose, wherein the virtual content is presented with a second content roll value in the second presentation mode based on the scene roll origin value; and in accordance with a determination that the difference between the scene roll origin value and the first pose roll value is not less than the second angular threshold, presenting, via the display device, the virtual content within the XR environment in the first presentation mode while detecting the first head pose.

2. The method of claim 1, wherein the scene roll origin value is based on one of: a gravity vector associated with the XR environment, or a previous head pose detected prior to the first head pose.

3. The method of claim 1, wherein the first content roll value in the first presentation mode is not based on the scene roll origin value.

4. The method of claim 1, wherein the first content roll value is equal to the first pose roll value.

5. The method of claim 1, wherein the first content roll value corresponds to zero degrees of roll rotation relative to the computing system.

6. The method of claim 1, wherein the first content roll value corresponds to an initial head pose roll value relative to the scene roll origin value.

7. The method of claim 1, wherein the second content roll value is equal to the scene roll origin value or a predetermined offset from the scene roll origin value.

8. The method of claim 1, wherein the second content roll value is further based on one of: a time since determining that the difference between the scene roll origin value and the first pose roll value is not less than the first angular threshold, or the first pose roll value.

9. The method of claim 1, wherein a difference between the second content roll value and the scene roll origin value is inversely related to the difference between the first pose roll value and the first angular threshold.

10. The method of claim 1, wherein the virtual content is presented with the first content roll value in the first presentation mode based the first pose roll value associated with the first head pose.

11. The method of claim 1, wherein the virtual content is presented in the first presentation mode further in accordance with a determination that the first pose roll value is less than the first angular threshold for greater than a threshold length of time.

12. The method of claim 1, wherein a counter roll rotation is applied to the virtual content relative to the XR environment in the second presentation mode, and wherein the counter roll rotation is not applied to the virtual content in the first presentation mode, and wherein the counter roll rotation causes a horizontal axis of the virtual content to be parallel to a plane associated with the XR environment.

13. The method of claim 1, wherein the virtual content corresponds to head-locked virtual content while presented in the first presentation mode, and wherein the virtual content corresponds to gravity-aligned virtual content while presented in the second presentation mode.

14. The method of claim 1, wherein the first angular threshold corresponds to deterministic or non-deterministic number of degrees of angular displacement.

15. The method of claim 1, wherein content roll values gradually transition between zero, when the first pose roll value is not less than the first angular threshold but less than the second angular threshold, and the first pose roll value when the first pose roll value is greater than the second angular threshold.

16. A device comprising:
one or more processors;
a non-transitory memory;
an interface for communicating with a display device and one or more input devices; and
one or more programs stored in the non-transitory memory, which, when executed by the one or more processors, cause the device to:

determine a scene roll origin value associated with an extended reality (XR) environment;

detect, via the one or more input devices, a first head pose comprising a first pose roll value;

in accordance with a determination that a difference between the scene roll origin value and the first pose roll value is less than a first angular threshold, present, via the display device, virtual content within the XR environment in a first presentation mode while detecting the first head pose, wherein the virtual content is presented with a first content roll value in the first presentation mode based the first pose roll value associated with the first head pose;

in accordance with a determination that the difference between the scene roll origin value and the first pose roll value is not less than the first angular threshold and less than a second angular threshold, present, via the display device, the virtual content within the XR environment in a second presentation mode different from the first presentation mode while detecting the first head pose, wherein the virtual content is presented with a second content roll value in the second presentation mode based on the scene roll origin value; and in accordance with a determination that the difference between the scene roll origin value and the first pose roll value is not less than the second angular threshold, presenting, via the display device, the virtual content within the XR environment in the first presentation mode while detecting the first head pose.

17. The device of claim 16, wherein a counter roll rotation is applied to the virtual content relative to the XR environment in the second presentation mode, and wherein the counter roll rotation is not applied to the virtual content in the first presentation mode, and wherein the counter roll rotation causes a horizontal axis of the virtual content to be parallel to a plane associated with the XR environment.

18. The device of claim 16, wherein the virtual content corresponds to head-locked virtual content while presented in the first presentation mode, and wherein the virtual content corresponds to gravity-aligned virtual content while presented in the second presentation mode.

19. A non-transitory memory storing one or more programs, which, when executed by one or more processors of a device with an interface for communicating with a display device and one or more input devices, cause the device to:
- determine a scene roll origin value associated with an extended reality (XR) environment;
- detect, via the one or more input devices, a first head pose comprising a first pose roll value;
- in accordance with a determination that a difference between the scene roll origin value and the first pose roll value is less than a first angular threshold, present, via the display device, virtual content within the XR environment in a first presentation mode while detecting the first head pose, wherein the virtual content is presented with a first content roll value in the first presentation mode based the first pose roll value associated with the first head pose;
- in accordance with a determination that the difference between the scene roll origin value and the first pose roll value is not less than the first angular threshold and not less than a second angular threshold, present, via the display device, the virtual content within the XR environment in a second presentation mode different from the first presentation mode while detecting the first head pose, wherein the virtual content is presented with a second content roll value in the second presentation mode based on the scene roll origin value; and
- in accordance with a determination that the difference between the scene roll origin value and the first pose roll value is not less than the second angular threshold, presenting, via the display device, the virtual content within the XR environment in the first presentation mode while detecting the first head pose.

20. The non-transitory memory of claim 19, wherein a counter roll rotation is applied to the virtual content relative to the XR environment in the second presentation mode, and wherein the counter roll rotation is not applied to the virtual content in the first presentation mode, and wherein the counter roll rotation causes a horizontal axis of the virtual content to be parallel to a plane associated with the XR environment.

* * * * *